(12) United States Patent
Choi et al.

(10) Patent No.: US 7,847,772 B2
(45) Date of Patent: Dec. 7, 2010

(54) FABRICATING METHOD AND FABRICATING APPARATUS THEREOF, AND PICTURE QUALITY CONTROLLING METHOD AND APPARATUS THEREOF

(75) Inventors: Yong Woo Choi, Gyeonggi-do (KR); Jong Hee Hwang, Gyeonggi-do (KR)

(73) Assignee: LG Display, Co., Ltd., Seoul (KR)

( * ) Notice: Subject to any disclaimer, the term of this patent is extended or adjusted under 35 U.S.C. 154(b) by 1154 days.

(21) Appl. No.: 11/476,854

(22) Filed: Jun. 29, 2006

(65) Prior Publication Data
US 2007/0126975 A1 Jun. 7, 2007

(30) Foreign Application Priority Data
Dec. 7, 2005 (KR) ...................... 10-2005-0118959

(51) Int. Cl.
*G09G 3/36* (2006.01)
(52) U.S. Cl. .......................... 345/89; 345/690; 345/214
(58) Field of Classification Search ........... 345/87–100, 345/204, 690, 214, 698; 348/180–194, 246–280, 348/658, 745; 349/54, 192
See application file for complete search history.

(56) References Cited

U.S. PATENT DOCUMENTS

| | | | | |
|---|---|---|---|---|
| 5,504,504 | A * | 4/1996 | Markandey et al. | 345/214 |
| 6,154,561 | A * | 11/2000 | Pratt et al. | 382/141 |
| 6,603,452 | B1 * | 8/2003 | Serita | 345/88 |
| 6,704,008 | B2 * | 3/2004 | Naito et al. | 345/207 |
| 7,292,024 | B2 * | 11/2007 | Zhang et al. | 324/158.1 |
| 2002/0067326 | A1 * | 6/2002 | Aoki | 345/89 |
| 2002/0097395 | A1 * | 7/2002 | Smith et al. | 356/239.2 |
| 2003/0168601 | A1 * | 9/2003 | Kita | 250/341.1 |
| 2003/0222839 | A1 * | 12/2003 | Lee | 345/88 |
| 2005/0116917 | A1 * | 6/2005 | Aoki | 345/99 |
| 2006/0061248 | A1 * | 3/2006 | Cok et al. | 313/110 |
| 2006/0066547 | A1 * | 3/2006 | Nitta et al. | 345/88 |
| 2006/0164407 | A1 * | 7/2006 | Cok | 345/204 |
| 2006/0244476 | A1 * | 11/2006 | Zhang et al. | 324/770 |
| 2007/0109327 | A1 * | 5/2007 | Cok et al. | 345/690 |

(Continued)

FOREIGN PATENT DOCUMENTS

EP 0 735 620 A1 10/1996

(Continued)

*Primary Examiner*—Amare Mengistu
*Assistant Examiner*—Dmitriy Bolotin
(74) *Attorney, Agent, or Firm*—Morgan, Lewis & Bockius LLP

(57) ABSTRACT

A method of fabricating a flat panel display includes, judging a panel defect area and a non-defect area of a display panel, generating a first compensation data for compensating the panel defect area, first modulating a data of the panel defect area by using the first compensation data, judging a brightness at a border between the panel defect area and the non-defect area of the display panel after compensating the panel defect, generating a second compensation data for compensating the border and the panel defect area, second modulating a data of the border and the panel defect area by using the second compensation data, adding the first compensation data and the second compensation data to calculate a resultant compensation data, and storing the resultant compensation data at a data modulation memory.

82 Claims, 49 Drawing Sheets

U.S. PATENT DOCUMENTS

| | | | |
|---|---|---|---|
| 2007/0126758 A1* | 6/2007 | Hwang | 345/690 |
| 2007/0229420 A1* | 10/2007 | Hwang | 345/87 |
| 2008/0001869 A1* | 1/2008 | Chung et al. | 345/87 |

FOREIGN PATENT DOCUMENTS

| | | |
|---|---|---|
| JP | 5-197357 | 8/1993 |
| JP | 8-179727 | 7/1996 |
| JP | 2001-343953 | 12/2001 |
| JP | 2003-66924 | 3/2003 |
| JP | 2004-198875 | 7/2004 |
| JP | 2004-279482 | 10/2004 |
| JP | 2004-325961 | 11/2004 |
| JP | 2005-43725 | 2/2005 |
| JP | 2005-242359 | 9/2005 |
| JP | 2005-249821 | 9/2005 |
| KR | 10-2004-0086595 | 10/2003 |
| TW | 526379 | 4/2003 |
| TW | 559756 | 11/2003 |

* cited by examiner

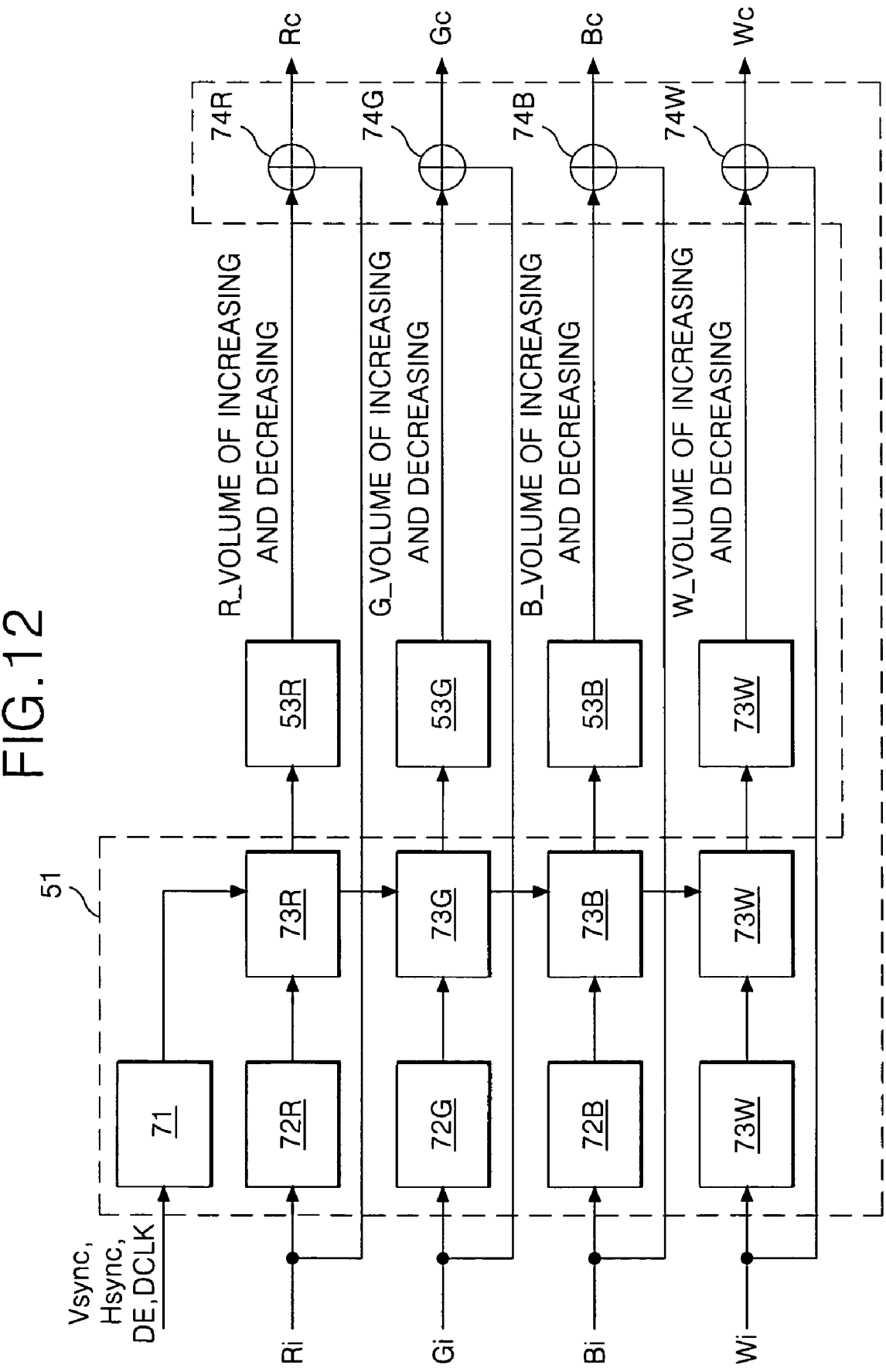

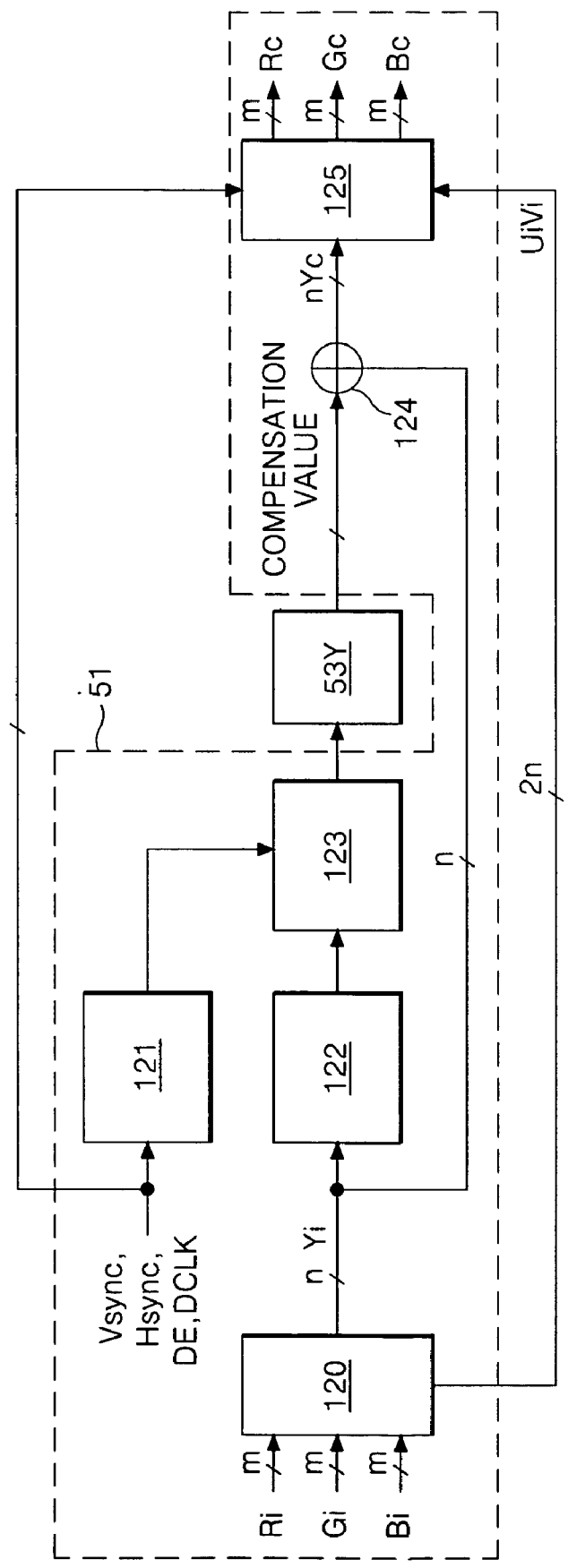

FIG.24A
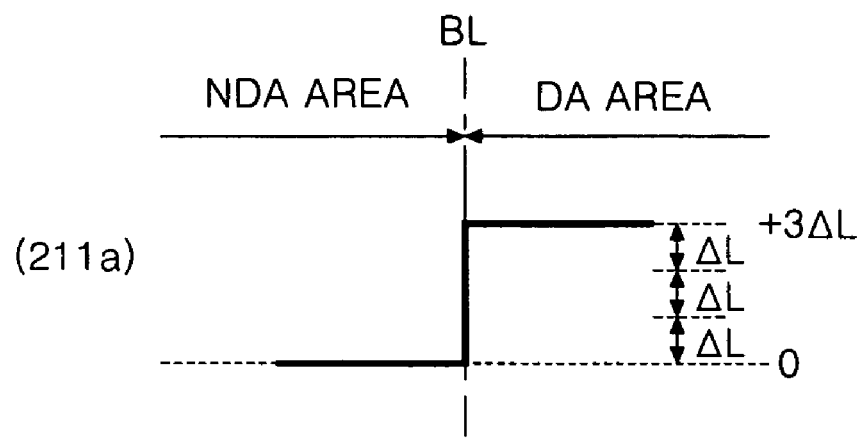
(211a)
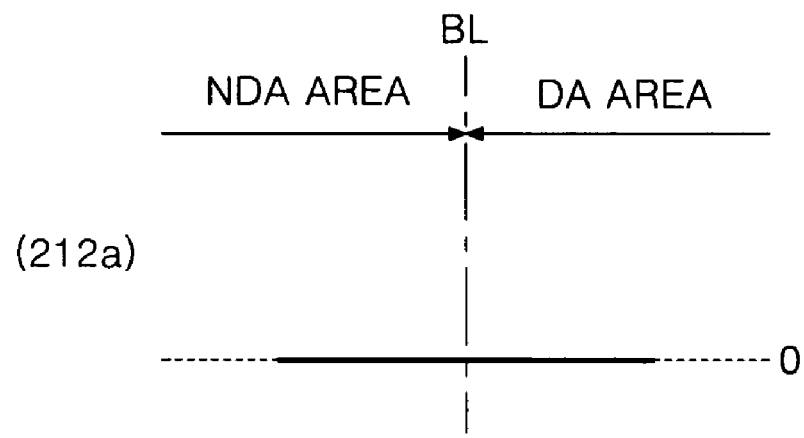
(212a)
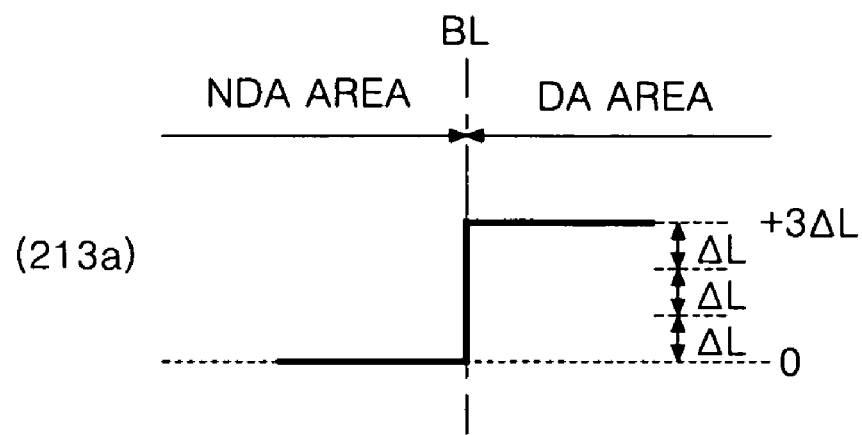
(213a)

FIG.24B
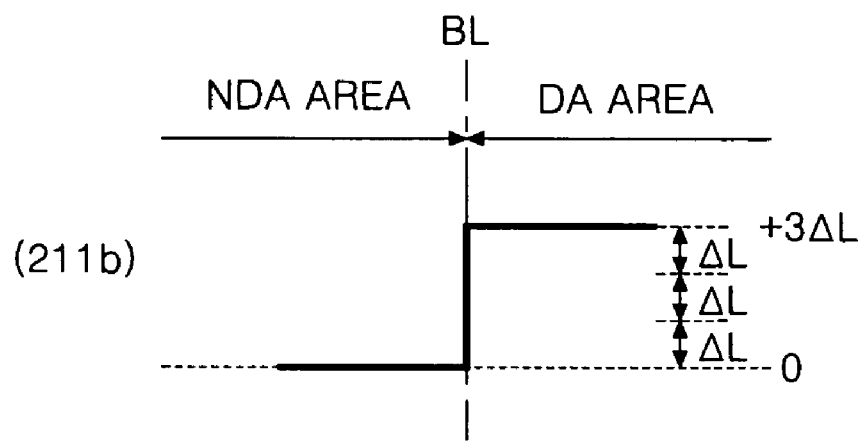
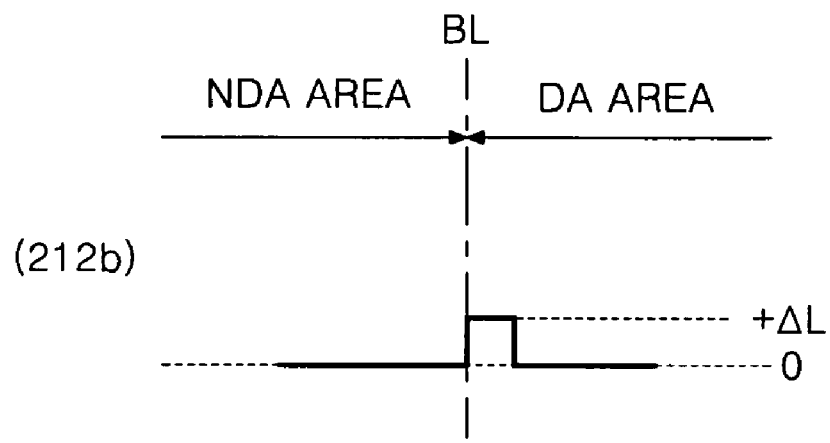
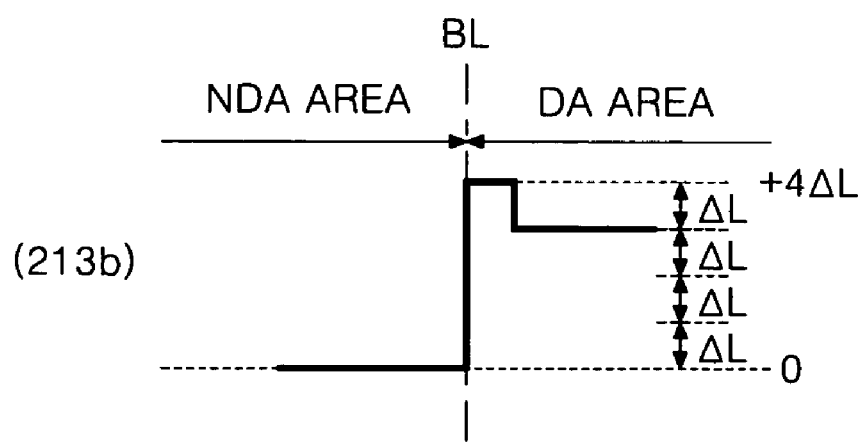

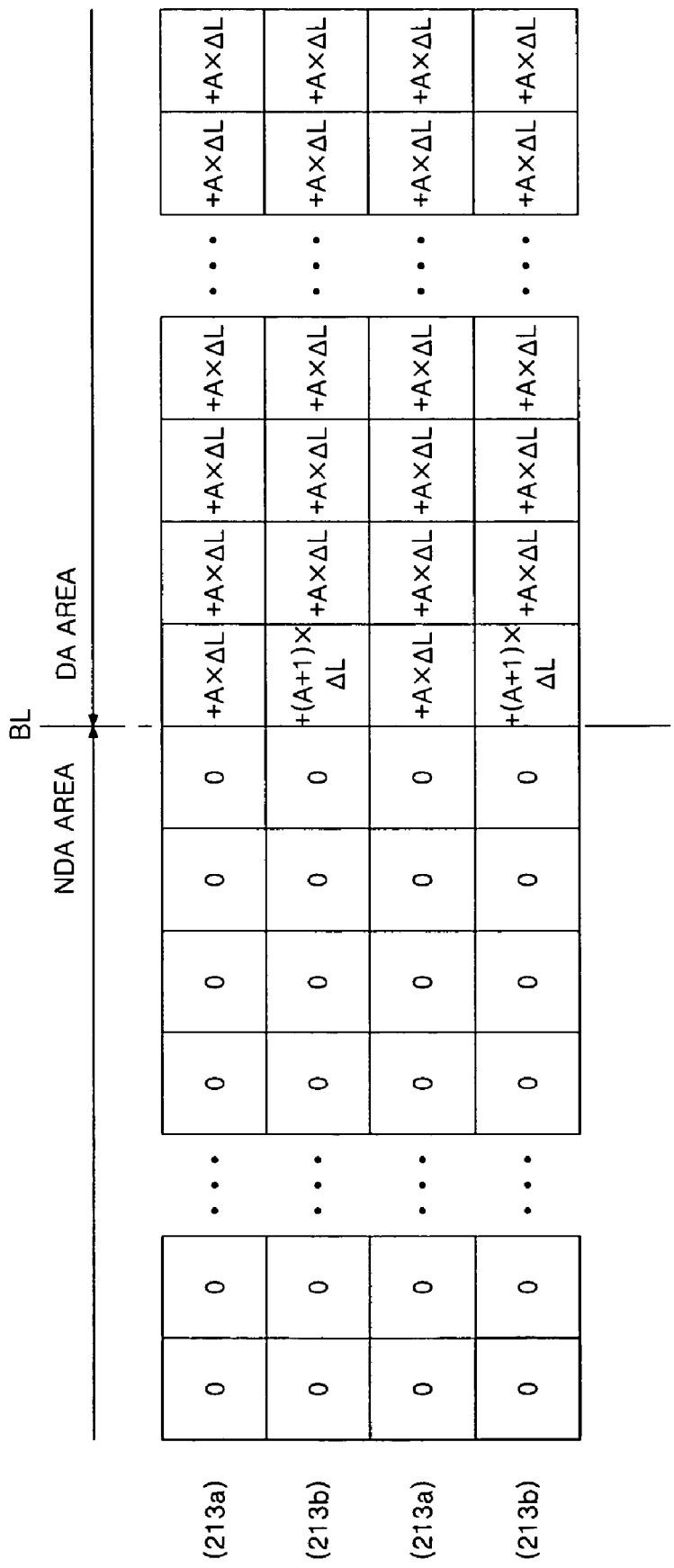

FIG.25A
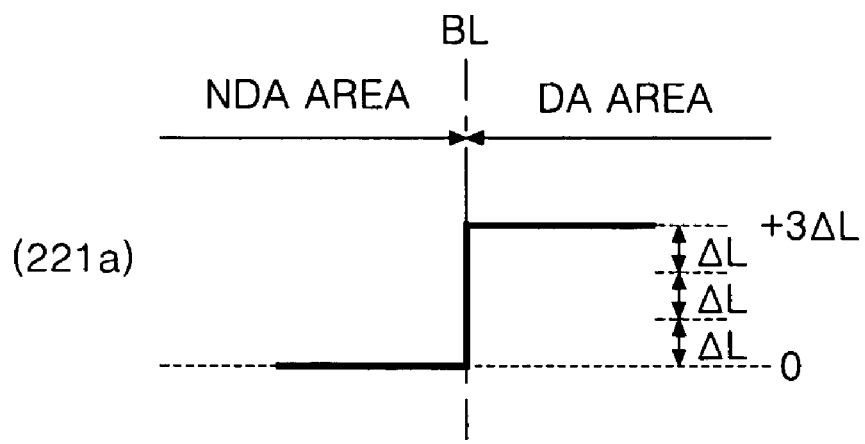
(221a)
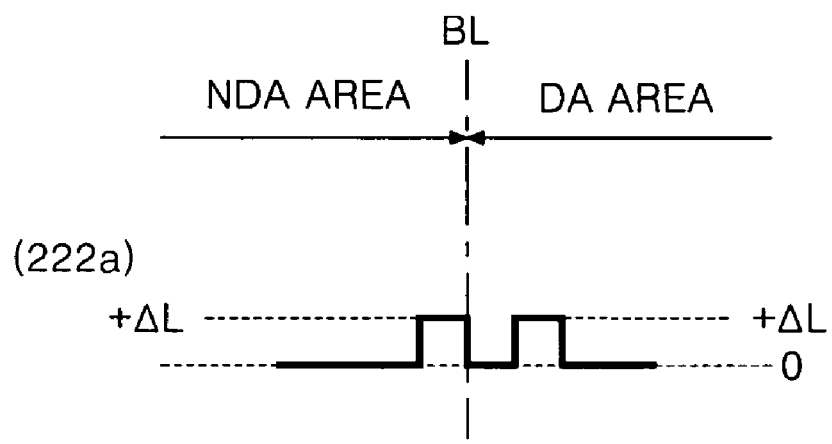
(222a)
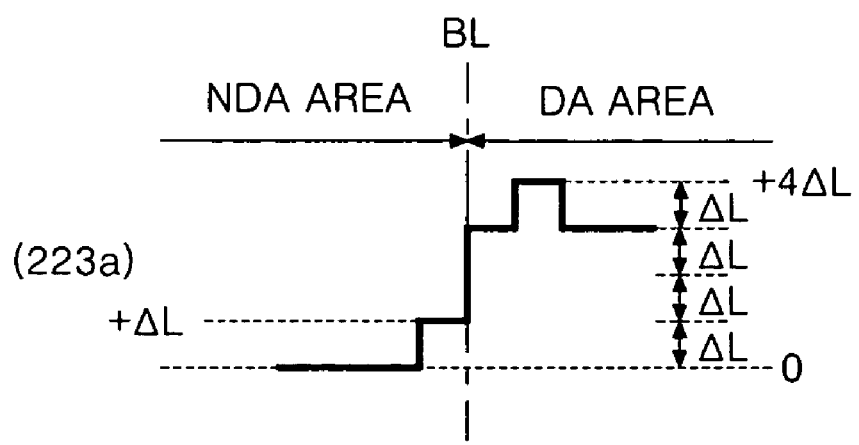
(223a)

FIG.26A
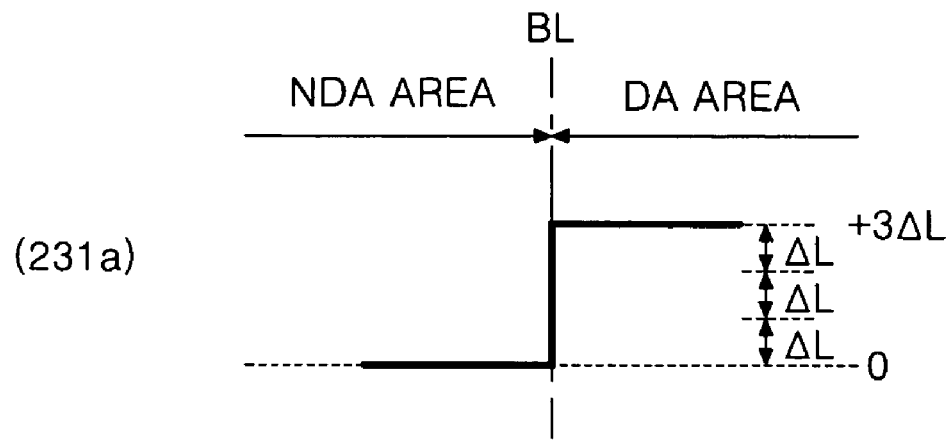
(231a)
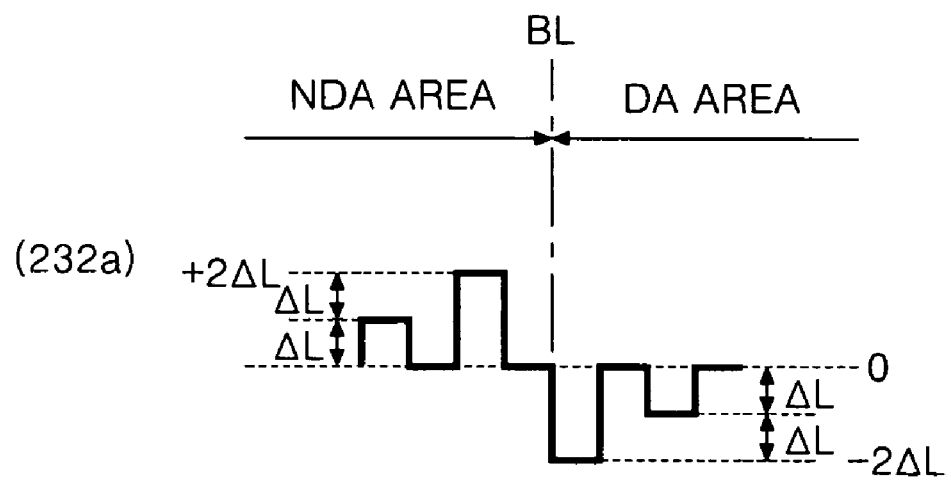
(232a)
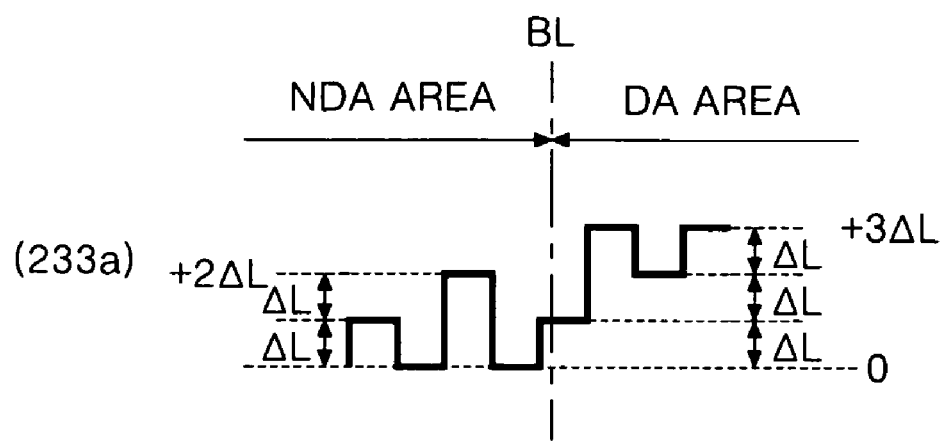
(233a)

FIG.26B
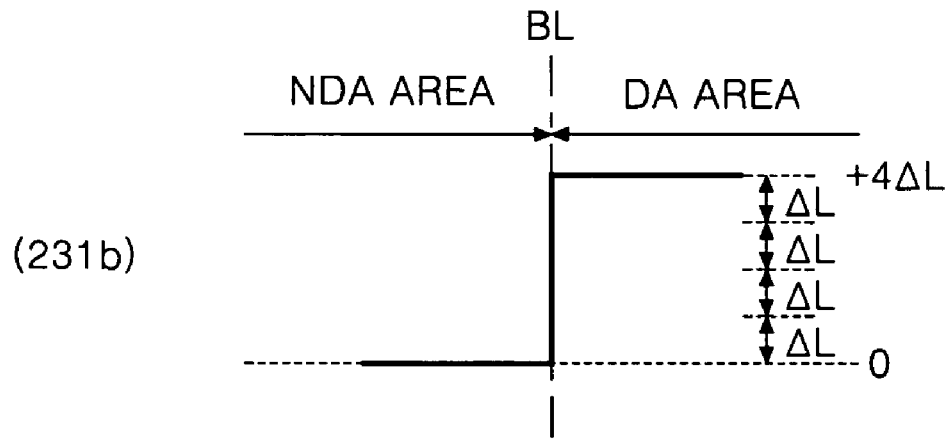
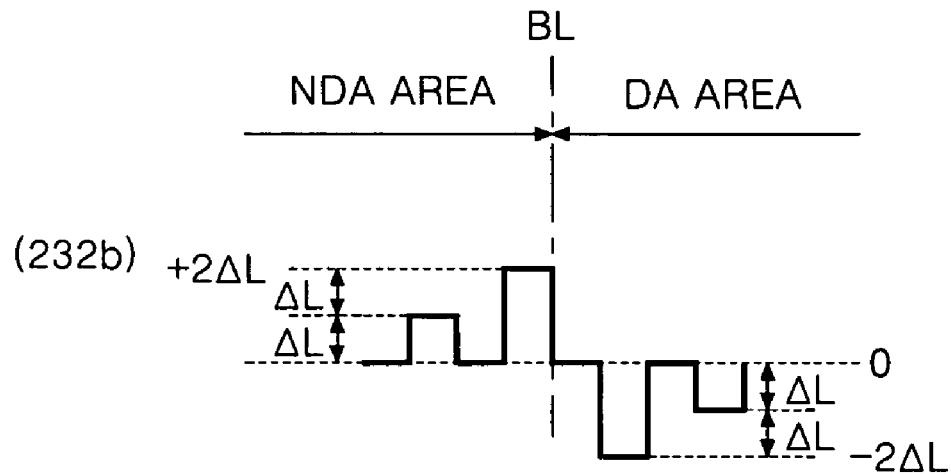
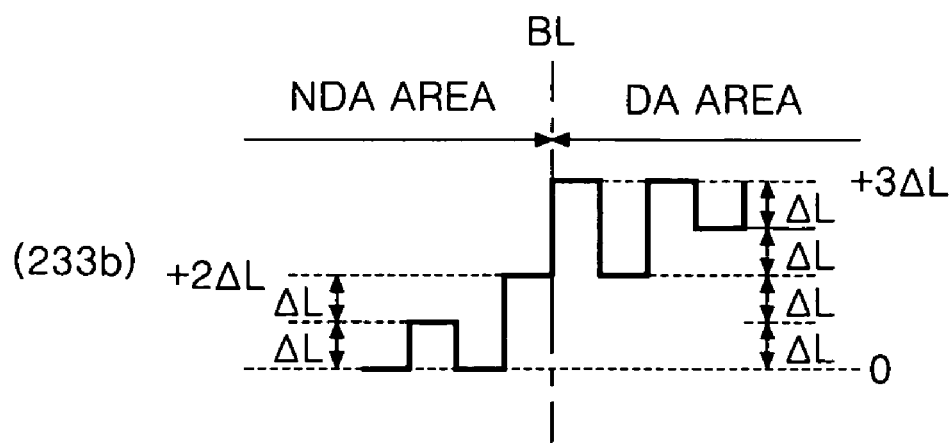

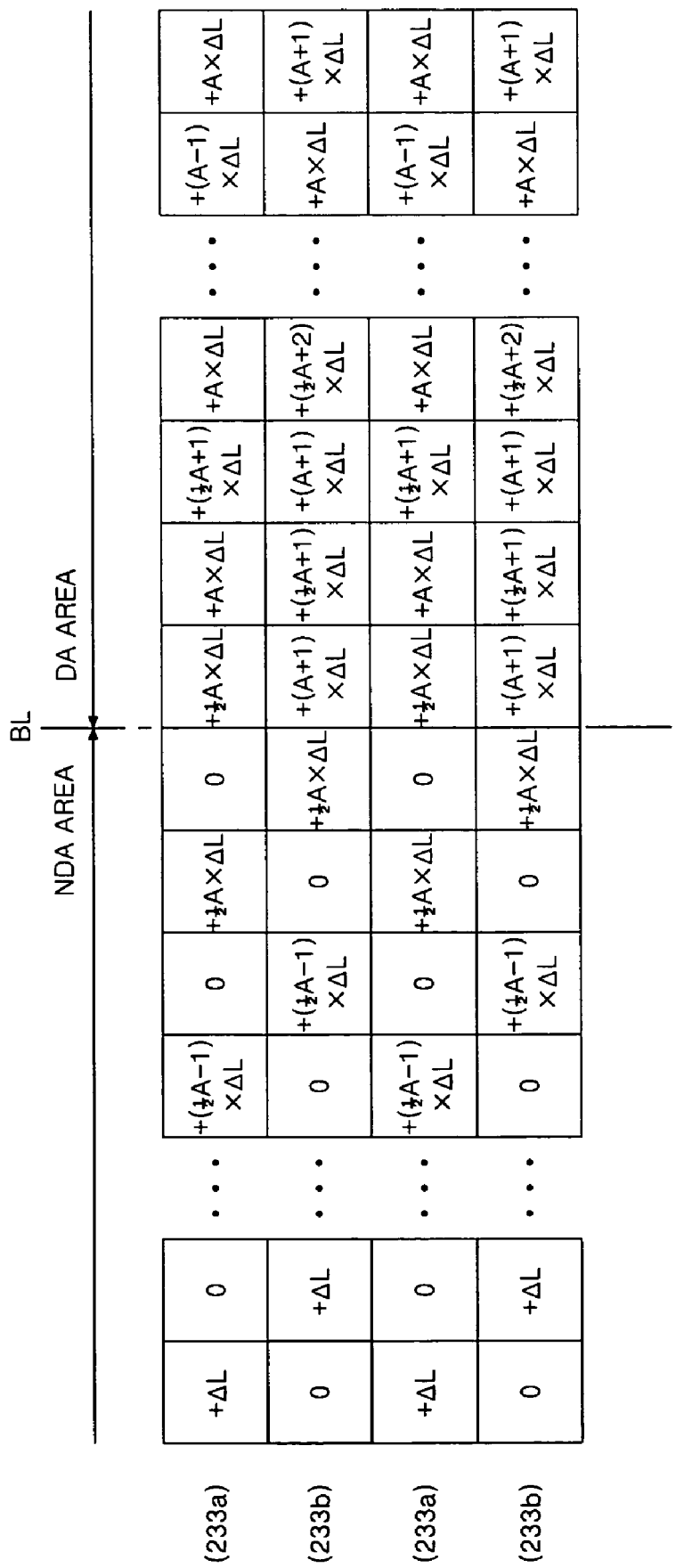

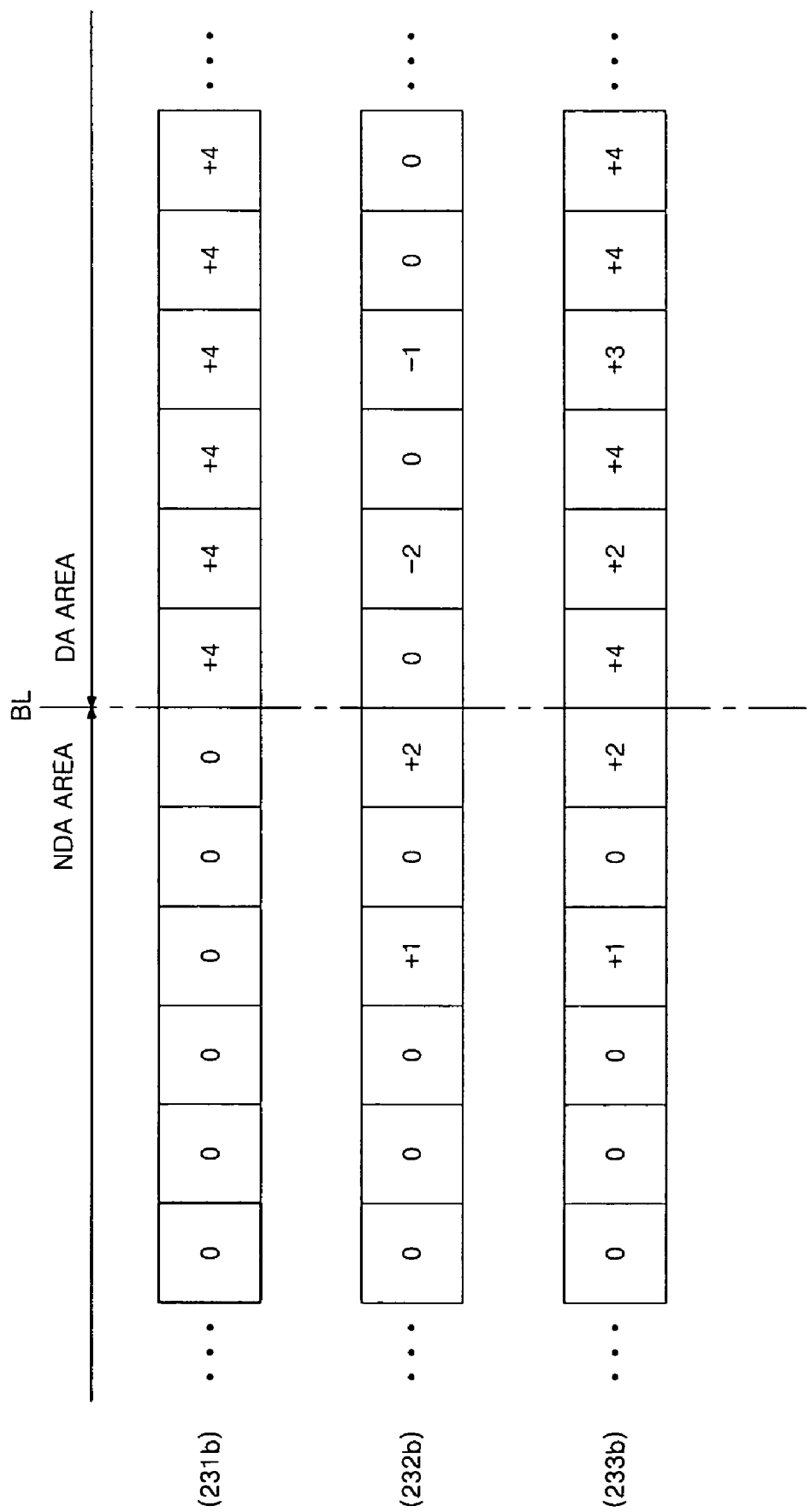

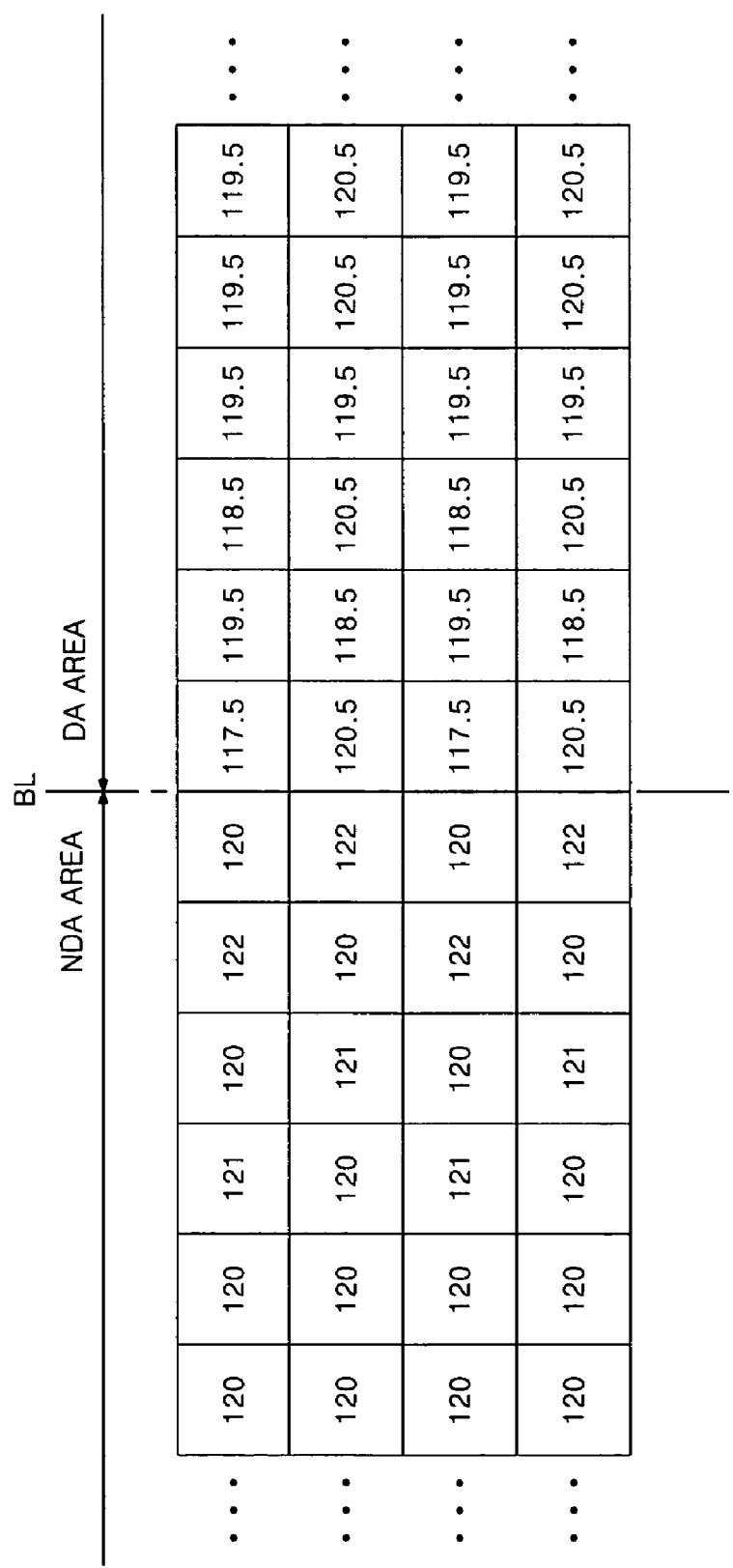

FABRICATING METHOD AND FABRICATING APPARATUS THEREOF, AND PICTURE QUALITY CONTROLLING METHOD AND APPARATUS THEREOF

This application claims the benefit of Korean Patent Application No. P2005-0118959 filed in Korea on Dec. 7, 2005, which is hereby incorporated by reference.

BACKGROUND OF THE INVENTION

1. Field of the Invention

The present invention relates to a flat panel display, and more particularly to a flat panel display, a fabricating method and an apparatus thereof, and a picture quality controlling method and an apparatus thereof that adaptively compensates panel defects with electrical data to improve picture quality.

2. Discussion of the Related Art

Display devices are very important in the information society as a visual information communicating media. Lately, there have been problems in conventional display devices, such as cathode ray tubes (CRT). For example, a CRT display device has a significantly heavy weight and a bulky volume. Due to these problems, there have been developments in various flat panel display devices which can overcome the limitations of such CRT display devices. Such flat panel displays include a liquid crystal display (LCD), a field emission display (FED), a plasma display panel (PDP) and an organic light emitting diode (OLED). Most of these flat panel display devices are put to practical use having significant market share in the display device market.

Flat panel display devices include a display panel for displaying a picture. In these display panels, a mura defect typically can be found as a panel defect during the test process of such display panels. Here, a mura is to be construed as a display spot accompanying brightness difference and chromaticity difference on the display screen. The panel defects are mostly generated in a fabricating process, and typically have a fixed form including a dot, line, belt, circle, and a polygon, or an undetermined form in accordance with the cause of their generation. Examples of the panel defect having such various forms are shown in FIG. 1 to FIG. 3.

FIG. 1 represents a panel defect having an undetermined form. FIG. 2 represents a panel defect of a vertical belt shape. FIG. 3 represents a panel defect of a fixed form. The vertical belt shaped panel defect in FIG. 2 is generated for reasons including overlapping exposure, difference in the lens number. The dot shaped panel defect in FIG. 3 is mainly generated by impurities. Such panel defect appears to be darker or brighter than an ambient non-defect area in the drawings. Further, color difference is made when compared with another non-defect area.

Panel defects can lead to defects of the end products, which ultimately results in low production yield. Further, even if the product with panel defects is successfully shipped as a product, the deterioration of the picture quality due to the panel defect can lower the reliability of the product. Accordingly, various methods have been proposed in order to improve the panel defect. The main approach to improve the panel defect, according to the related art, was to improve the process technology. However, even with an improved process technology, the panel defect can only be relaxed. The panel defect cannot be completely removed according to an improved process technology according to the related art.

SUMMARY OF THE INVENTION

Accordingly, the present invention is directed to a flat panel display, fabricating method and fabricating apparatus thereof, and picture quality controlling method and apparatus thereof that substantially obviates one or more of the problems due to limitations and disadvantages of the related art.

An object of the present invention is to provide a flat panel display, a fabricating method and an apparatus thereof, and a picture quality controlling method and an apparatus thereof that adaptively compensates panel defects with electrical data to improve picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a flat panel display includes, judging a panel defect area and a non-defect area of a display panel, generating a first compensation data for compensating the panel defect area, first modulating a data of the panel defect area by using the first compensation data, judging a brightness at a border between the panel defect area and the non-defect area of the display panel after compensating the panel defect, generating a second compensation data for compensating the border and the panel defect area, second modulating a data of the border and the panel defect area by using the second compensation data, adding the first compensation data and the second compensation data to calculate a resultant compensation data, and storing the resultant compensation data at a data modulation memory.

In another aspect, a fabricating apparatus of a flat panel display includes an inspection device for detecting a border between a panel defect area and a non-defect area, a memory storing a first compensation data for compensating the panel defect area and a second compensation data for compensating the border and the panel defect area, a first panel defect compensation device for modulating a data from the panel defect area by using the first compensation data, a second panel defect compensation device for modulating a data to be supplied to the border and the panel defect area, detected by the inspection device, into the second compensation data, and a memory recorder for recording the first compensation data, the second compensation data, and a resultant compensation data calculated by adding the second compensation data to the first compensation data.

In yet another aspect, a picture quality controlling apparatus of a flat panel display includes a memory for storing a resultant compensation data calculated by adding a first compensation data for compensating a panel defect area of the display panel judged through a first inspection process of a display panel to a second compensation data for compensating the panel defect area and a border between a panel defect area and a non-defect area of the display panel judged through a second inspection process of the display panel, a compensator to supply a modulated data to the border, the panel defect area close to the border, and the non-defect area by using the resultant compensation data stored on the memory, and a driver for displaying the modulated data by the compensator on a display panel.

In yet another aspect, a method of controlling a picture quality of a flat panel display includes storing a resultant compensation data calculated by adding a first compensation data for compensating a panel defect area of the display panel judged through a first inspection process of a display panel to a second compensation data for compensating the panel defect area and a border between a panel defect area and a non-defect area of the display panel judged through a second inspection process of the display panel and the panel defect area, modulating data to be supplied to the border, the panel defect area close to the border and the non-defect area by using the resultant compensation data stored on a memory, and displaying the data modulated to the resultant compensation on a display panel.

In yet another aspect, a flat panel display includes a display panel that is adaptive for displaying a picture by using a video data, a memory for storing a resultant compensation data calculated by adding a first compensation data for compensating a panel defect area of the display panel judged through a first inspection process of the display panel to a second compensation data for compensating the panel defect area and a border between a panel defect area and a non-defect area of the display panel judged through a second inspection process of the display, a compensator for modulating the video data to be supplied to the border, the panel defect area close to the border and the non-defect area by using the resultant compensation data stored on the memory, and a driver for displaying the video data modulated by the compensator on the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 12 is an exemplary block diagram showing a compensation circuit according to a second exemplary embodiment of the present invention;

FIG. 13 is an exemplary block diagram showing a compensation circuit according to a third exemplary embodiment of the present invention;

FIG. 24A to FIG. 24F are exemplary diagrams showing a method of controlling a picture quality of a flat panel display according to the first exemplary embodiment of the present invention in order to compensate a border of the non-defect area and the panel defect area in FIG. 23;

FIG. 25A to FIG. 25F are exemplary diagrams showing the method of controlling the picture quality of the flat panel display according to the second exemplary embodiment of the present invention in order to compensate the border of the non-defect area and the panel defect area in FIG. 23;

FIG. 26A to FIG. 26F are exemplary diagrams showing the method of controlling the picture quality of the flat panel display according to the third exemplary embodiment of the present invention in order to compensate the border of the non-defect area and the panel defect area in FIG. 23; and FIG. 27A to FIG. 27E are exemplary diagrams specifically showing the method of controlling the picture quality of the flat panel display according to the fourth exemplary embodiment of the present invention.

DETAILED DESCRIPTION OF THE PREFERRED EMBODIMENT

Reference will now be made in detail to the preferred embodiments of the present invention, examples of which are illustrated in the accompanying drawings.

Figure 1:
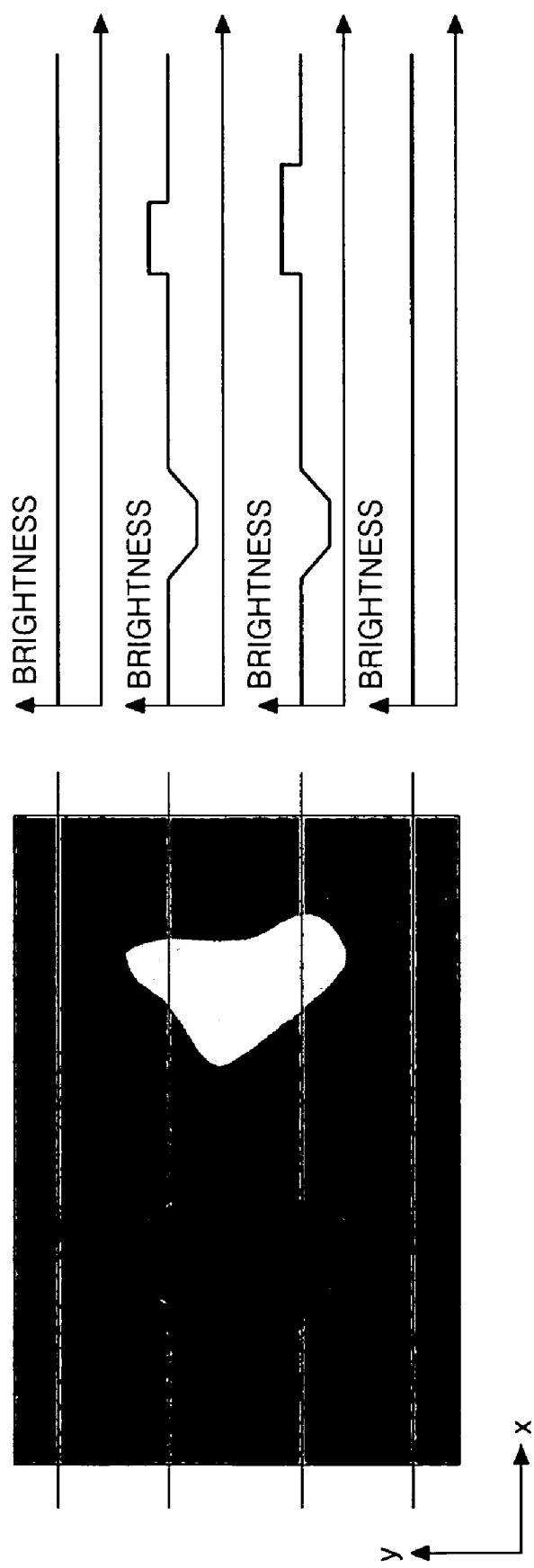
FIG. 1 is an exemplary diagram showing a panel defect with an undetermined form.
Figure 2:
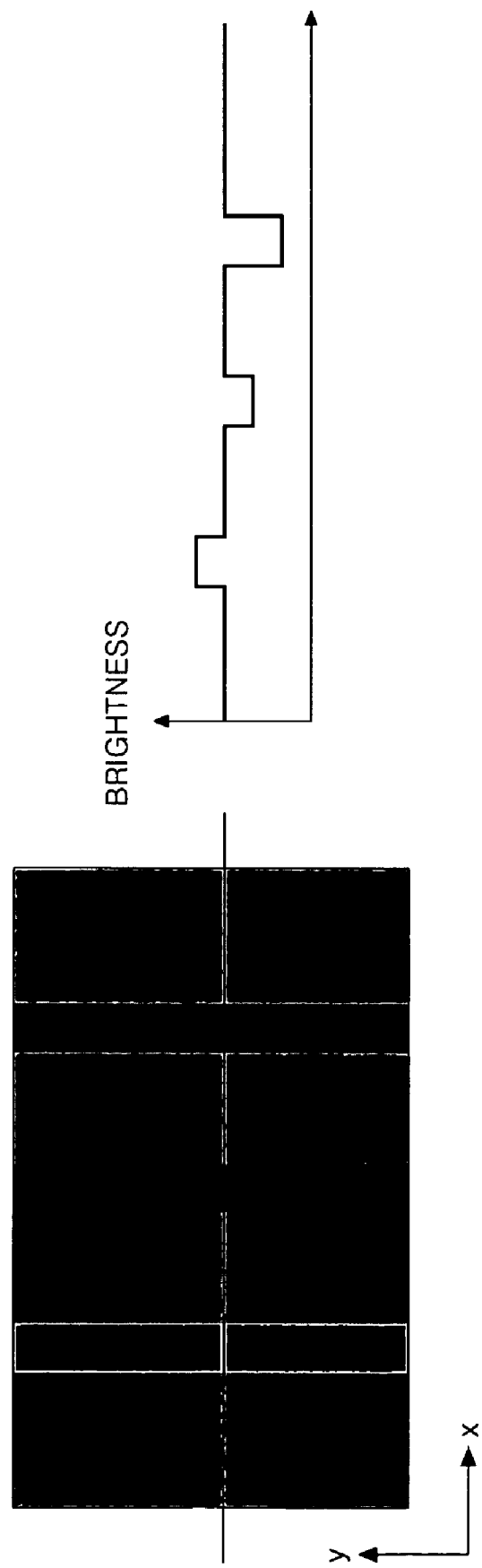
FIG. 2 is an exemplary diagram showing a panel defect with a fixed form of vertical belt shape.
Figure 3:
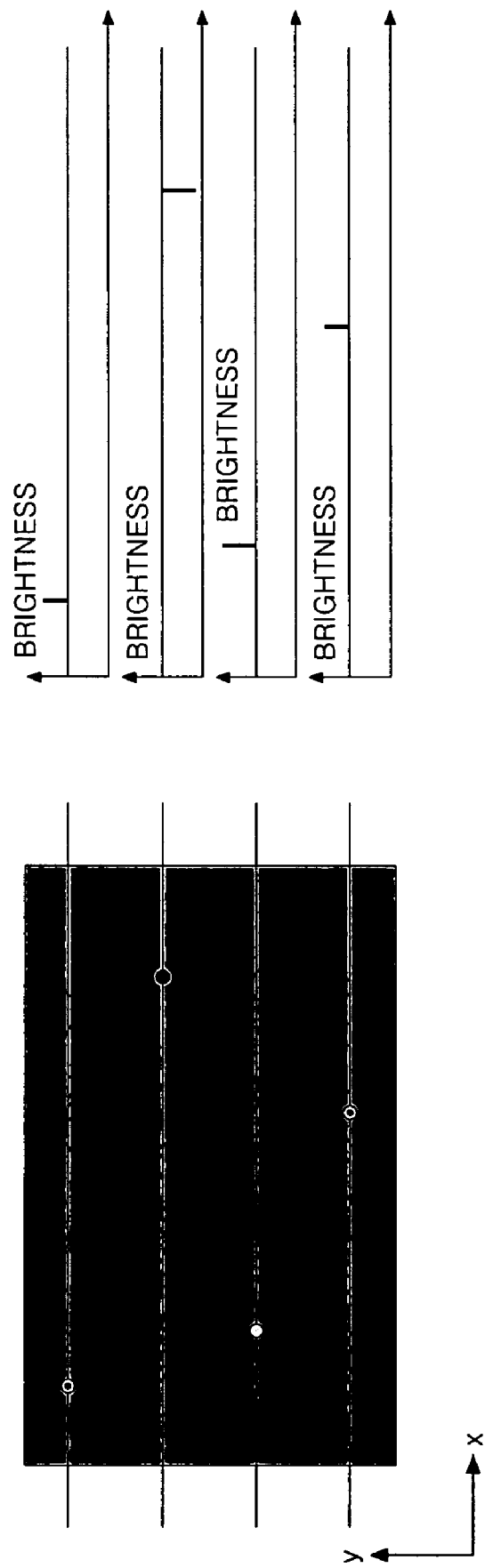
FIG. 3 is an exemplary diagram showing a panel defect with a fixed form.
Figure 4:
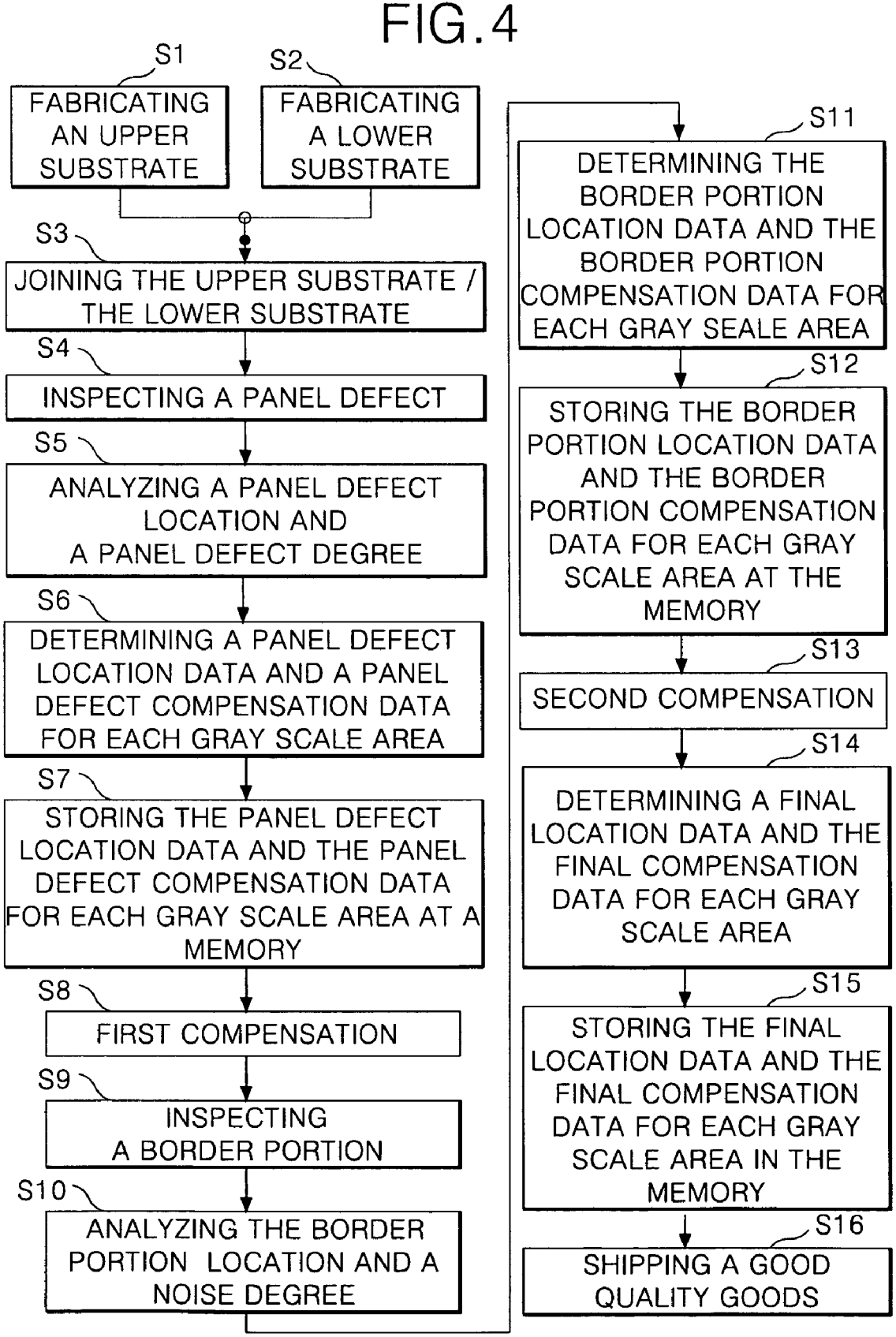
FIG. 4 is an exemplary flow chart showing a step by step method of fabricating a flat panel display according to an exemplary embodiment of the present invention.

A method of fabricating the flat panel display according to an exemplary embodiment of the present invention is shown in FIG. 4. After an upper substrate and a lower substrate are manufactured, the upper and lower substrates are joined by a sealant or a frit glass in steps S1, S2 and S3. Next, in step S4, a test data of each gray scale level on a flat panel display in which the upper and lower substrates are joined is applied to the flat panel display in the inspection process of the flat panel display to display a test picture and a panel defect. In other words, a display stain is inspected by an electrical inspection and/or macrography on the picture in the inspection process of the flat panel display. If the panel defect is found on the flat panel display in the inspection process, a location generating the panel defect and a panel defect degree is analyzed, in step S5. After determining a panel defect location data and a panel defect compensation data for each gray scale area in a panel defect judging process of the flat panel display (step S6), the exemplary embodiment of the present invention stores the panel defect location data and the panel defect compensation data for each gray scale area at a non-volatile memory, in step S7. Examples of non-volatile memory, in a panel defect compensation data recording process of the flat panel display, includes an Electrically Erasable Programmable Read Only Memory (EEPROM) that is adaptive for renewing and removing a data, and Extended Display Identification Data ROM (EDID ROM). In this case, the panel defect location data and the panel defect compensation data for each gray scale area are differentiated in accordance with a location and a degree of the panel defect.

On the other hand, in the driver circuit of the flat panel display, a gray scale range of a discrete brightness distribution is displayed on the display panel by using a binary data, i.e., a digital video data. The minimum brightness difference that is adaptive for displaying by the drive circuit is '$\Delta L$'. This difference is measured between gray scale levels adjacent to each other within a gray scale range. The $\Delta L$ might have a different value for each flat panel display depending on the data processing capacitance of the drive circuit included in the flat panel display or a variety of a picture processing methods. For example, $\Delta L$ in a flat panel display having a drive circuit of 6 bits processing capacitance and a drive circuit of 8 bits processing capacitance have different values. Further, flat panel displays having a drive circuit of the same bit processing capacitance can also have a different $\Delta L$ value depending on whether or not a picture processing method is adjusted.

If the flat panel display has a difference of $\Delta L$, the brightness of the panel defect area is compensated. In other words, the panel defect area is either increased or decreased in such a manner to have $\Delta L$ distance to approach a brightness of the non-defect area. However, when the difference from the brightness of the non-defect area is less than $\Delta L$, it is difficult to compensate.

Figure 5A:
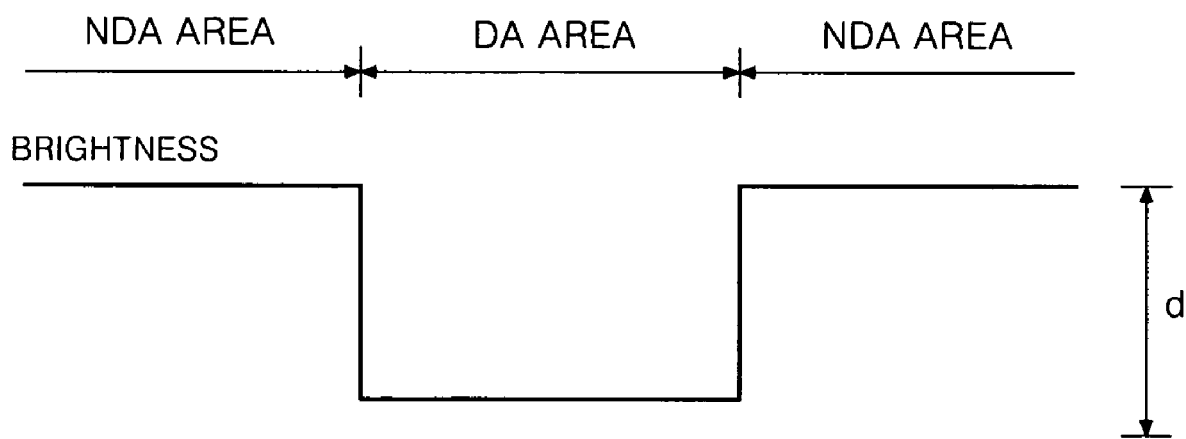
FIG. 5A to FIG. 5C are exemplary diagrams showing a brightness difference between a panel defect area and a non-defect area after compensating a brightness of a panel defect area by using a panel defect compensation data.
Figure 5B:
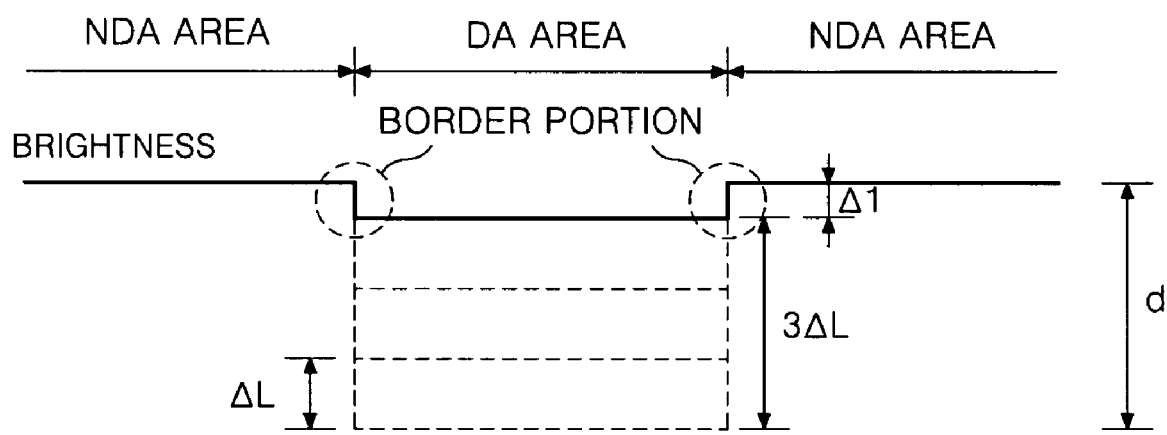
Figure 5C:
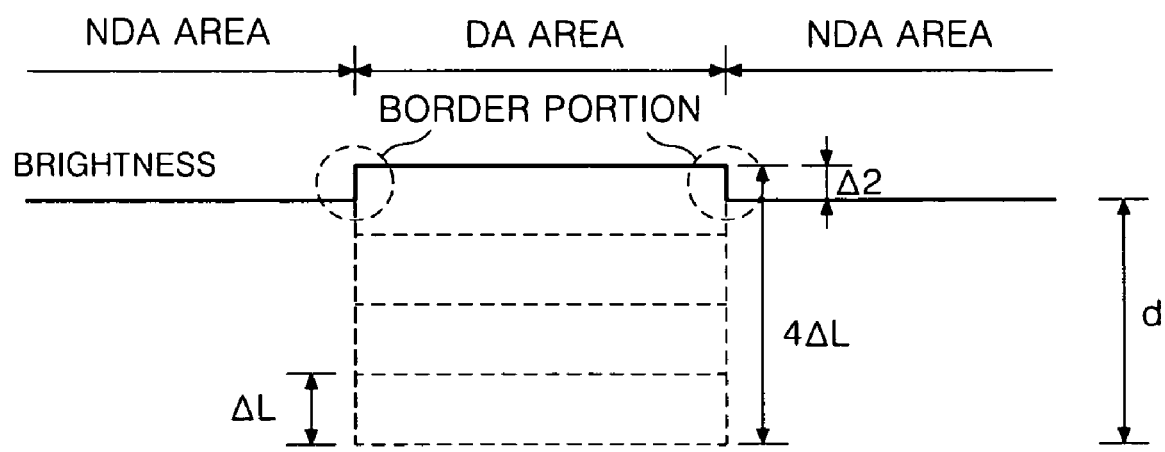

For example, as shown in FIG. 5A, when the brightness difference between the panel defect area and the non-defect area is 'd', if the brightness of the panel defect area is increased by $3\Delta L$ using the compensation, a brightness deviation having approximately $\Delta 1$ is generated shown in FIG. 5B, and if the brightness of the panel defect area is increased by $4\Delta L$ using the compensation, the brightness deviation having approximately $\Delta 2$ is generated shown in FIG. 5C. A compensation for deviations of brightness less than $\Delta L$, such as $\Delta 1$ and $\Delta 2$, is difficult. Thus, in the brightness deviation, a noise between the panel defect area and the non-defect area is generated in the border portion.

Accordingly, the method of fabricating the flat panel display according to the present invention, in step S8, carries out the first panel defect compensation using the compensation data stored at the non-volatile memory in the step S7, and inspects the border portion in step S9. If a border portion noise is generated, the method sets a border portion noise compensation data for compensating the border portion noise, and carries out the second panel defect compensation using the border portion noise compensation data. In other words, a data of the panel defect area is modulated by using the panel defect location data stored at the EEPROM and the panel defect compensation data for each gray scale area, and the modulated data is applied to the flat panel display to display the test picture. Next, the border portion noise of the panel defect area and the non-defect area are inspected by a second electric inspection and/or a second naked eye inspection on the picture in steps S8 and S9.

In the border portion noise inspection process, if the noise is generated at the border portion of the panel defect area and/or the non-defect area, the method according to the present invention, in step S10, analyzes the location where the noise is generated and the degree of the noise. Further, the border portion noise judging process determines the border portion noise location data and the border portion noise compensation data for each gray scale area of the flat panel display, in step S11. Then in the border portion noise compensation data recording process, the border portion noise location data and the border portion noise compensation data for each gray scale area of the flat panel display is stored at the non-volatile memory used in step S7, in step S12. Herein, the border portion noise location data and the border portion noise compensation data for each gray scale area are differentiated in accordance with the location and the degree of the noise.

Next, the border portion noise location data and the border portion noise compensation data for each gray scale area are modulated to display the test picture in step S13. If the border portion noise is found not to be greater than an allowable reference value in the second test picture, the noise location data and the border portion noise compensation data for each gray scale area determined in the step S11 are added to the panel defect location data and the panel defect compensation data for each gray scale area determined in the step S6 to calculate the final compensation location data and the resultant compensation data for each gray scale area (step S14). The final compensation location data and the resultant compensation data for each gray scale area are stored at the non-volatile memory used in the step S7 and S12 (step S15). As a result, if the degree of the border portion noise is found not to be greater than an allowable reference value, in step S16, the flat panel display is judged as a good product to be shipped.

In the above-mentioned exemplary embodiments, the compensation data are calculated through the above-mentioned step in order to simplify the fabricating process. However, in actual mass-producing processes, patterns of a plurality of formulaic compensation data corresponding to the panel defect and a variety of patterns of the border portion noise is collected into the database by repeated experiments. Thus, after a simple inspection process, optimum compensation data patterns corresponding to the panel defect and the brightness difference of the border area are selected among the formulaic patterns to calculate an optimum compensation data at one time.

The fabricating method of the flat panel display device according to the present invention will now be described in detail. A method of fabricating the liquid crystal display device according to the present invention includes a substrate cleaning process, a substrate patterning process, an alignment film forming/rubbing process, a substrate joining/liquid crystal injecting process, a mounting process, an inspection process, and a repairing process.

In the substrate cleaning process, impurities with which the substrate surface of the liquid crystal display device is contaminated are removed with a cleaning solution. The substrate patterning process includes a patterning process of an upper plate (color filter substrate) and a patterning process of a lower plate (TFT array substrate). Color filters, a common electrode, a black matrix, etc. are formed in the substrate of the upper plate. In the substrate of the lower plate, signal wire lines such as data lines and gate lines are formed. A TFT is formed at an area of intersection between the data lines and the gate lines. A pixel electrode is formed at a pixel area between the gate line and the data line connected to a source electrode of the TFT. In the alignment film forming/rubbing process, an alignment film is coated on each of the upper and lower plates and the alignment film can be rubbed with a rubbing cloth. In the substrate joining/liquid crystal injecting process, the upper substrate and the lower substrate are joined together by use of a sealant. Liquid crystal and spacers are injected through a liquid crystal injection hole, and then the liquid crystal injection hole is sealed off. In the mounting process, a tape carrier package (hereinafter, referred to as "TCP") on which integrated circuits (hereinafter, referred to as "IC"), such as a gate drive IC and a data drive IC are mounted, is connected to a pad portion on the substrate. The drive IC can be mounted directly on the substrate by a chip-on-glass (COG) method instead of a tape automated bonding (TAB) method using the foregoing TCP. The inspection process includes an electrical inspection carried out after the various signal wire lines and the pixel electrodes are formed in the lower substrate. An electrical inspection and a macrography carried out after the substrate joining/liquid crystal injecting process. As the result of the panel defect and the border portion noise inspection process carried out after the substrate joining/liquid crystal injecting process, if the panel defect and the border portion noise are found, a location data and a compensation data on the panel defect and the border portion noise are determined. Then a final location data and a compensation data calculated by integrating the location data and the compensation data on the panel defect, and the location data and the compensation data on the border portion noise are stored at the EEPROM or the EDID ROM. Here, the EEPROM or the EDID ROM is mounted on a printed circuit board PCB of the liquid crystal display. A compensation circuit for modulating an input digital video data by using the data of the EEPROM or the EDID ROM, and a timing controller for supplying the data from the compensation data to a data drive circuit and for controlling an operation timing of the data drive circuit and a scan drive circuit are mounted together on the printed circuit board. The compensation circuit can be embedded in the timing controller. The drive circuit of the liquid crystal display which is judged to be a final good product qualified for shipping includes the EEPROM or the EDID ROM, and the compensation circuit along with the timing controller, the data drive circuit and the scan drive circuit.

Figure 6:
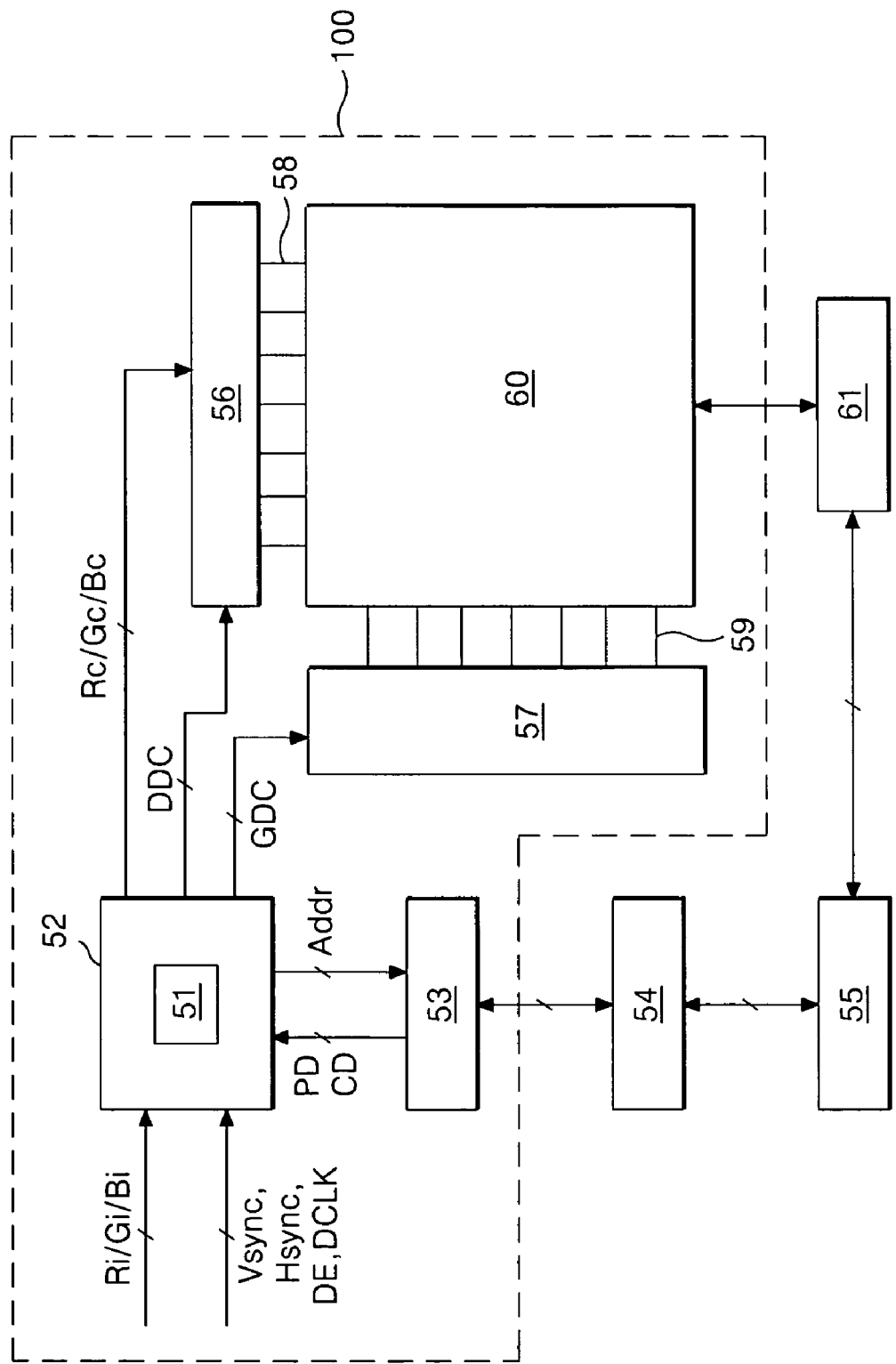
FIG. 6 is an exemplary block diagram showing a flat panel display, an inspection device and a panel defect compensation device according to the exemplary embodiment of the present invention.

FIG. 6 shows the fabricating apparatus of the flat panel display according to an exemplary embodiment of the present invention. As shown in FIG. 6, the fabricating apparatus of the flat panel display according to the exemplary embodiment of the present invention includes a ROM recorder 54 that is adaptive for connecting to an EEPROM 53, a computer 55 connected to the ROM recorder 54, and a inspection device 61 connected to the computer 55. A flat panel display 100 includes a flat panel display panel 60 wherein the data lines 58 and scan lines 59 cross each other to form pixels that are arranged in a matrix type, a data drive circuit 56 for supplying a compensated digital video data Rc/Gc/Bc to the data lines 58, a scan driver circuit 57 for sequentially supplying a scan pulse to the scan lines 59, and a timing controller 52 for controlling the drive circuits 56 and 57. Such a flat panel display device 100 can be implemented by display devices including a liquid crystal display (LCD), a field emission display (FED), a plasma display panel (PDP) and an organic light emitting diode (OLED).

A compensation circuit 51 is embedded into the timing controller 52. The compensation circuit 51 increases and decreases the compensation data at an input digital video data Ri/Gi/Bi corresponding to the panel defect and a location of the border portion noise to modulate the digital video data. The compensation circuit 51 will be described in detail later. The timing controller 52 supplies the digital video data Ri/Gi/Bi modulated by the compensation circuit 51 and an unmodulated digital video data Ri/Gi/Bi that corresponds to the non-defect area to the data drive circuit 56. The timing controller 52 generates a data drive control signal DDC, which controls the operation timing of the data drive circuit 56 and a gate drive control signal GDC, which controls the operation timing of the gate drive circuit 57 by use of vertical and horizontal synchronization signals Vsync, Hsync, a dot clock DCLK and a data enable signal DE. The data drive circuit 56 converts the digital video data Rc/Gc/Bc compensated from the timing controller 52 into an analog voltage or current which can express a gray scale level, and supplies the data to the data lines 58. The scan drive circuit 57 sequentially applies a scan pulse to the scan lines, which is controlled by the timing controller 52 to select a horizontal line of pixels which are to be displayed.

The inspection device 61 supplies the test data to the data lines 58 and test scan pulses to the scan lines 59 to inspect the picture displayed in the flat panel display device with a picture measuring device or a naked eye when the drive circuits are not connected to the flat panel display panel 60. Also, the inspection device 61 is controlled by the computer 55 to modulate the test data with the location data and the compensation data of the panel defect stored at the EEPROM 53. Then the inspection device 61 supplies the modulated test data and the test scan pulse to the flat panel display panel 60. The inspection device 61 inspects the test picture displayed on the flat panel display panel 60 under the control of the computer 55. During this process, the inspection device 61 adjusts the gray scale level of the test data by gray scale levels from the lowest gray scale level (or peak black gray scale level) to the highest gray scale level (or peak white gray scale level). The test data should have a resolution of at least 8 bits.

The computer 55 receives a brightness measuring value of pixels for each gray scale level which are measured by the inspection device 61. The computer 55 then calculates a brightness difference between pixels to judge the location of the pixels having a difference in the brightness when compared to another pixel in the pixel defect area, and to calculate the compensation data for compensating the brightness difference between the location data of the panel defect area and the panel defect area. A brightness value of each gray scale pixel of the panel defect area border portion and the non-defect area border portion measured by the inspection device 61 is entered into the computer 55 to calculate the brightness difference between the pixels, and to judge the location of the pixels having a difference in brightness when compared to other pixels in the border portion, and to calculate the compensation data for compensating the location data of the border portion noise and the border portion noise. The computer 55 integrates the calculated panel defect location data, the panel defect compensation data, the border portion noise location data and the border portion noise compensation data to calculate a final location data and a final border portion compensation data. The computer 55 further supplies the calculated location data and the compensation data to the ROM recorder 54. The computer 55 then allows the ROM recorder 54 to renew the location data and the compensation data stored at the EEPROM 53 or the EDID ROM by transmitting the renewal data to the ROM recorder 54. The transmitting of the renewal data is performed by using a communication standard protocol such as I2C, in case the renewal of the location data and the compensation data is needed. The renewal of the location data and the compensation data can be needed due to the change of process condition and the difference between applied models. It is also needed if the renewal data of the location data and the compensation data are inputted by an operator.

On the other hand, in the compensation circuit 51 which will be further described, a location data PD will be employed as an inclusive means including the location data of the panel defect, the location data of the border portion noise and the final location data. Also a compensation data CD will be employed as an inclusive means including the compensation data of the panel defect, the compensation data of the border portion noise and the resultant compensation data. The ROM recorder 54 supplies the location data PD and the compensation data CD from the computer 55 to the EEPROM 53. Here, the ROM recorder 54 can transmit the location data PD and the compensation data CD to the EEPROM 53 through a user connector. The location data PD and the compensation data CD can be transmitted in series through the user connector, a serial clock, and a ground power.

On the other hand, the location data PD and the compensation data CD are transmitted to the EDID ROM instead of the EEPROM 53. The user connector and the EDID ROM can store the location data PD and the compensation data CD to a separate storage space. The EDID ROM stores seller/manufacturer identification information ID and the variables and characteristics of the basic display device as monitor information data instead of the panel defect compensation data such as the location data PD and the compensation data CD. If the panel defect compensation data is stored at the EDID ROM instead of the EEPROM 53, the ROM recorder 54 transmits the panel defect compensation data via a DDC (Data Display Channel). Accordingly, if the EDID ROM is used, the EEPROM 53 and the user connector can be removed, so that it becomes possible to reduce the cost for development. Hereinafter, as an exemplary embodiment, a memory to be stored as the panel defect compensation data will be the EEPROM 53. However, the EEPROM 53 the user connector can be replaced by the EDID ROM and the DDC, respectively, as in another embodiment to be described subsequently.

Figure 7:
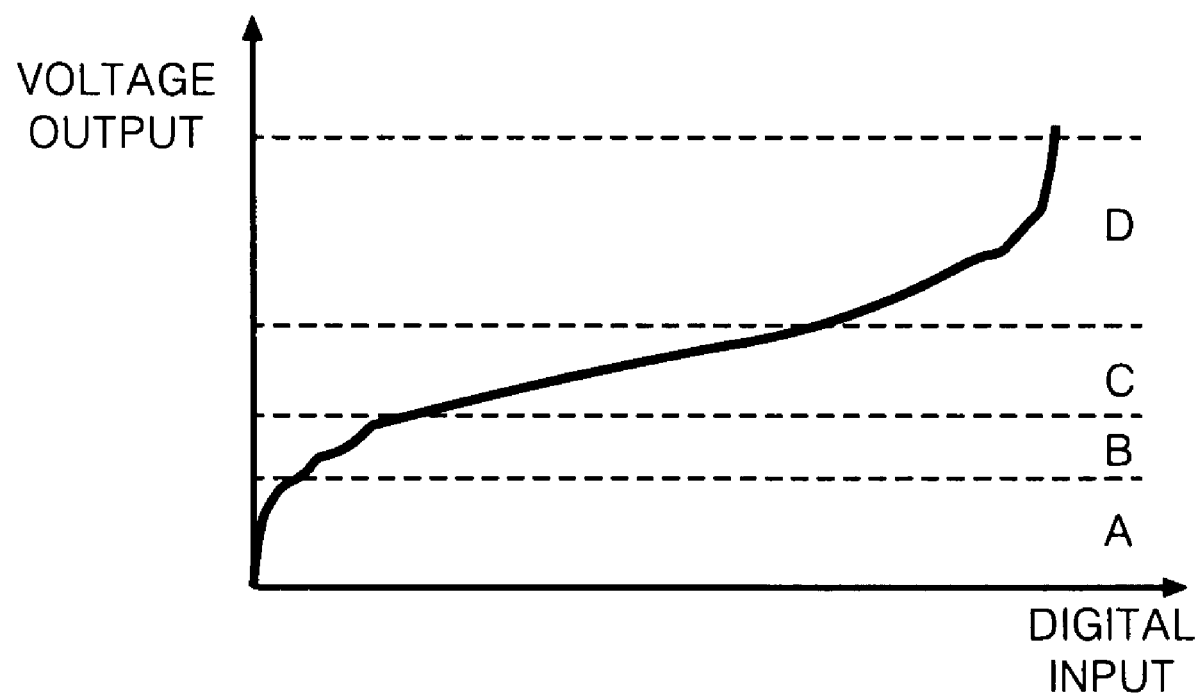
FIG. 7 is an exemplary diagram showing a gamma compensation curve of an example in which a panel defect compensation data is set in such a manner to divide into each gray scale level and each gray scale section.

The compensation data stored at the EEPROM 53 should be optimized for each location. Further, the compensation data should be optimized for each gray scale in consideration of gamma characteristics shown in FIG. 7. Accordingly, the compensation data CD can be set for each gray scale level in each of R, G and B, or can be set for each gray scale level section (A, B, C and D) including plurality of gray scale levels in FIG. 7. For example, the compensation data CD can be set to be an optimized value for each location, i.e., '+1' in a '1' location, '−1' in a '2' location and '0' in a '3' location. The compensation data CD can further be set to be an optimized value for each gray scale level section, i.e., '0' in a 'gray scale level section A', '0' in a 'gray scale level section B', '1' in a 'gray scale level section C' and '1' in a 'gray scale level section D'. Accordingly, the compensation data CD can be made different for each gray scale level in the same location, and also to be different for each location in the same gray scale level. The compensation data CD are set to have the same value of one pixel in each of R, G and B data after the individual brightness corrections, i.e. by the unit of one pixel including R, G and B sub-pixels. Further, the compensation data CD are set to be different in each of the R, G and B data when correcting the color difference. For example, if red color appears in a specific panel defect location, an R compensation value becomes lower than G, B compensation values. The EEPROM 53 stores the location data PD, the compensation data CD and a gray scale level area information (sections A, B, C and D in FIG. 6) in the form of a look-up table. The EEPROM 53 supplies the location data PD and the compensation data CD from the corresponding address to the compensation circuit 51 in response to an address control signal from the compensation circuit 51 which is embedded in the timing controller 52.

Figure 8:
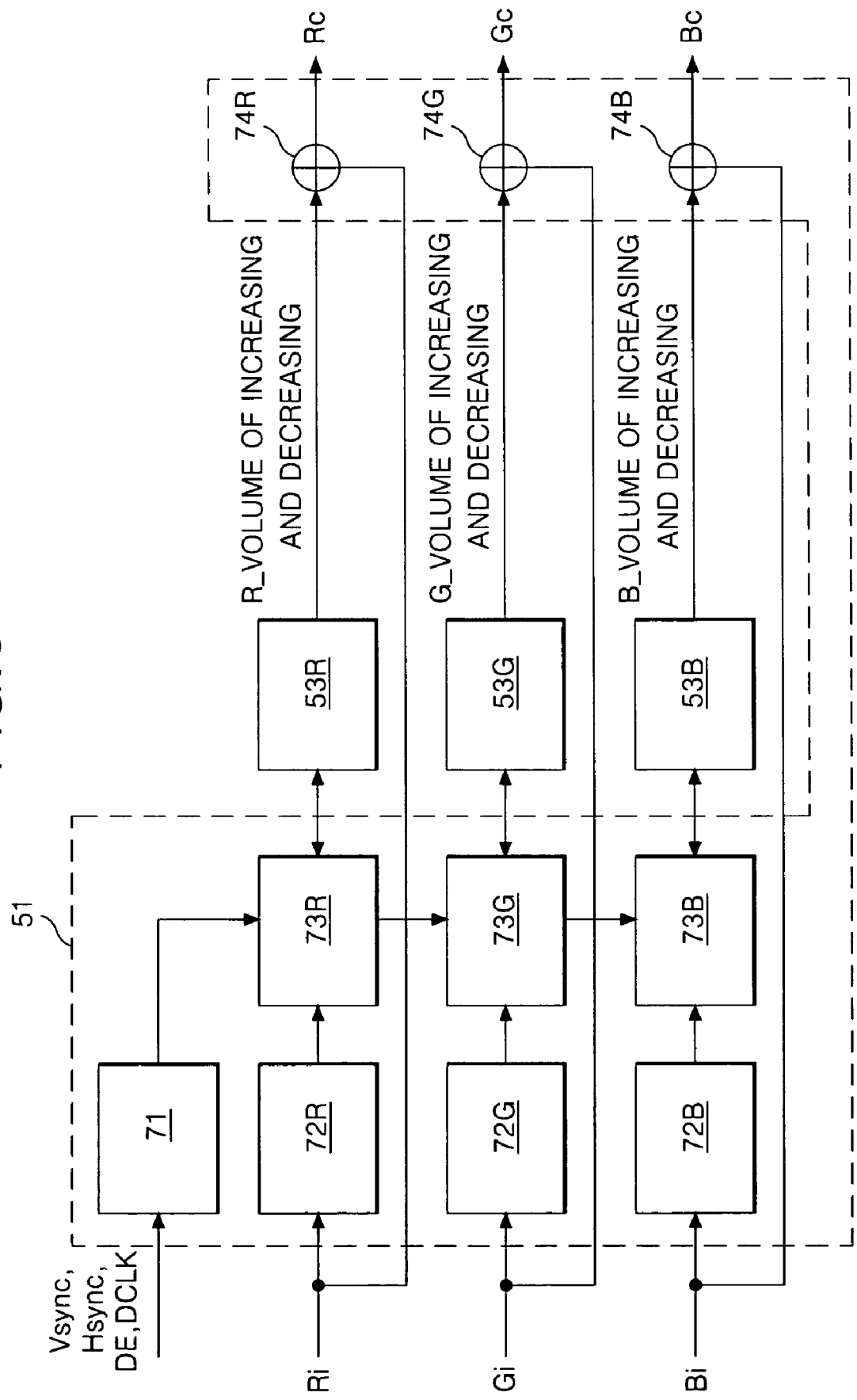
FIG. 8 is an exemplary block diagram showing a compensation circuit according to a first exemplary embodiment of the present invention.
Figure 9:
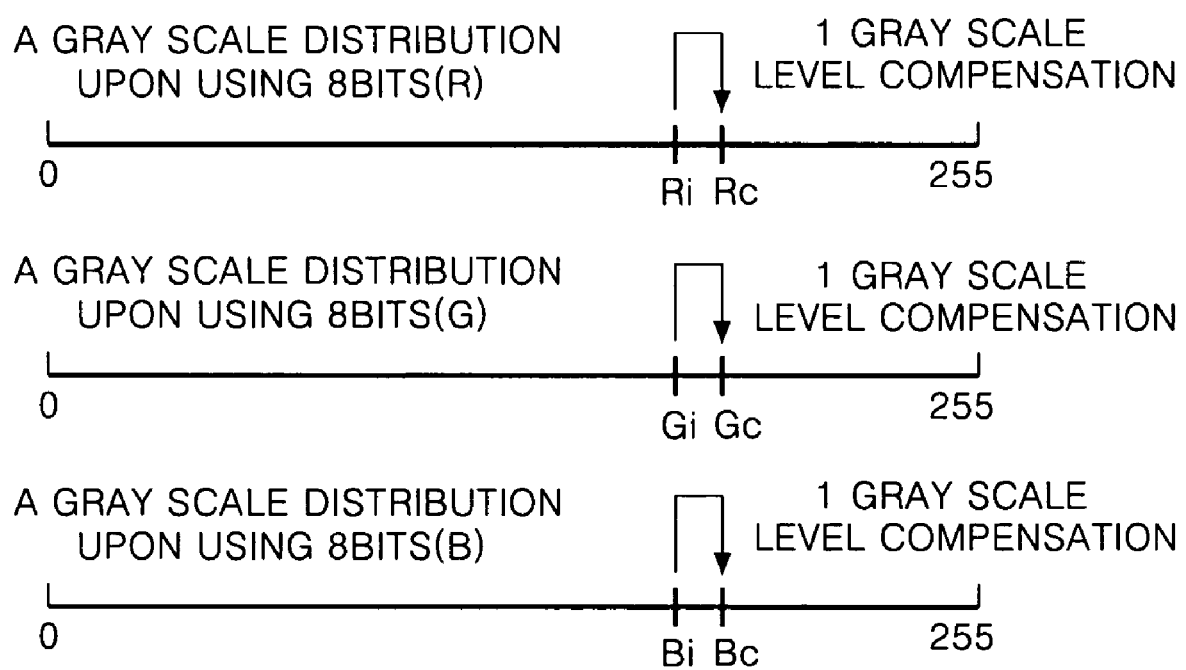
FIG. 9 and FIG. 10 are exemplary diagrams showing examples of a panel defect compensation result of the compensation circuit shown in FIG. 8.
Figure 10:
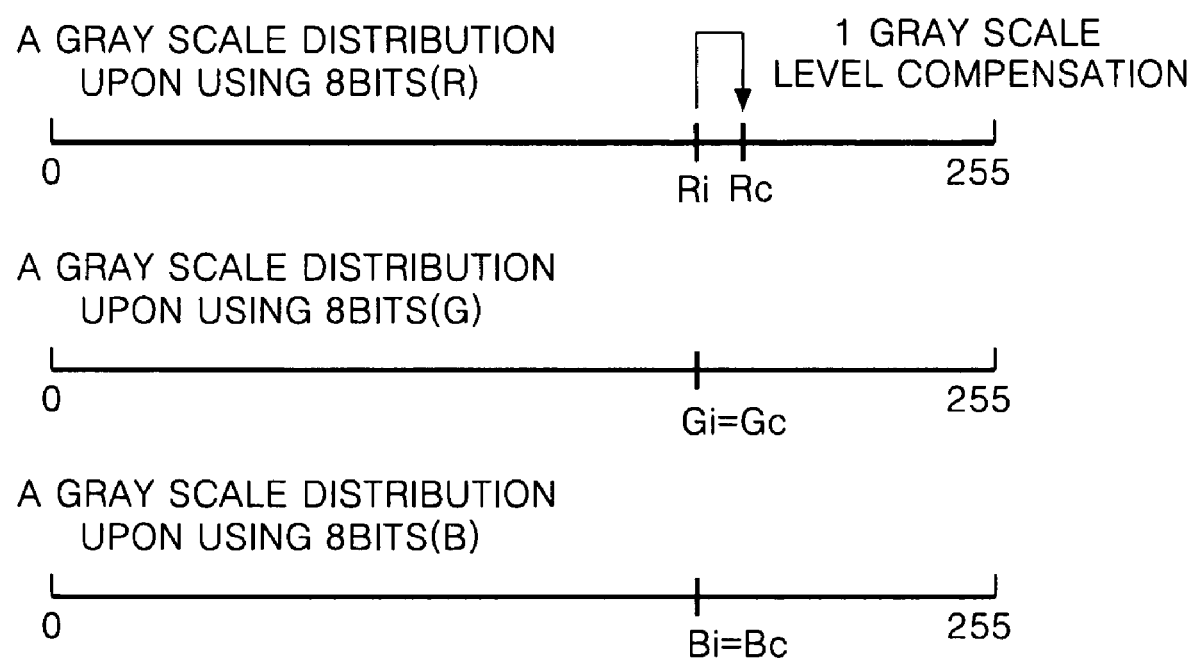

FIGS. 8-10 are diagrams for explaining a first exemplary embodiment of the compensation circuit 51 and an operation thereof. As shown in FIG. 8, the compensation circuit 51 includes a location judging portion 71, gray scale level judging portions 72R, 72G and 72B, address generators 73R, 73G and 73B, and calculators 74R, 74G and 74B. The EEPROM 53 includes a first to third EEPROM 53R, 53G and 53B, each storing the compensation data CD and the location data PD for red R, green G and blue B, respectively. The data stored at the first to third EEPROMs 53 are different for each EEPROM in the same location and the same gray scale level when the panel defect is compensated by the unit of sub-pixel or during color correction. On the other hand, the data are the same in each of the EEPROMs in the same location and the same gray scale level when the panel defect is compensated by the unit of pixels including three sub-pixels of red, green and blue or during brightness correction. The location judging portion 71 judges the display location of the input digital video data Ri/Gi/Bi using the vertical/horizontal synchronization signals Vsync, Hsync. The input digital video data Ri/Gi/Bi enable signal DE and the dot clock DCLK. The gray scale level judging portions 72R, 72G and 72B analyze the gray scale level of the input digital video data Ri/Gi/Bi of red R, green G and blue B. The address generator 73R, 73G and 73B generates a read address for reading the compensation data CD of the panel defect location to supply to the EEPROM 53R, 53G and 53B if the display location of the input digital video data Ri/Gi/Bi corresponds to the panel defect location by referring to the location data PD of the EEPROM 53R, 53G and 53B. The compensation data CD outputted from the EEPROM 53R, 53G and 53B in accordance with the address are supplied to the calculators 74R, 74G and 74B. The calculators 74R, 74G and 74B add the compensation data CD to or subtract the compensation data CD from the input digital video data Ri/Gi/Bi to modulate the input digital video data Ri/Gi/Bi which is to be displayed in the panel defect location. Here, the calculators 74R, 74G and 74B may include a multiplier or a divider which can multiply the compensation data CD to or divide the compensation data CD from the input digital video data Ri/Gi/Bi. In one example of the panel defect compensation result by the compensation circuit 51, the R compensation data, the G compensation data and the B compensation data are identically set to be '1'. The gray scale level of the input digital video data Ri/Gi/Bi to be displayed at the panel defect location, which is lower by one gray scale level than the non-defect location, is increased by one in each color. As a result, the brightness of the panel defect location can be compensated, as shown in FIG. 9. Further, in another example of the panel defect compensation result by the panel defect compensation circuit 51, the R compensation data is set to be '1' and the G compensation data and B compensation data are set to be '0'. As a result, the color difference of the input digital video data Ri/Gi/Bi to be displayed at the panel defect location, which is lower in the purity of red color than the non-defect location, can be compensated, as shown in FIG. 10.

Figure 11A:
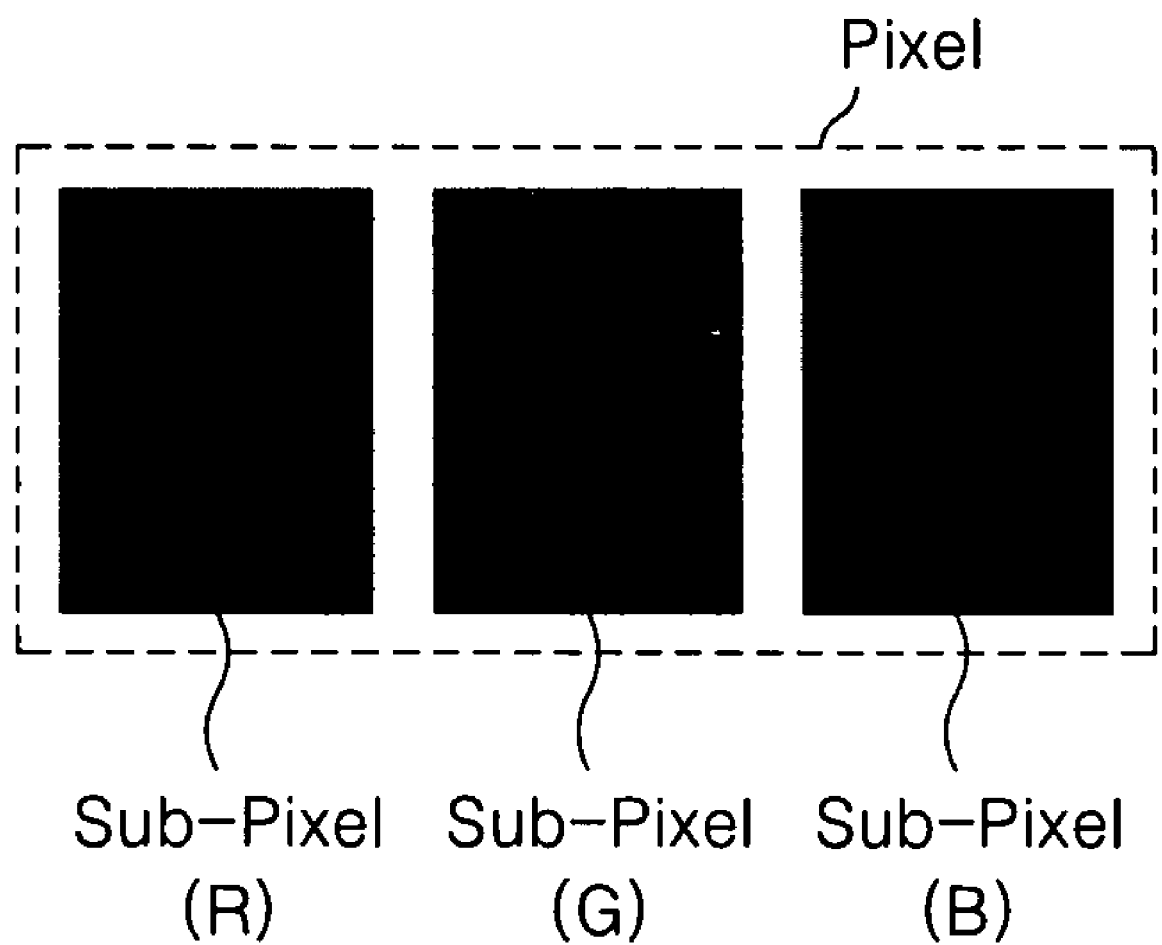
FIG. 11A and FIG. 11B are exemplary diagrams showing two examples of a pixel arrangement.
Figure 11B:
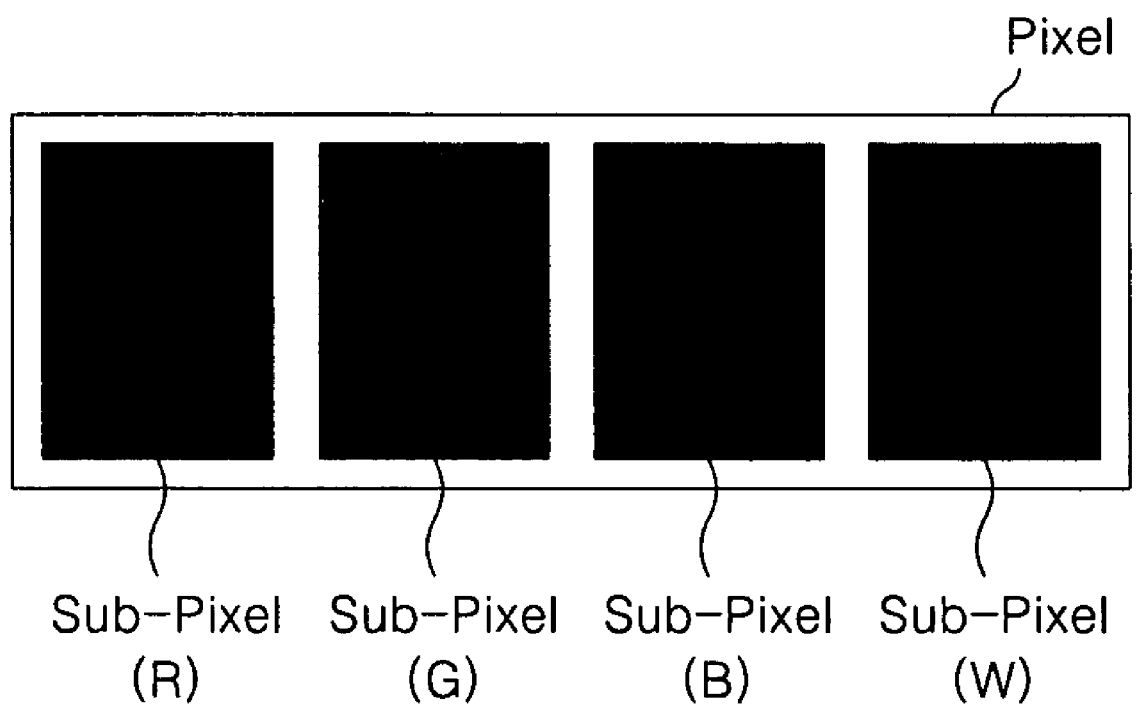

One pixel of the flat panel display panel 60 may include three sub-pixels of red R, green G, blue B as shown in FIG. 11A. However, one pixel of the flat panel display panel 60 can also include four sub-pixels of red R, green G, blue B and white W as shown in FIG. 11B. In order to modulate the white data W of the panel defect location in the pixel arrangement as in FIG. 11B, the compensation circuit 51 according to a second exemplary embodiment of the present invention further includes a gray scale level judging portion 72W, an address generator 73W and a calculator 74W, as shown in FIG. 12. The EEPROM 53 further includes a third EEPROM 53W at which the compensation data for the white data in the panel defect location are stored in the form of a look-up table. If the white data Wi are compensated in this way, the brightness compensation in the panel defect location can be performed more easily. On the other hand, the white data Wi are determined from a brightness information Y which is calculated by taking the input digital video data Ri/Gi/Bi of red, green and blue as variables.

FIG. 13 represents a compensation circuit 51 and an EEPROM 53Y according to a third exemplary embodiment of the present invention. As shown in FIG. 13, the compensation circuit 51 according to the present invention includes a first converter 120, a location judging portion 121, a gray scale level judging portion 122, an address generator 123, a calculator 124, and a second converter 125. The EEPROM 53Y stores the panel defect brightness compensation data for each location and for each gray scale level that is modulating the brightness information Yi of the input digital video data Ri/Gi/Bi, which are to be displayed at the panel defect location. The first converter 120 calculates a color difference information UiVi and a brightness information Yi of n/n/n (n is an integer larger than m) bits using the following Mathematical Formulas 1 to 3, which take the input digital video data Ri/Gi/Bi having m/m/m bits.

$$Yi=0.299Ri+0.587Gi+0.114Bi \quad \text{Mathematical Formula 1:}$$

$$Ui=-0.147Ri-0.289Gi+0.436Bi=0.492(Bi-Y) \quad \text{Mathematical Formula 2:}$$

$$Vi=0.615Ri-0.515Gi-0.100Bi=0.877(Ri-Y) \quad \text{Mathematical Formula 3:}$$

The location judging portion 121 judges the display location of the input digital video data (Ri/Gi/Bi) using vertical and horizontal synchronization signals Vsync and Hsync, a data enable signal DE and a dot clock DCLK. The gray scale level judging portion 122 analyzes the gray scale level of the input digital video data Ri/Gi/Bi using the brightness information from the first converter 120. The address generator 127 generates a read address for reading the panel defect brightness compensation data of the panel defect location. This read address is supplied to the EEPROM 53Y if the display location of the input digital video data Ri/Gi/Bi corresponds to the panel defect location. This correspondence is obtained by the panel defect location data of the EEPROM 53Y. The output panel defect brightness compensation data from the EEPROM 53Y are supplied to the calculator 124 according to the address. The calculator 124 adds the panel defect brightness compensation data of the EEPROM 53Y to or subtracts the panel defect brightness compensation data of the EEPROM 53Y from the brightness information Yi of n bits in the first converter 120. This process is for modulating the brightness of the input digital video data Ri/Gi/Bi to be displayed at the panel defect location. Here, the calculator 124 may instead include a multiplier or divider which can multiply the panel defect brightness compensation data to or divide the panel defect brightness compensation data from the brightness information Yi of n bits.

The brightness information Yc modulated by the calculator 124 increases or decreases the extended brightness information Yi of n bits. Therefore, it is possible to adjust the brightness of the input digital video data Ri/Gi/Bi to the factional portion. The second converter 125 calculates the modulated data Rc/Gc/Bc of m/m/m bits using Mathematical Formulas 4 to 6.

$$R=Yc+1.140Vi \quad \text{Mathematical Formula 4:}$$

$$G=Yc-0.395Ui-0.581Vi \quad \text{Mathematical Formula 5:}$$

$$B=Yc+2.032Ui \quad \text{Mathematical Formula 6:}$$

The second converter 125 takes the brightness information Yc modulated by the calculator 124 and the color difference information UiVi from the first converter 120 as variables. In this way, the panel defect compensation circuit according to a third exemplary embodiment of the present invention converts the R/G/B video data, which is to be displayed in a panel defect location, into a brightness component and a color difference component. By noticing that a human eye is more sensitive to the brightness difference than to the color difference, the panel defect compensation circuit according to the third exemplary embodiment of the present invention adjusts the brightness of the panel defect location by extending the number of bits of Y data which include the brightness information among them, thereby enabling control of the brightness at the panel defect location of the flat panel display.

The panel defect compensation circuit 51 according to fourth to sixth exemplary embodiments of the present invention adjusts the data, which is to be displayed at the panel defect location, using frame rate control (hereinafter, referred to as 'FRC') and dithering, which are known as methods for adjusting picture quality. The frame rate control and dithering will be explained in reference to FIG. 14 to FIG. 16.

In the frame rate control, let us first assume that there is one pixel where a '0' gray scale level and a '1' gray scale level are sequentially displayed for four frames. If the pixel displays the '0' gray scale level for three frames and the '1' gray scale level for the one frame that is left, an observer feels a '¼' gray scale level for the four frames due to an integral effect of his retina, as shown in (A) of FIG. 14. On the other hand, if the same pixel displays the '0' gray scale level for two frames and the '1' gray scale level for the other two frames, the observer feels a '½' gray scale level for the four frames due to an integral effect of his retina, as shown in (B) of FIG. 14. If the same pixel displays the '0' gray scale level for one frame and the '1' gray scale level for the three other frames, the observer feels a '¾' gray scale level for the four frames due to an integral effect of his retina, as shown in (C) of FIG. 14.

In the dithering, let us assume that there is a unit pixel window including four pixels P1, P2, P3 and P4. If the three pixels P1, P3 and P4 within the unit pixel window display the '0' gray scale level and the pixel P2 displays the '1' gray scale level, an observer feels a '¼' gray scale level in the unit pixel window for the corresponding period, as shown in (A) of FIG. 15. On the other hand, if the two pixels P1, P4 within the unit pixel window display the '0' gray scale level and the other two pixels P2 and P3 display the '1' gray scale level, the observer feels a '½' gray scale level in the unit pixel window for the corresponding period, as shown in (B) of FIG. 15. If one pixel P1 within the unit pixel window displays the '0' gray scale level and the other three pixels P2, P3 and P4 display the '1' gray scale level, the observer feels a '¾' gray scale level in the unit pixel window for the corresponding period, as shown in (C) of FIG. 15.

Figure 15:
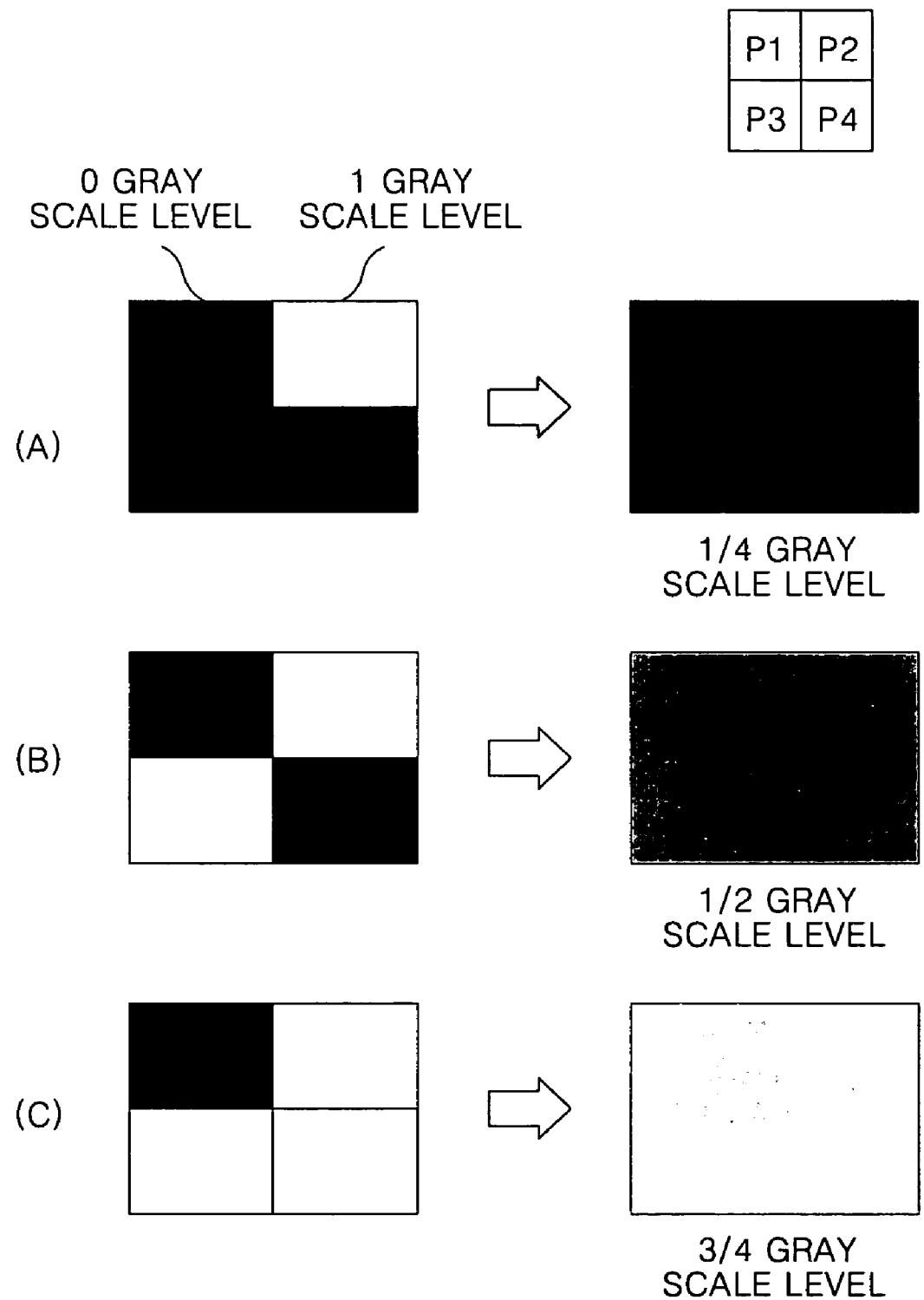
FIG. 15 is an exemplary diagram showing a dithering.
Figure 16:
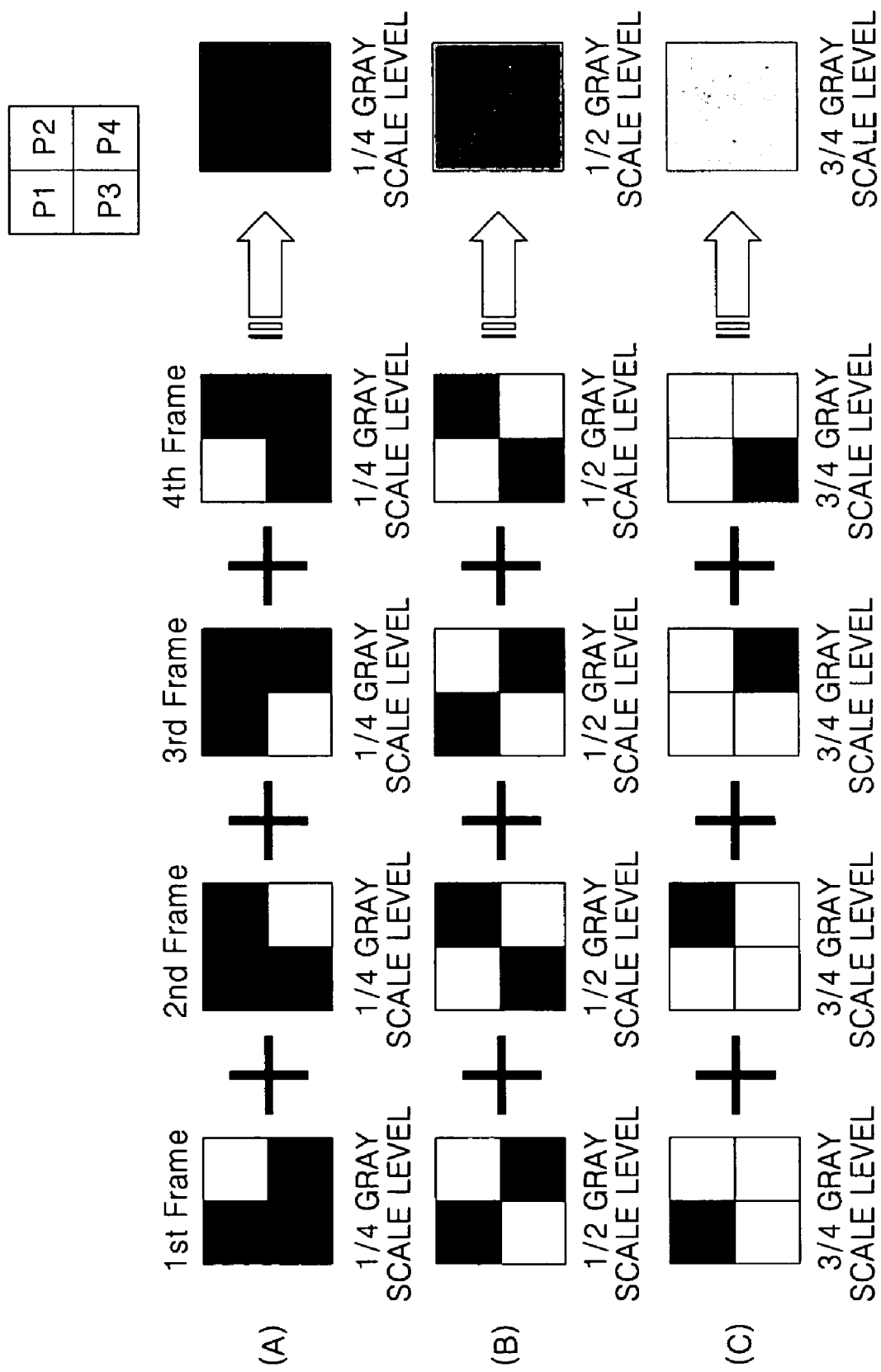
FIG. 16 is an exemplary diagram showing the frame rate control and the dithering.

The present invention not only uses each of the frame rate control and dithering, but also adjusts the data at the panel defect location by combining the frame rate control with the dithering, as shown in FIG. 16, in order to reduce both the deterioration of resolution which appears in the dithering and the flicker phenomenon which is generated in the frame rate control. In FIG. 15, let us assume that a unit pixel window inclusive of four pixels P1, P2, P3 and P4 is sequentially displayed for four frames. If the unit pixel window displays the '¼' gray scale level, where the '1' gray scale level is displayed, during one pixel and further is made for all four frames, as shown in (A) of FIG. 16, an observer feels that the gray scale level of the unit pixel window is the '¼' gray scale level for the four frames, while not feeling the flicker and the resolution deterioration. On the other hand, if the unit pixel window displays the '½' gray scale level or the '¾' gray scale level while two or three pixels, where the '1' gray scale level is displayed, are made to be different every frame for the four frames, as shown in (B) and (C) of FIG. 16, the observer feels that the gray scale level of the unit pixel window is the '½' or '¾' gray scale level for the four frames, and again the observer does not feel the flicker and the resolution deterioration. In the present invention, both the number of frames of the frame rate control, and the number of pixels included in the unit pixel window in the dithering can be adjusted.

Figure 14:
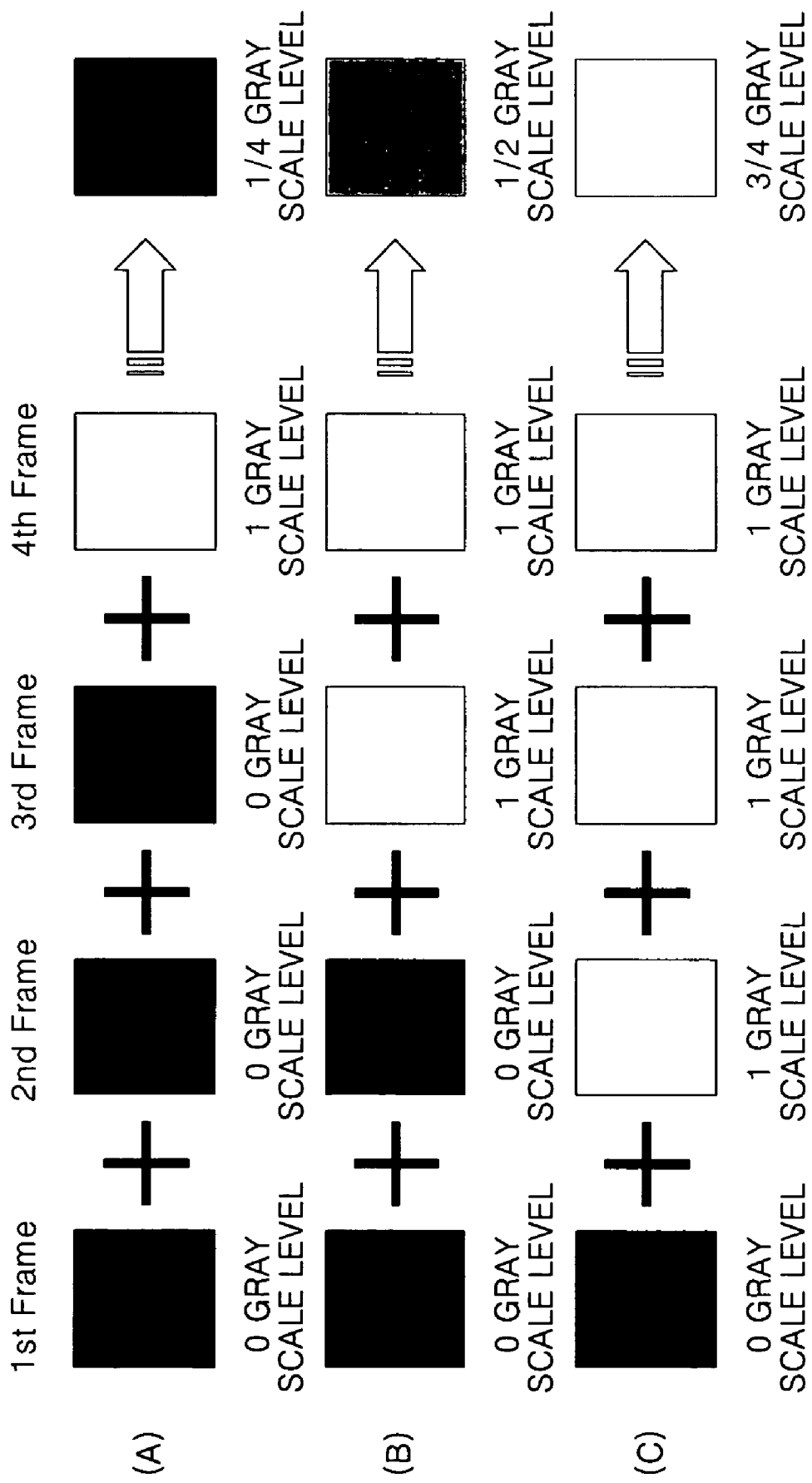
FIG. 14 is an exemplary diagram showing a frame rate control.
Figure 17:
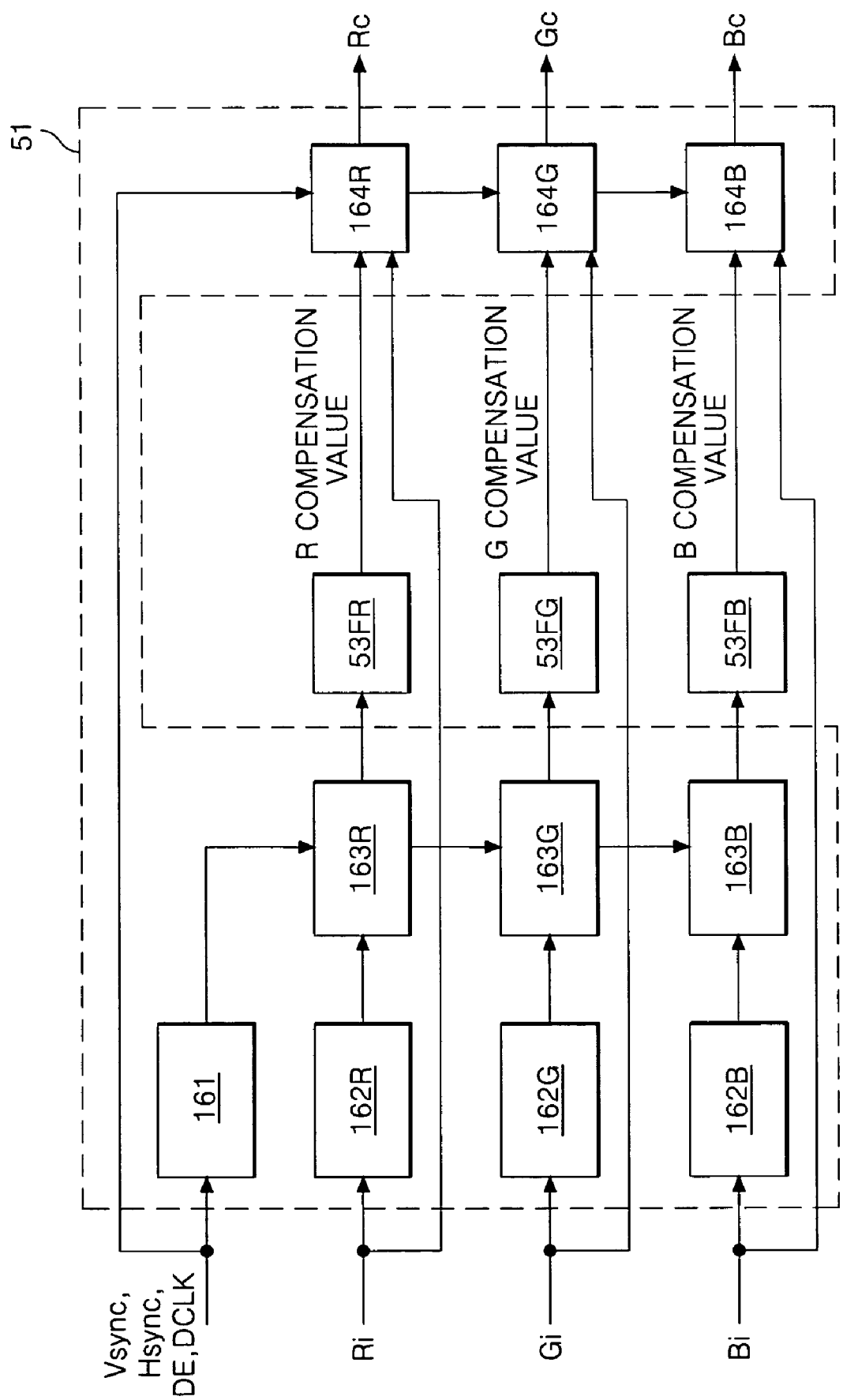
FIG. 17 is an exemplary block diagram showing a compensation circuit according to a fourth exemplary embodiment of the present invention.

FIG. 17 represents the compensation circuit 51 and an EEPROM 53 according to a fourth exemplary embodiment of the present invention. As shown in FIG. 17, the compensation circuit 51 includes a location judging portion 161, gray scale level judging portions 162R, 162G and 162B, address generators 163R, 163G and 163B, and FRC controllers 164R, 164G and 164B. The EEPROM 53 includes first to third EEPROM 53FR, 53FG and 53FB, each storing the compensation data CD and the location data PD thereof for colors red R, green G and blue B, respectively. The location judging portion 161 judges the display location of the input digital video data Ri/Gi/Bi using vertical and horizontal synchronization signals Vsync and Hsync, a data enable signal DE and a dot clock DCLK. The gray scale level judging portions 162R, 162G and 162B analyze the gray scale level of the input digital video data Ri/Gi/Bi for colors red R, green G and blue B, respectively. The address generators 163R, 163G and 163B generate a read address for reading the compensation data CD of the panel defect location to supply to the EEPROMs 53FR, 53FG and 53FB if the display location of the input digital video data Ri/Gi/Bi corresponds to the panel defect location by referring to the location data PD of the EEPROMs 53R, 53G and 53B. The compensation data CD outputted from the EEPROMs 53FR, 53FG and 53FB are supplied to the FRC controllers 164R, 164G and 164B according to the address. The FRC controllers 164R, 164G and 164B modulate the data which are to be displayed at the panel defect location by increasing or decreasing the input digital video data Ri/Gi/Bi by the compensation data CD from the EEPROMs 53FR, 53FG and 53FB. The number and sequence of frames where the compensation data CD are increased or decreased are made different according to the panel defect compensation value, thereby dispersing the compensation data CD to a plurality of frames, as shown in FIG. 14. For example, if the compensation data CD are in the '0.5' gray scale levels, the FRC controllers 164R, 164G and 164B compensate the '0.5' gray scale level by adding the '1' gray scale level to the data of the corresponding panel defect location pixel for two frame periods among the four frames.

Figure 18:
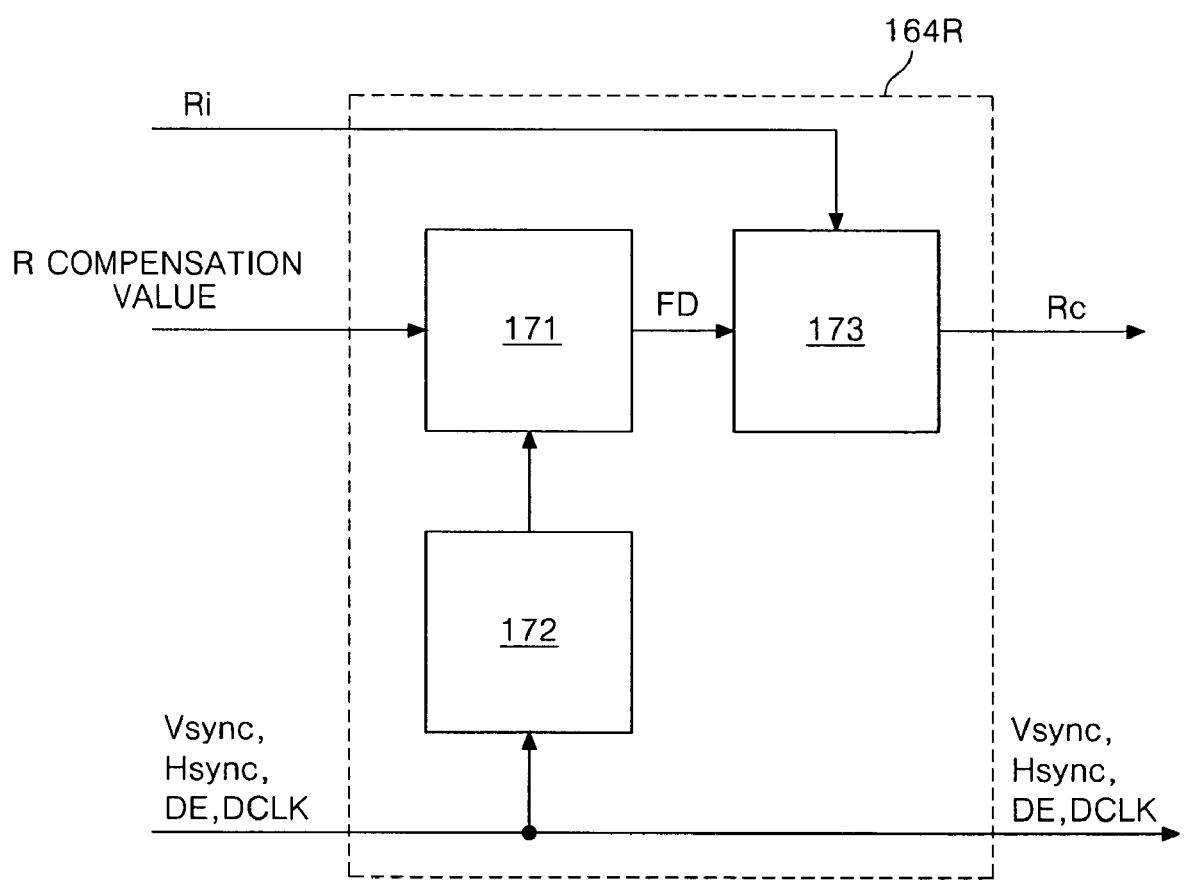
FIG. 18 is an exemplary block diagram specifically showing a first frame rate control (FRC) controller in FIG. 17.

The FRC controllers 164R, 164G and 164B have circuit configurations as shown FIG. 18. While FIG. 18 represents a first FRC controller 164R for correcting red data in detail, second and third controllers 164G and 164B substantially have the same circuit configuration. As shown in FIG. 18, the first FRC controller 164R includes a compensation value judging portion 171, a frame number sensing portion 172 and a calculator 173. The compensation value judging portion 171 judges the R compensation value and generates a FRC data FD. The FRC data FD is calculated by dividing the compensation value by the number of frames. For example, let us consider four frames to be one frame group. The R panel defect compensation data '00' is pre-set to be recognized as the '0' gray scale level. The R panel defect compensation data '01' is pre-set to be recognized as the '¼' gray scale level. The R panel defect compensation data '10' is pre-set to be recognized as the '½' gray scale level. The R panel defect compensation data '11' is pre-set to be recognized as the '¾' gray scale level. Under this condition, the compensation value judging portion 171 judges the R panel defect compensation data '01' as the data that the '¼' gray scale level is to be added to the display gray scale level of the data of the corresponding panel defect location. First, the gray scale level of the R panel defect compensation data is judged. In order to compensate the '¼' gray scale level to the input digital video data Ri/Gi/Bi, the compensation value judging portion 171 generates the FRC data FD of '1' in one frame period for the '1' gray scale level. This one frame is added to any one frame among the first to fourth frames and the FRC data FD of '0' for the rest three frame period is generated, as shown in (A) of FIG. 14.

The frame number sensing portion 172 senses the number of frames by using one or more of the vertical and horizontal synchronization signals Vsync and Hsync, the dot clock DCLK and the data enable signal DE. For example, as the frame number sensing portion 172 counts the vertical synchronization signal Vsync, it is possible to sense the number of frames. The calculator 173 increases and decreases the input digital video data Ri/Gi/Bi by the FRC data FD to generate the corrected digital video data Rc. The compensation circuit 51 and the EEPROM 53 according to the fourth exemplary embodiment of the present invention subdivides into 1021 gray scale levels to correct the data which is to be displayed at the panel defect location. Here, it is assumed that the panel defect compensation circuit 51 and the EEPROM 53 temporally disperse the compensation value by having the input R, G and B digital video data to be 8 bits each. It is further assumed that the four frame periods form one frame group.

Figure 19:
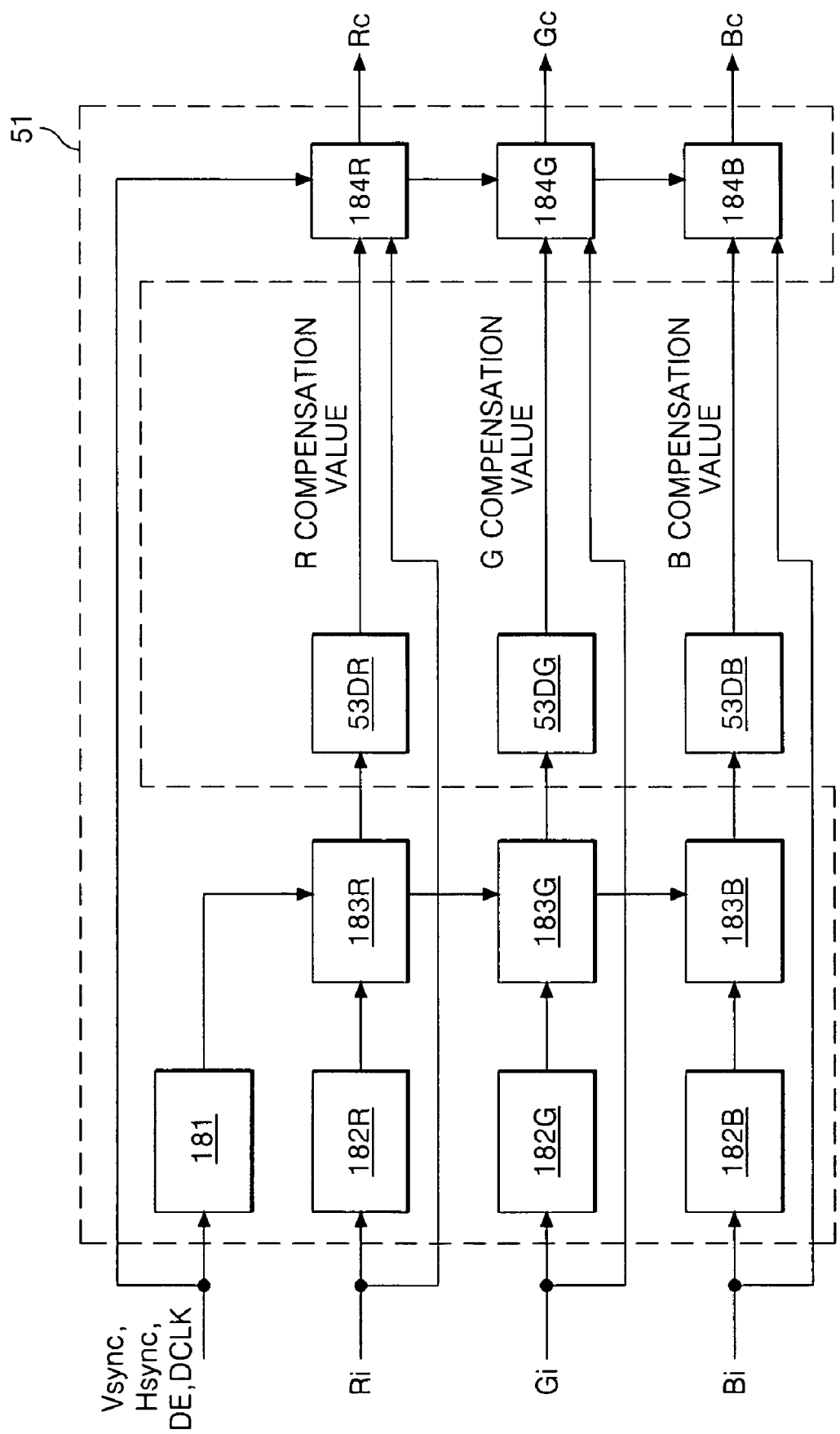
FIG. 19 is an exemplary block diagram showing a compensation circuit according to a fifth exemplary embodiment of the present invention.

FIG. 19 represents the compensation circuit 51 and the EEPROM 53 according to a fifth exemplary embodiment of the present invention. As shown in FIG. 19, the compensation circuit 51 includes a location judging portion 181, gray scale level judging portions 182R, 182G and 182B, address generators 183R, 183G and 183B, and dithering controllers 184R, 184G and 184B. And the EEPROM 53 includes first to third EEPROMs 53DR, 53DG and 53DB each of which stores the compensation data CD and the location data PD thereof for colors red R, green G and blue B, respectively. The location judging portion 181 judges the display location of the input digital video data Ri/Gi/Bi by use of vertical and horizontal synchronization signals Vsync and Hsync, a data enable signal DE and a dot clock DCLK. The gray scale level judging portions 182R, 182G and 182B analyze the gray scale level of the input digital video data Ri/Gi/Bi for colors red R, green G and blue B, respectively. The address generators 183R, 183G and 183B generate read address for reading the compensation data CD of the panel defect location to supply to the EEPROMs 53DR, 53DG and 53DB if the display location of the input digital video data Ri/Gi/Bi correspond to the panel defect location by referring to the location data PD of the EEPROMs 53DR, 53DG and 53DB. The compensation data CD that is output from the EEPROMs 53DR, 53DG and 53DB are supplied to the dithering controllers 184R, 184G and 184B in accordance with the address. The dithering controllers 184R, 184G and 184B disperse the compensation data CD from the EEPROMs 53DR, 53DG and 53DB to each pixel of the unit pixel window including a plurality of pixels to modulate the input digital video data Ri/Gi/Bi which are to be displayed at the panel defect location.

Figure 20:
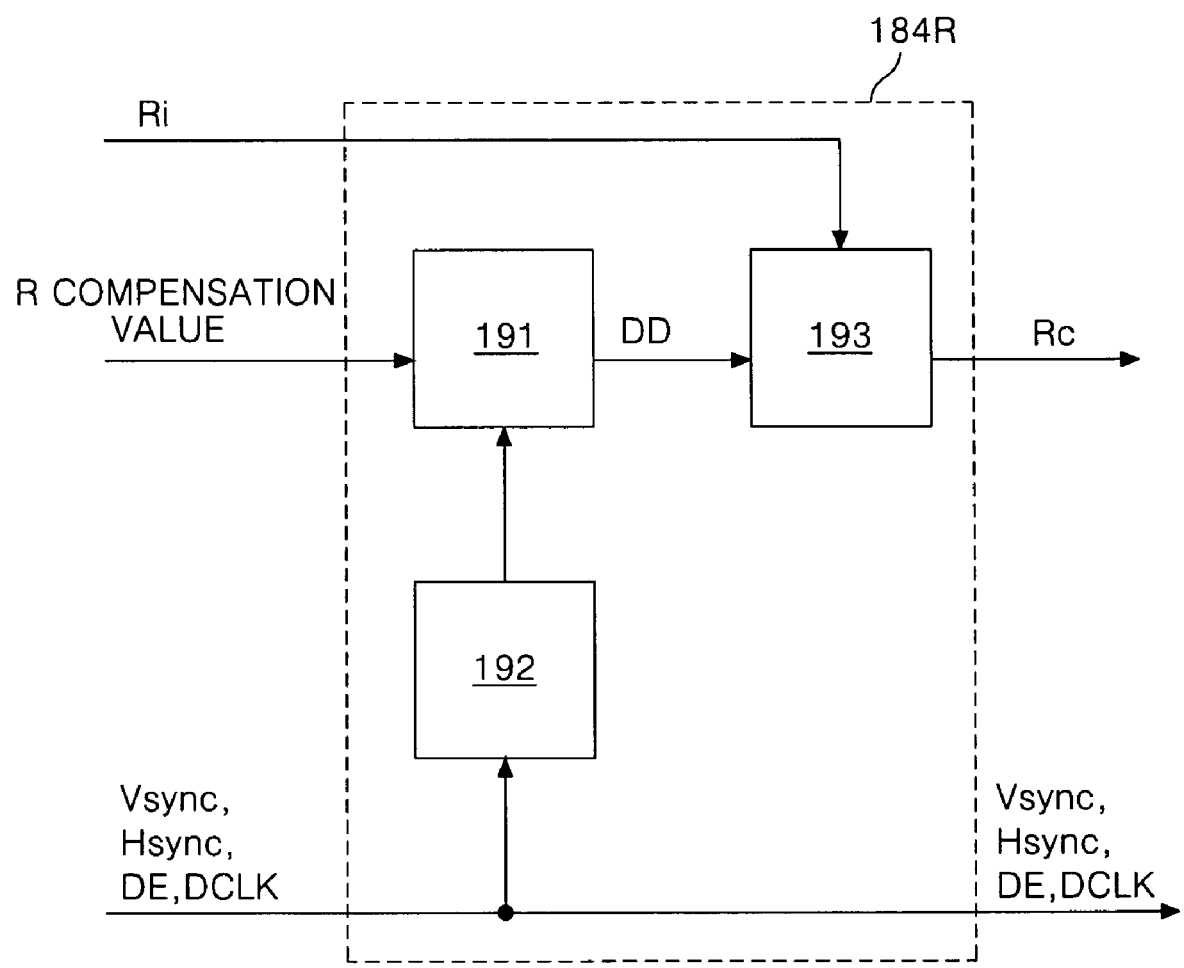
FIG. 20 is an exemplary block diagram specifically showing a first dithering controller in FIG. 19.

FIG. 20 represents a first dithering controller 184R for correcting the red data. On the other hand, second and third dithering controllers 184G and 184B substantially have the same circuit configuration as the first dithering controller 184R. As shown in FIG. 20, the first dithering controller 184R includes a compensation value judging portion 191, a pixel location sensing portion 192 and a calculator 193. The compensation value judging portion 191 judges the R compensation value and generates a dithering data DD by taking the compensation value. This value is further dispersed to the pixels included in the unit pixel window. The compensation value judging portion 191 is programmed to automatically output the dithering data in accordance with the R compensation value. For example, the compensation value judging portion 191 is pre-programmed for the dithering compensation value of the unit pixel window to be recognized as the '¼' gray scale level if the R compensation value expressed in binary data is '00'. Further, the compensation value judging portion 191 is pre-programmed for the dithering compensation value of the unit pixel window to be recognized as the '½' gray scale level if the R compensation value is '10'. Finally, the compensation value judging portion 191 is pre-programmed for the dithering compensation value of the unit pixel window to be recognized as the '¾' gray scale level if the R compensation value is '11'. Accordingly, the compensation value judging portion 191 generates '1' as the dithering data DD in the pixel location within the unit pixel window, if four pixels are included in the unit pixel window, and the R compensation value is '01'. On the other hand, it generates '0' as the dithering data DD in the rest three pixel locations. The dithering data DD are increased or decreased by the calculator 132 for each pixel location within the unit pixel window as in FIG. 14. The pixel location sensing portion 192 senses the pixel location using one or more than the vertical and horizontal synchronization signals Vsync and Hsync, the dot clock DCLK and the data enable signal DE. For example, the pixel location sensing portion 192 counts the horizontal synchronization signal Hsync and the dot clock DCLK. Thus, it is possible to sense the pixel location. The calculator 173 increases and decreases the input digital video data Ri/Gi/Bi by the dithering data DD to generate the corrected digital video data Rc. The compensation circuit 51 and the EEPROM 53 according to the fifth exemplary embodiment of the present invention can adjust the data, which is to be displayed at the panel defect location, with the compensation value which is subdivided into 1021 gray levels for each color of R, G, B, assuming that the unit pixel window is composed of four pixels.

Figure 21:
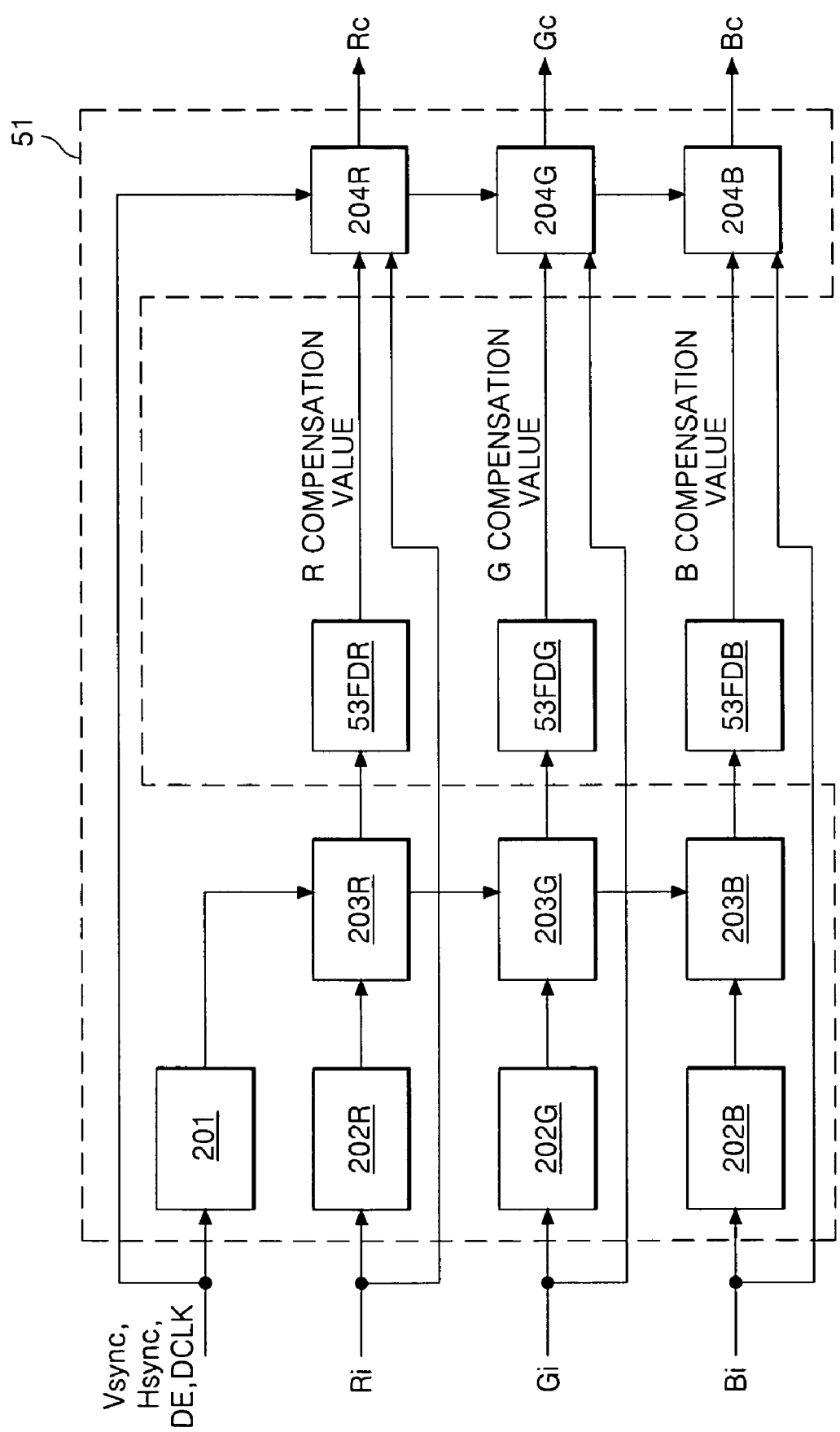
FIG. 21 is an exemplary block diagram showing a compensation circuit according to a sixth exemplary embodiment of the present invention.

FIG. 21 represents the compensation circuit 51 and the EEPROM 53 according to the sixth exemplary embodiment of the present invention. As shown in FIG. 21, the compensation circuit 51 includes a location judging portion 201, gray level judging portions 202R, 202G and 202B, address generators 203R, 203G and 203B, an FRC and dithering controllers 204R, 204G and 204B. The EEPROM 53 includes first to third EEPROMs 53FDR, 53FDG and 53FDB each of which stores the compensation data CD and the location data PD thereof for each color of red R, green G and blue B, respectively. The location judging portion 201 judges the display location of the input digital video data Ri/Gi/Bi using vertical and horizontal synchronization signals Vsync and Hsync, a data enable signal DE and a dot clock DCLK. The gray level judging portions 202R, 202G and 202B analyze the gray level of the input digital video data Ri/Gi/Bi for colors red R, green G and blue B. The address generators 203R, 203G and 203B generate read address for reading the compensation data CD of the panel defect location to supply to the EEPROMs 53FDR, 53FDG and 53FDB if the display location of the input digital video data Ri/Gi/Bi corresponds to the panel defect location by referring to the location data PD of the EEPROM 53FDR, 53FDG and 53FDB. The FRC and dithering controller 204R, 204G and 204B disperse the compensation data CD from the EEPROMs 53FDR, 53FDG and 53FDB to each pixel of the unit pixel window including a plurality of pixels. They further disperse the compensation data CD to a plurality of frame periods to modulate the input digital video data Ri/Gi/Bi which is to be displayed at the panel defect location.

Figure 22:
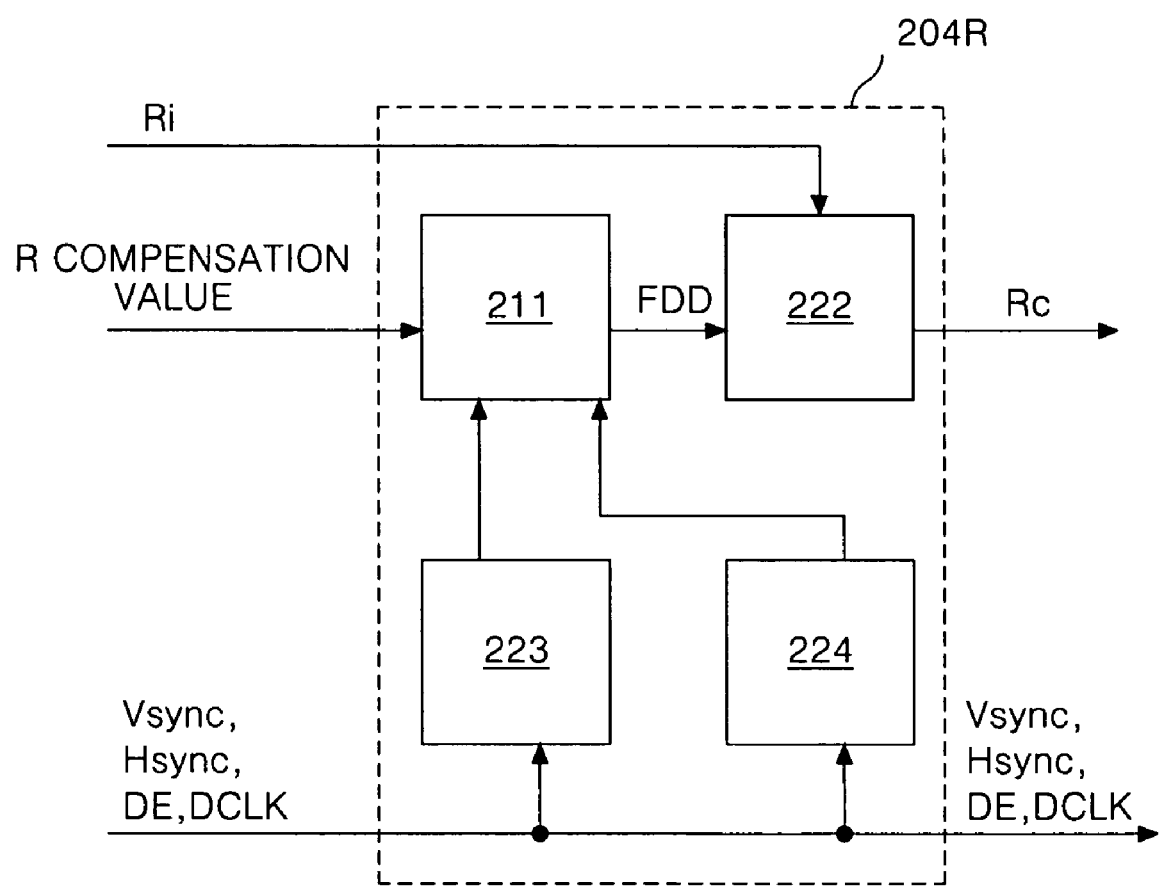
FIG. 22 is an exemplary block diagram specifically showing the first FRC and dithering controller in FIG. 21.

FIG. 22 represents a first FRC and dithering controller 204R to correct red data. On the other hand, second and third FRC and dithering controllers 204G and 204B substantially have the same circuit configuration as the first FRC and dithering controller 204R. As shown in FIG. 22, the first FRC and dithering controller 204R includes a compensation value judging portion 211, a frame number sensing portion 223, a pixel location sensing portion 224, and a calculator 222. The compensation value judging portion 221 judges the R compensation value and generates an FRC and dithering data FDD by taking the compensation value as the value which is to be dispersed to the pixels included in the unit pixel window for the frame periods. The compensation value judging portion 221 is programmed to automatically output the FRC and dithering data according to the R compensation value. For example, the compensation value judging part 221 is pre-programmed to recognize the compensation value for the '0' gray level if the R compensation data is '00'. Further, the compensation value judging part 221 is pre-programmed to recognize the compensation value for the '¼' gray level if the R compensation data is '01'. Also, the compensation value judging part 221 is pre-programmed to recognize the compensation value for the '½' gray level if the R compensation data is '10'. Finally, the compensation value judging part 221 is pre-programmed to recognize the compensation value for the '¾' gray level if the R compensation data is '11'. Assuming that the R panel defect compensation data is '01', the four frame periods form one FRC frame group. Also, the four pixels compose one unit pixel window of dithering. The compensation value judging part 221 generates '1' as the FRC and dithering data FDD in one pixel location within the unit location for four frame periods and '0' as the FRC and dithering data FDD in the rest three pixel locations, but changes the location of the pixel where '1' is generated every frame, as shown in FIG. 16. The frame number sensing portion 223 senses the number of frames using one or more than one of the vertical and horizontal synchronization signal Vsync and Hsync, the dot clock DCLK, and the data enable signal DE. For example, the frame number sensing portion 223 can sense the number of frames by counting the vertical synchronization signal Vsync. The pixel location sensing portion 224 senses the pixel location using one or more than one of the vertical and horizontal synchronization signal Vsync and Hsync, the dot clock DCLK, and the data enable signal DE.

For example, the pixel location sensing portion 224 counts the horizontal synchronization signal Hsync and the dot clock DCLK. Thus, it is possible to sense the pixel location. The calculator 222 increases and decreases the input digital video data Ri/Gi/Bi by the FRC and dithering data FDD to generate the corrected digital video data Rc. The compensation circuit 51 and the EEPROM 53 according to the sixth exemplary embodiment of the present invention can adjust the data, which is to be displayed at the panel defect location, with the compensation value which is subdivided into 1021 gray levels for each color of R, G and B, while there is almost no flicker and resolution deterioration. Here, it is assumed that the unit pixel window is composed of four pixels and the four frame periods form one FRC frame group.

Hereinafter, a method of controlling a picture quality of a flat panel display according to the exemplary embodiment of the present invention will be described. The method of controlling the picture quality of the flat panel display according to the exemplary embodiment of the present invention stores the resultant compensation data to the border portion noise compensation data judged in the border portion inspection process at a memory. Here, the resultant compensation data is calculated by adding the panel defect compensation data judged in the panel defect area inspection process. After the storing process, the flat panel display according to the exemplary embodiment of the present invention modulates the data to be supplied at the panel defect area and the non-defect area using the resultant compensation data stored at the memory to display a picture using the modulated data. Here, the resultant compensation data has a different compensation value on adjacent horizontal lines in the display panel. In other words, the panel defect compensation data judged in the panel defect area inspection process refers to a first compensation data, the border portion noise compensation data judged in the border portion inspection process refers to a second compensation data. In a first and second horizontal line crossing the border of the panel defect area and the non-defect area in the display panel adjacent to each other, the compensation data on the first horizontal line refers to a compensation data of the first line and a compensation data on the second horizontal line refers as a compensation data of the second line. A first compensation data of the first line and a first compensation data of the second line are set to be the same as each other or set to be different from each other on pixels adjacent in a vertical direction. A second compensation data of the first line and a second compensation data of the second line are set to be different from each other on pixels adjacent in a vertical direction. Accordingly, resultant compensation data calculated by adding the first compensation data and the second compensation data is set to be different from each other on pixels in which the first and second line are adjacent with each other in the vertical direction.

Figure 23:
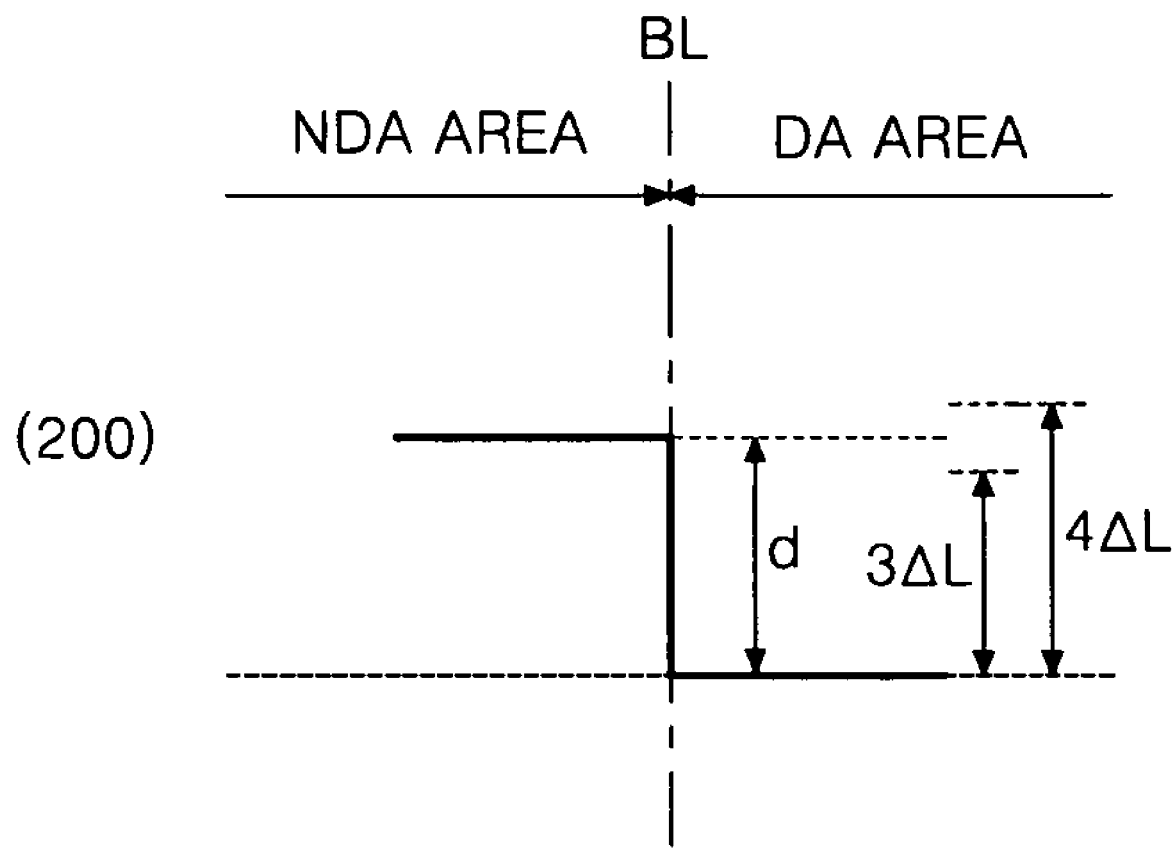
FIG. 23 is an exemplary diagram showing a difference generated at a border between a non-defect area and a panel defect area.

Hereinafter, the embodiments of the method of controlling the picture quality of the flat panel display according to the present invention will be described in detail with reference to FIGS. 23-27E. In the method of controlling the picture quality of the flat panel display according to the first exemplary embodiment of the present invention, when the panel defect area and the non-defect area show a brightness difference d between A×ΔL and (A+1)×ΔL, the first compensation data of the first and second lines are set to be the compensation value of '0' at the non-defect area, and the compensation value of '±A×ΔL' at the panel defect area. The second compensation data of the first line associated with a border compensation is set to be '0' at both the panel defect area and the non-defect area. The second compensation data of the second line is set to be the compensation value of '±k×ΔL' for every other pixel on the same horizontal line including an adjacent pixel to the border. In this case, the second compensation data of the second line can be set among the pixels that are positioned from the nearest pixel at the border to half the distance of the panel defect area to the farthest pixel from the border in the panel defect area. Here, 'A' represents a positive integer, 'k' represents a positive integer less than 'A', '+' represents a brightness increase, and '−' represents a brightness decrease. The d and ΔL are defined in advance. For example, as shown in FIG. 23, when the brightness of the panel defect area is d lower the brightness of the non-defect area, and d has a value between 3ΔL and 4ΔL, the method of controlling the picture quality of the flat panel display according to the first exemplary embodiment of the present invention compensates the panel defect and the border portion noise using the set compensation data.

As shown in FIG. 24A, a first compensation data 211a of the first line is set to be the compensation value of '0' at the non-defect area NDA and set to be the compensation value of +3ΔL at the panel defect area DA. A second compensation data 212a of the first line is set to be the compensation value of '0' at the non-defect area NDA and the panel defect area DA, and a resultant compensation data 213a of the first line is calculated by adding the first compensation data 211a of the first line and the second compensation data 212a of the first line.

As shown in FIG. 24B, a first compensation data 211b of the second line, which is similar to the first compensation data 211a of the first line, is set to be the compensation value of '0' at the non-defect area NDA and set to be the compensation value of +3ΔL at the panel defect area DA. A second compensation data 212b of the second line is set to be the compensation value of '+k×ΔL' on the pixel adjacent to the border BL at the panel defect area DA, for example, the compensation value of +ΔL. The second compensation data 212b of the second line can be set in every other pixel unit from the border BL to a pixel approximately half a distance from the panel defect area DA including the pixel. A resultant compensation data 213b of the second line is calculated by adding the first compensation data 211b of the second line and the second compensation data 212b of the second line.

Figure 24C:
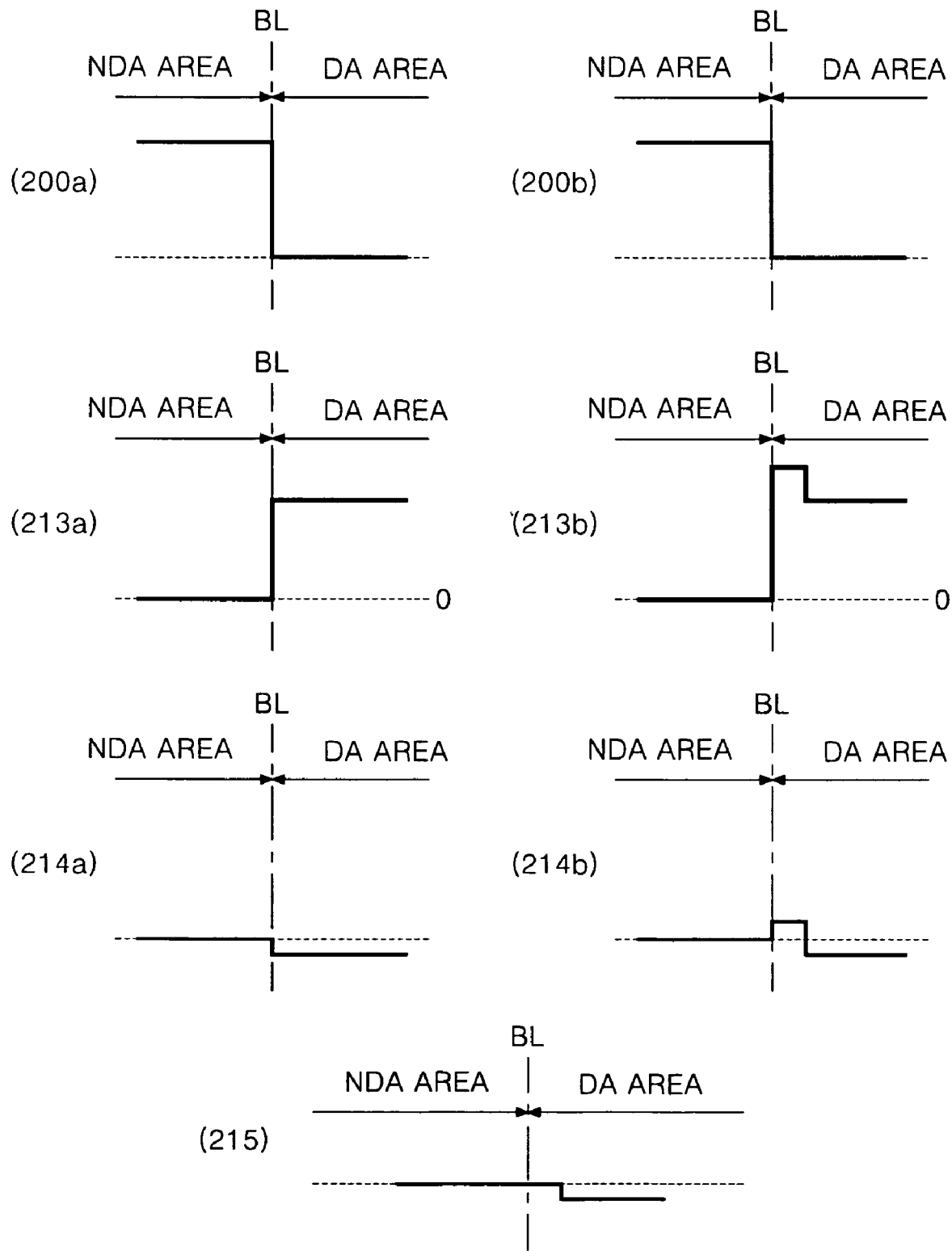

The method of controlling the picture quality of the flat panel display according to the first exemplary embodiment of the present invention stores the resultant compensation data 213a and 213b of the first and second line at the memory, and modulates the data that will further be supplied at the panel defect area DA and the border BL to compensate the noise at the panel defect area DA and the border BL. In other words, in the method of controlling the picture quality of the flat panel display according to the first exemplary embodiment of the present invention, when the brightness of a first horizontal line and a second horizontal line adjacent to each other are the same as 200a and 200b at the panel defect area DA and the non-defect area NDA, the data to be displayed at the first horizontal line is adjusted by using the resultant compensation data of the first line like 213a to compensate the brightness of the first horizontal line like 214a. The data to be displayed at the second horizontal line is also adjusted by using the resultant compensation data of the second line like 213b to compensate the brightness of the second horizontal line like 214b, as shown in FIG. 24C. Accordingly, an average brightness of the first horizontal line and the second horizontal line after compensation of the noise at the panel defect and the border BL is generated and shown in 215 of FIG. 24C.

Figure 24D:
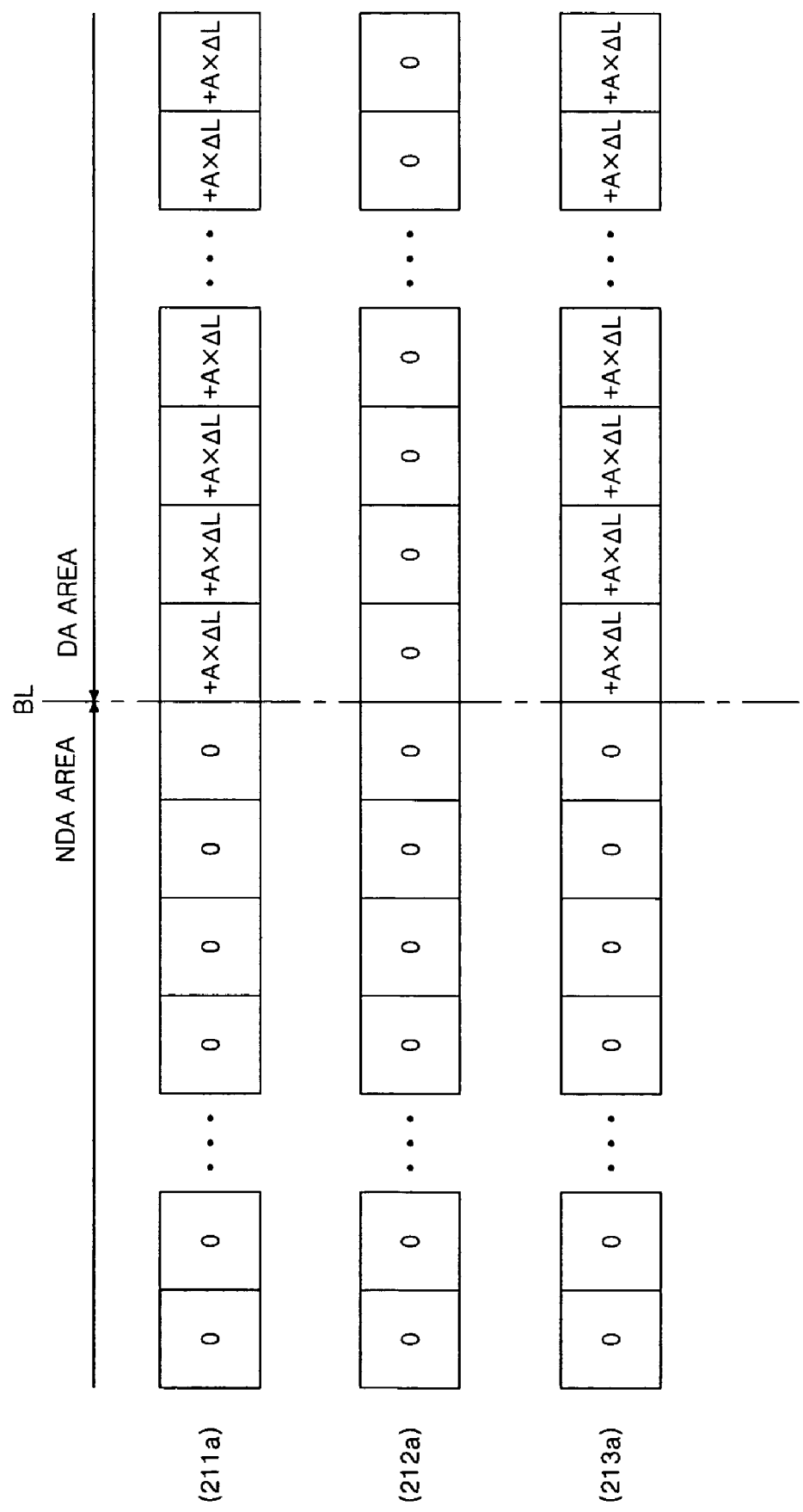

FIG. 24D and FIG. 24F are examples where the pixels are arranged on the basis of an edge border BL of the panel defect area DA and the non-defect area NDA on the display panel, and where the compensation data, set in FIG. 24A and FIG. 24B, are adjusted at the pixels. Spaces forming a square array in the diagram of FIG. 24D are to be construed as the pixels on the display panel. 'A', '+' and 'ΔL' are to be construed as quantities previously described. As shown in FIG. 24D, the first compensation data 211a of the first line is set to be the compensation value of '0' at the non-defect area NDA, and set to be the compensation value of +A×ΔL at the panel defect area DA. Herein, if the brightness difference between the panel defect area DA and the non-defect area NDA is the same as that in FIG. 23, the value of 'A' becomes 3. And, the second compensation data 212a of the first line is set to be the compensation value of '0' both at the non-defect area NDA and the panel defect area DA. Accordingly, the resultant compensation data 213a of the first line is calculated by adding the first compensation data 211a of the first line and the second compensation data 212a of the first line.

Figure 24E:
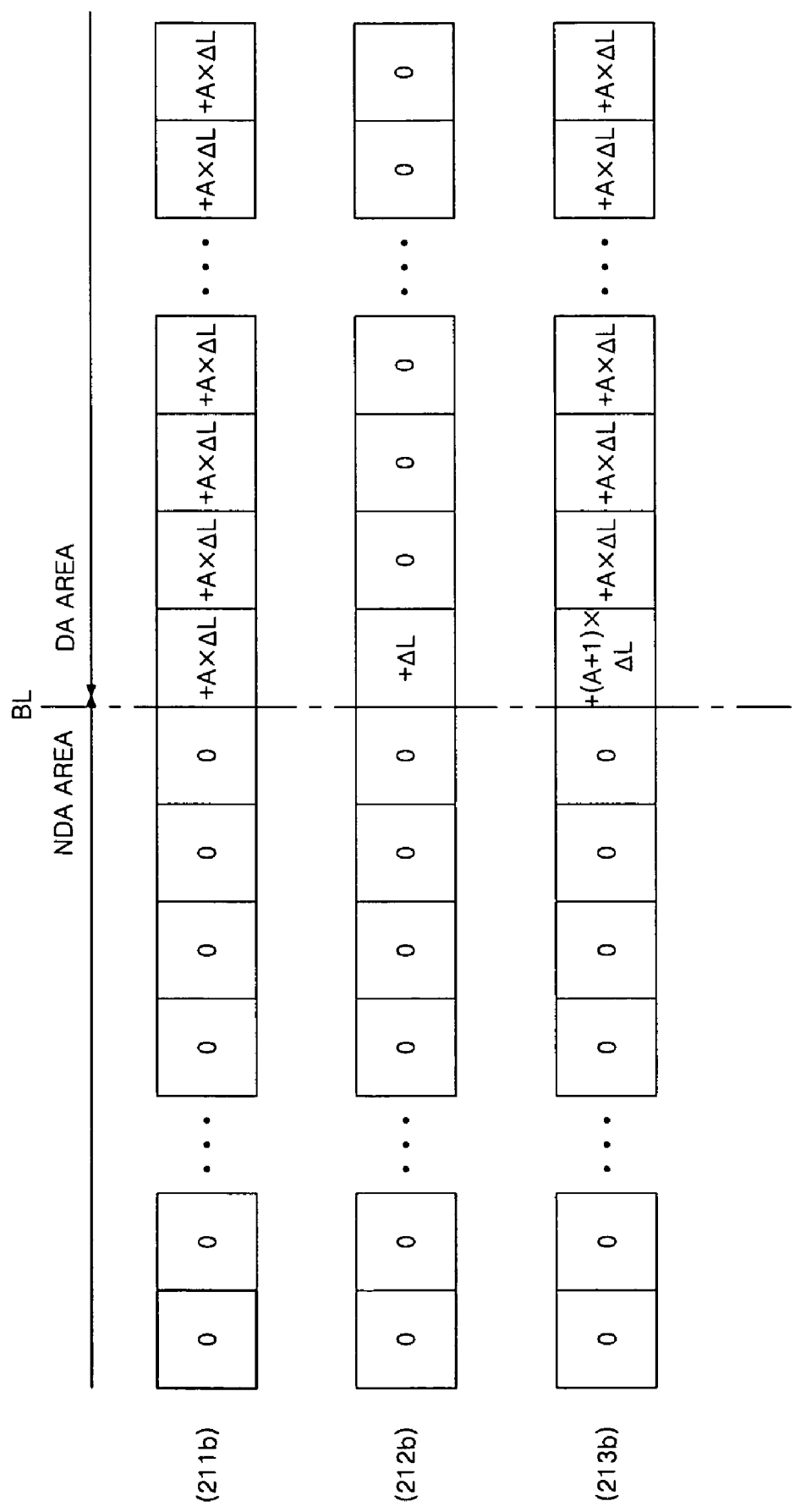

As shown in FIG. 24E, a first compensation data 211b of the second line is set to be the compensation value of '0' at the non-defect area NDA, and set to be the compensation value of +A×ΔL at the panel defect area DA, as in the first compensation data 211a of the first line. A second compensation data 212b of the first line is set to be the compensation value of '0' at the non-defect area NDA, and is set to be the compensation value of '+ΔL' on the pixel adjacent to the border BL at the panel defect area DA. Accordingly, the resultant compensation data 213b of the second line is calculated by adding the first compensation data 211b of the second line and the second compensation data 212a of the second line. The resultant compensation data 213a and 213b of the first and second lines are alternatively adjusted on the adjacent horizontal lines on the display panel, shown in FIG. 24F.

In the method of controlling the picture quality of the flat panel display according to the second exemplary embodiment of the present invention, when the panel defect area DA and the non-defect area NDA show a brightness difference d between A×ΔL and (A+1)×ΔL, the first compensation data of the first and second lines is set to be the compensation value of '0' at the non-defect area NDA, and the compensation value of '±A×ΔL' at the panel defect area DA. The second compensation data of the first line is set to be the compensation value of '±k×ΔL' for every other pixel, for the pixels adjacent to the border BL, between the panel defect area DA and the non-defect area NDA, on the same horizontal line. The second compensation data of the second line is set to be the compensation value of '±k×ΔL' for every other pixel, for the pixels adjacent to the border BL, between the panel defect area DA and the non-defect area NDA, on the same horizontal line. In this case, the second compensation data of the first and second lines can be set among the pixels that are positioned from the nearest pixel at the border BL, to half the distance of the panel defect area DA to the farthest pixel from the border BL in the panel defect area DA and the non-defect area NDA. As previously mentioned, 'A' represents a positive integer, 'k' represents a positive integer less than 'A', '+' represents a brightness increase, and '−' represents a brightness decrease. As an example, as shown in FIG. 23, when the brightness of the panel defect area DA is d lower than the brightness of the non-defect area NDA and d has a value ranging between 3ΔL and 4ΔL, the method of controlling the picture quality of the flat panel display according to the second exemplary embodiment of the present invention compensates the noise in the panel defect and the border BL using the set compensation data.

As shown in FIG. 25A, a first compensation data 221a of the first line is set to be the compensation value of '0' at the non-defect area NDA and set to be the compensation value of '+3ΔL' at the panel defect area DA. A second compensation data 222a of the first line is set to be the compensation value of '+k×ΔL' on every other pixel, pixels being adjacent to the border BL, and the border BL of the pixel at the non-defect area NDA therebetween, e.g., the compensation value of '+ΔL'. The second compensation data 222a of the first line can be set for every other pixel within the pixels that are positioned from the border BL to half the distance to the farthest panel defect area DA including the pixels. And, a resultant compensation data 223a of the first line is calculated by adding the first compensation data 221a of the first line and the second compensation data 222a of the first line.

Figure 25B:
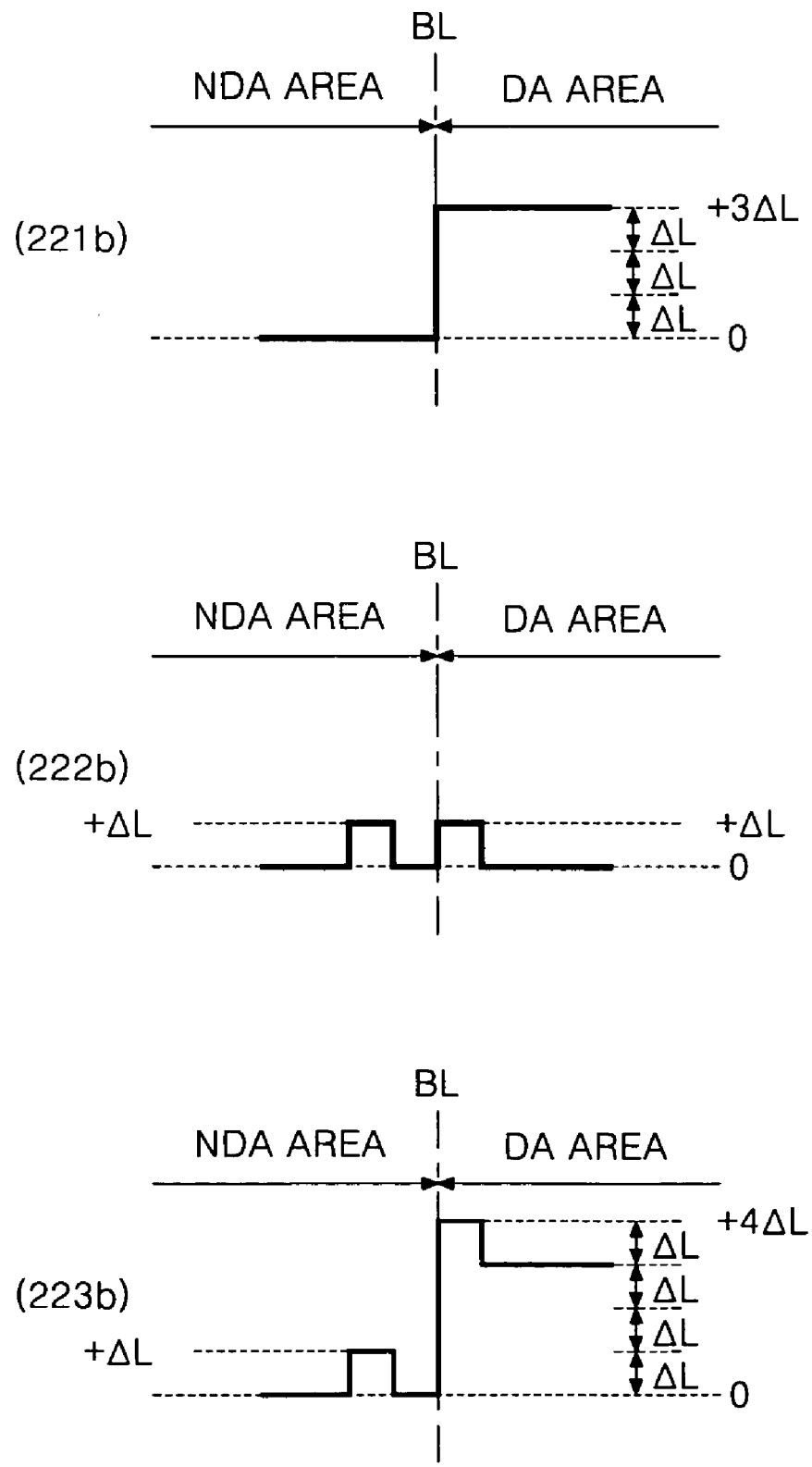

As shown in FIG. 25B, a first compensation data 221b of the second line is set to be the compensation value of '0' at the non-defect area NDA and set to be the compensation value of '+3ΔL' at the panel defect area DA, which is similar to the first compensation data 211a of the first line. A second compensation data 222b of the second line is set to be the compensation value of '+k×ΔL' on the pixel positioned at every other pixel section, having an adjacent pixel to the border BL and the border BL of the pixel at the non-defect area NDA therebetween, e.g., the compensation value of '+ΔL'. The second compensation data 222b of the second line can be set for each pixel that is positioned from the border BL to half the distance to the farthest panel defect area DA including the pixels. And, a resultant compensation data 223b of the second line is calculated by adding the first compensation data 221b of the second line and the second compensation data 222b of the second line.

Figure 25C:
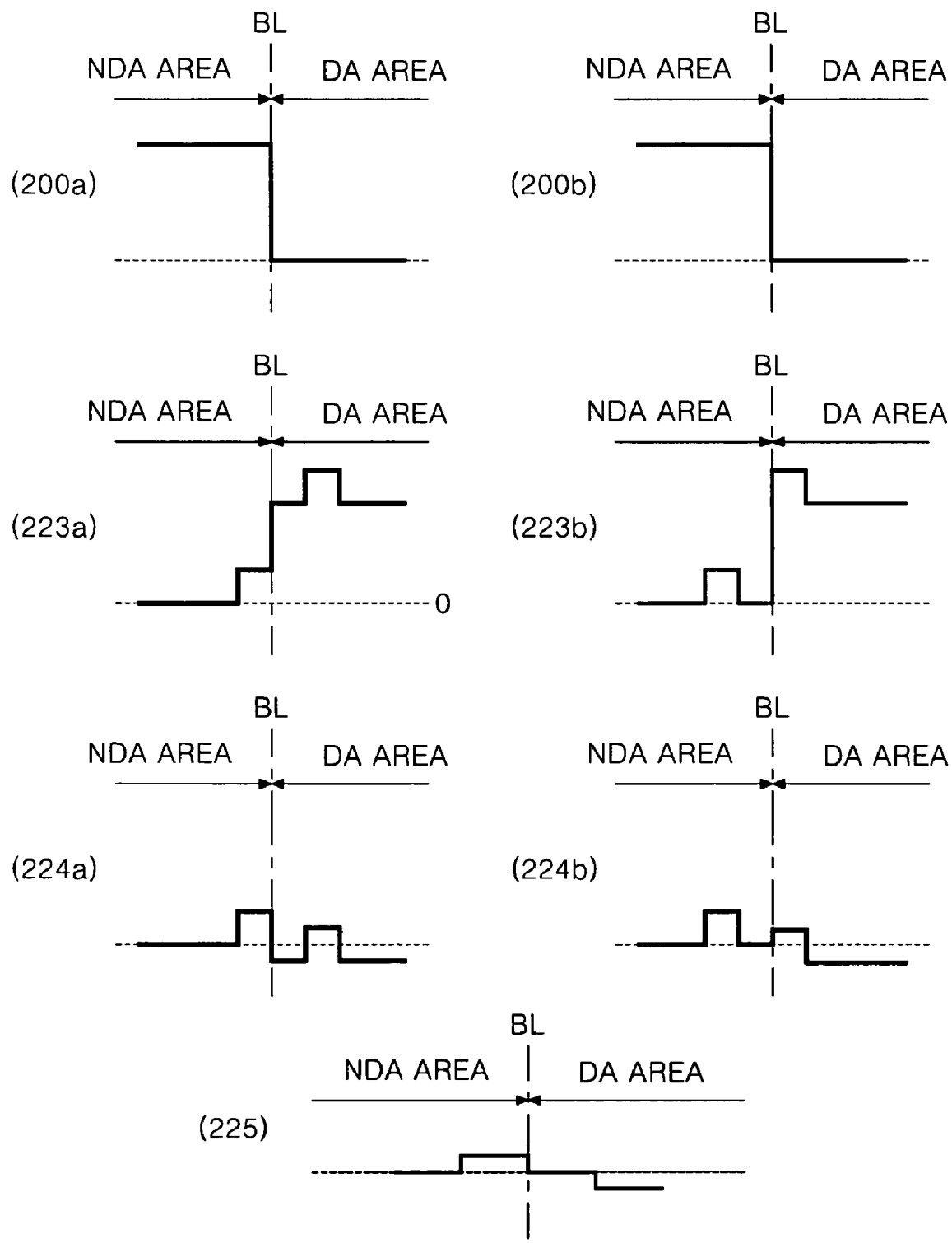

The method of controlling the picture quality of the flat panel display according to the second exemplary embodiment of the present invention stores the resultant compensation data 223a and 223b of the first and second line at the memory. It further modulates the data to be supplied at the panel defect area DA and the border BL, by using the resultant compensation data 223a and 223b, to compensate a noise at the panel defect and the border BL. In other words, in the method of controlling the picture quality of the flat panel display according to the second exemplary embodiment of the present invention, when the brightness of a first horizontal line and a second horizontal line adjacent to each other are the same as that in 200a and 200b at the panel defect area DA and the non-defect area NDA, the brightness of the first horizontal line is compensated as 224a by using the resultant compensation data of the first line like 223a, and the brightness of the second horizontal line is compensated as 224b by using the resultant compensation data of the second line like 223b as shown in FIG. 25C. Accordingly, an average brightness of the first horizontal line and the second horizontal line after compensation of the panel defect and the border BL noise, are generated to be in the form shown in 225 of FIG. 25C.

Figure 25D:
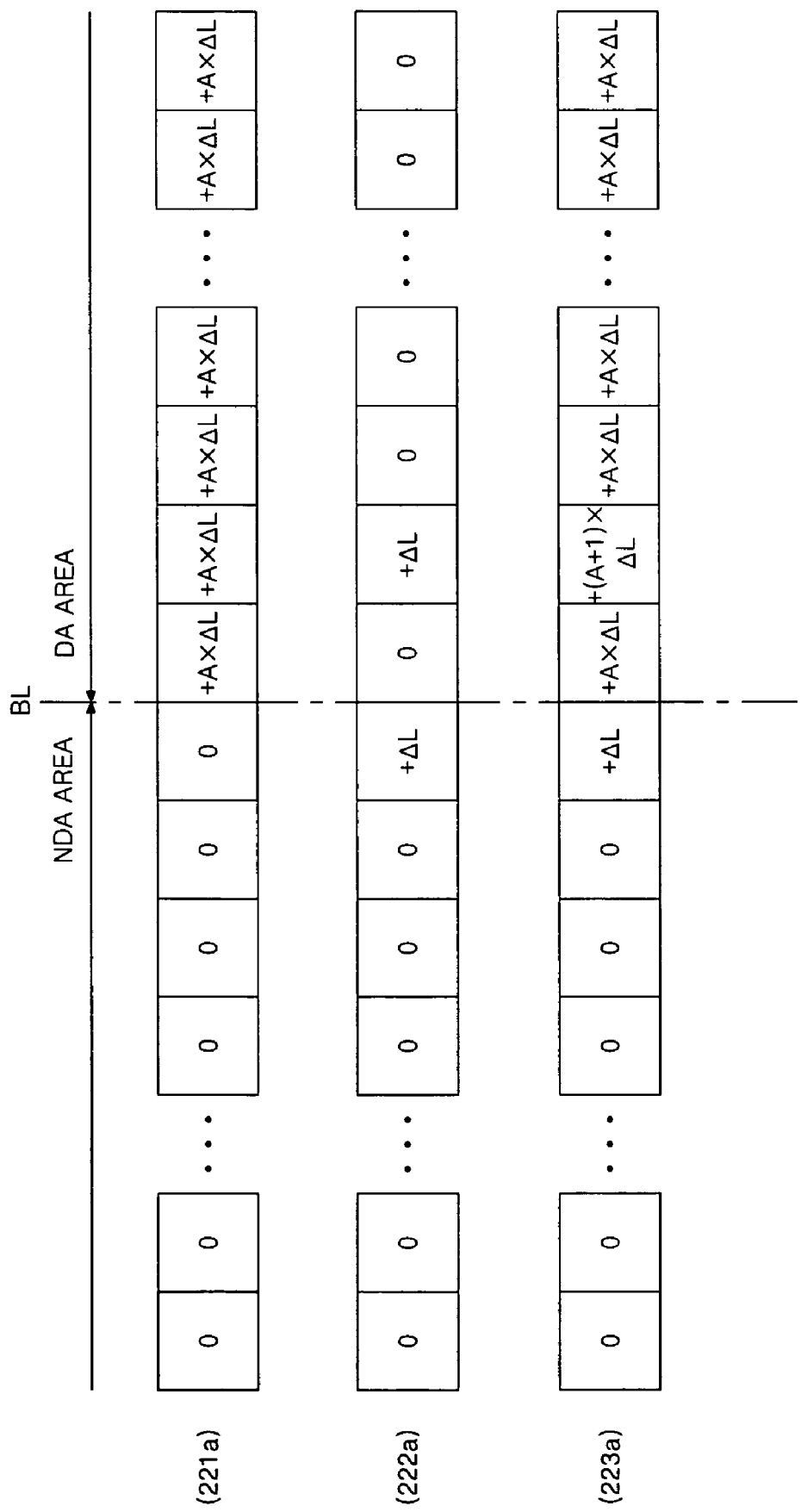
Figure 25E:
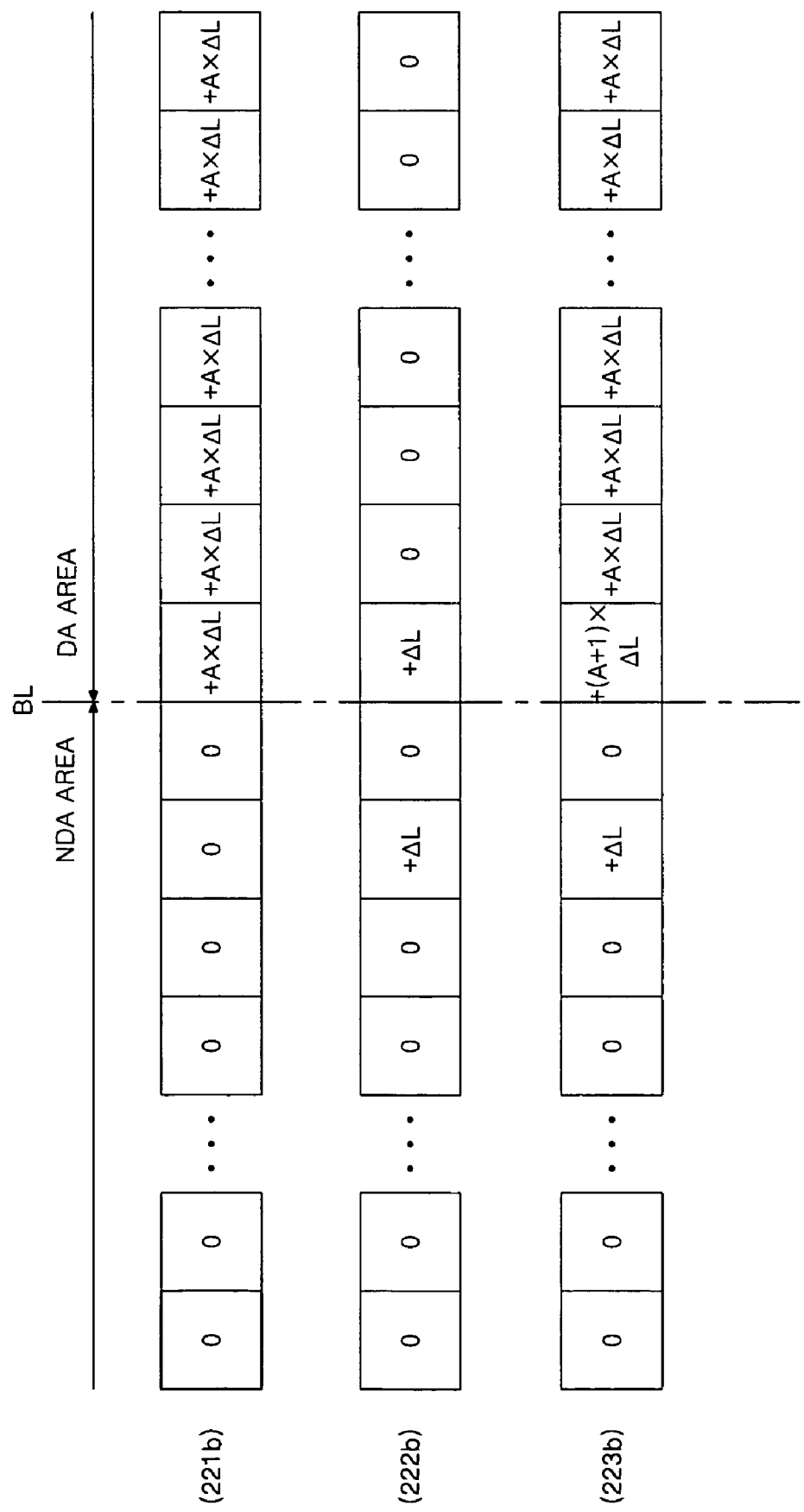
Figure 25F:
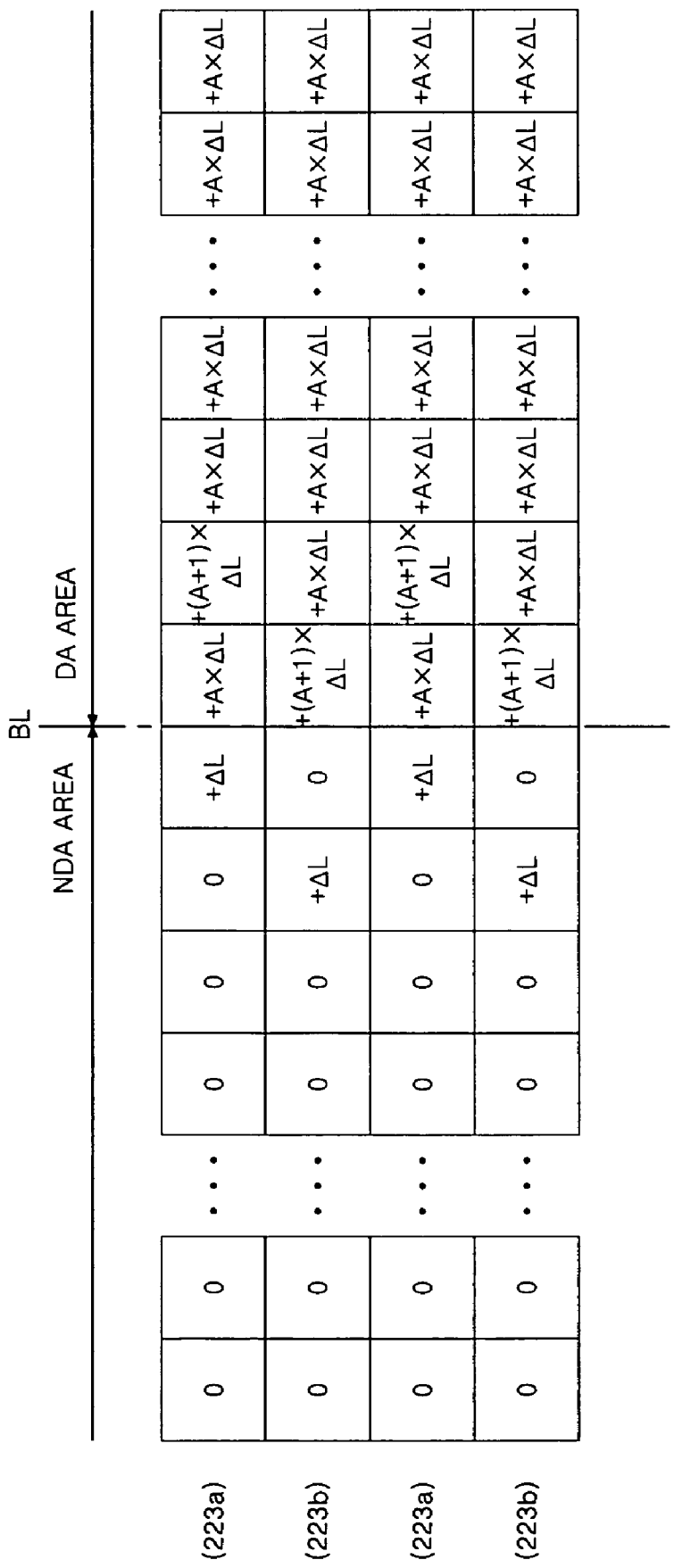

FIG. 25D and FIG. 25F are examples where the pixels are arranged on the basis of an edge border BL of the panel defect area DA and the non-defect area NDA on the display panel, and where the compensation data set in FIG. 25A and FIG. 25B are adjusted at the pixels. Spaces forming a square array in the diagram of FIG. 25D are to be construed as the pixels on the display panel. 'A', '+' and 'ΔL' are to be construed as quantities previously described. As shown in FIG. 25D, the first compensation data 221a of the first line is set to be the compensation value of '0' at the non-defect area NDA and set to be the compensation value of '+A×ΔL' at the panel defect area DA. Herein, if the brightness difference between the panel defect area DA and the non-defect area NDA is the same as that in FIG. 23, the value of 'A' is 3. And, a second compensation data 222a of the first line is set to be the compensation value of '+ΔL' on the pixel positioned at every other pixel sections, having an adjacent pixel to the border BL and the border BL of the pixel at the non-defect area NDA therebetween. The second compensation data 222a of the first line can be adjusted for every other pixel among the pixels that are positioned from the border BL to half the distance to the farthest panel defect area DA including the pixels. A resultant compensation data 223a of the first line is calculated by adding the first compensation data 221a of the first line and the second compensation data 222a of the first line.

As shown in FIG. 25E, a first compensation data 221b of the second line is set to be the compensation value of '0' at the non-defect area NDA and set to be the compensation value of '+A×ΔL' at the panel defect area DA, which is similar to the first compensation data 221a of the first line. A second compensation data 222b of the second line is set to be the compensation value of '+ΔL' on the pixel positioned at every other pixel section, having an adjacent pixel to the border BL and the border BL of the pixel at the non-defect area NDA therebetween. The second compensation data 222b of the second line can be adjusted for every other pixel among the pixels that are positioned from the border BL to half the distance to the farthest panel defect area DA including the pixels. A resultant compensation data 223b of the second line is calculated by adding the first compensation data 221b of the second line and the second compensation data 222b of the second line. The resultant compensation data 223a and 223b of the first and second lines are alternatively adjusted on adjacent horizontal lines on the display panel, shown in FIG. 25F.

In the method of controlling the picture quality of the flat panel display according to the third exemplary embodiment of the present invention, when the panel defect area DA and the non-defect area NDA show a brightness difference d between A×ΔL and (A+1)×ΔL, the first compensation data of the first line is set to be the compensation value of '0' at the non-defect area NDA, and the compensation value of '+A×ΔL' at the panel defect area DA. The first compensation data of the second line is set to be the compensation value of '0' at the non-defect area NDA, and the compensation value of '+(A+1)×ΔL' at the panel defect area DA. The second compensation data of the first line is set to be the compensation value of '−k×ΔL' on the pixel adjacent to the border BL at the panel defect area DA, and is set to be the compensation value increased by ΔL for every other pixels. Also, it is set to be the compensation value of '+k×ΔL' on the pixel positioned at every other pixels having the pixel adjacent to the border BL and the border BL therebetween at the non-defect area NDA. Further it is set to be the compensation value decreased by ΔL for every other pixels. The second compensation data of the second line is set to be the compensation value of '+k×ΔL' on the pixel adjacent to the border BL at the non-defect area NDA, and is set to be the compensation value decreased by ΔL for every other pixels, and is set to be the compensation value of '−k×ΔL' on every other pixels, the pixels being adjacent to the border BL of the non-defect area NDA and the border BL, therebetween, at the panel defect area DA. It is further set to be the compensation value increased by ΔL for every other pixels. In this case, the second compensation data of the first and second lines can be set to be the compensation value from one pixel adjacent to the minimum border BL at the panel defect area DA and the non-defect area NDA to a pixel half the distance from the maximum border BL of the panel defect area DA. Again, 'A' represents a positive integer, 'k' represents a positive integer less than 'A', '+' represents a brightness increase, and '−' represents a brightness decrease. The d and ΔL are defined in advance, and 'k' may be ½. Also, the second compensation data of the first and second lines may be set to be the compensation value decreased from '+k×ΔL' at the panel defect area DA, and may be set to be the compensation value increased from '−k×ΔL' at the non-defect area NDA. For example, as shown in FIG. 23, when the brightness of the panel defect area DA is d lower than the brightness of the non-defect area NDA, and d has a value between 3ΔL and 4ΔL, the method of controlling the picture quality of the flat panel display according to the third exemplary embodiment of the present invention compensates the noise in the panel defect and the border BL using the set compensation data.

As shown in FIG. 26A, a first compensation data 231a of the first line is set to be the compensation value of '0' at the non-defect area NDA and set to be the compensation value of '+3ΔL' at the panel defect area DA. The second compensation data 232a of the first line is set to be the compensation value of '−2ΔL' on the pixel adjacent to the border BL at the panel defect area DA. Further it is set to be the compensation value increased by ΔL for each pixel distant in every other pixel distance from the pixel. Then, it is set to be the compensation value of '+2ΔL' on the pixel positioned at the every other pixel, having the pixel adjacent to the border BL of the panel defect area DA and the border BL therebetween at the non-defect area NDA. Finally, it is set to be the compensation value decreased by ΔL for every other pixels. The second compensation data 232a of the first line can be set for every other pixels that are positioned from the border BL to half the distance from the farthest panel defect area DA including the pixels. A resultant compensation data 233a of the first line is calculated by adding the first compensation data 231a of the first line and the second compensation data 232a of the first line.

As shown in FIG. 26B, a first compensation data 231b of the second line, unlike the first compensation data 231a, is set to be the compensation value of '0' at the non-defect area NDA and set to be the compensation value of '+4ΔL' at the panel defect area DA. The second compensation data 232b of the second line is set to be the compensation value of '+2ΔL' on the pixel adjacent to the border BL at the non-defect area NDA and is set to be the compensation value decreased by ΔL for every other pixels, and is set to be the compensation value of '−2ΔL' on the pixel positioned at the every other pixel, having the pixel adjacent to the border BL of the non-defect area NDA and the border BL therebetween at the panel defect area DA. It is further set to be the compensation value increased by ΔL for every other pixels. The second compensation data 232b of the second line can be set for every other pixels that are positioned from the border BL to half the distance from the farthest panel defect area DA including the pixels. A resultant compensation data 233b of the second line is calculated by adding the first compensation data 231b of the second line and the second compensation data 232b of the second line.

Figure 26C:
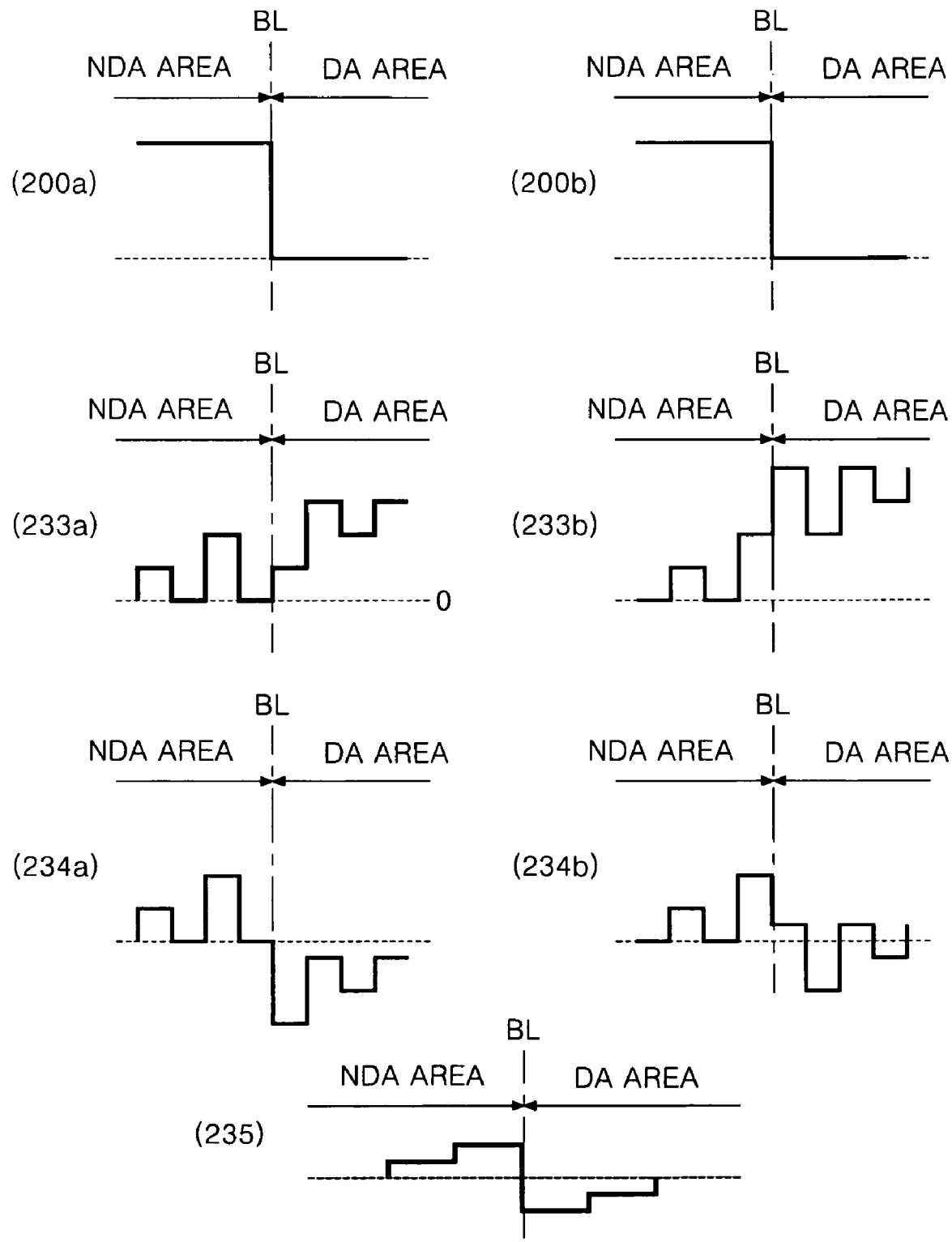

The method of controlling the picture quality of the flat panel display according to the third exemplary embodiment of the present invention stores the resultant compensation data 233a and 233b of the first and second line at the memory, and modulates the data to be supplied at the panel defect area DA and the border BL by using the resultant compensation data 233a and 233b to compensate the panel defect and the border noise. In other words, in the method of controlling the picture quality of the flat panel display according to the third exemplary embodiment of the present invention, when the brightness of a first horizontal line and a second horizontal line adjacent to each other are the same as that in 200a and 200b at the panel defect area DA and the non-defect area NDA, the brightness of the first horizontal line is compensated like 234a by modulating the data to be supplied at the first horizontal line using the resultant compensation data of the first line like 233a, and the brightness of the second horizontal line is compensated like 234b by modulating the data to be supplied at the second horizontal line using the resultant compensation data of the second line like 233b as shown in FIG. 26C. Accordingly, an average brightness of the first horizontal line and the second horizontal line after compensation of the panel defect and the border BL noise is generated to be in the form shown in 235 of FIG. 26C.

Figure 26D:
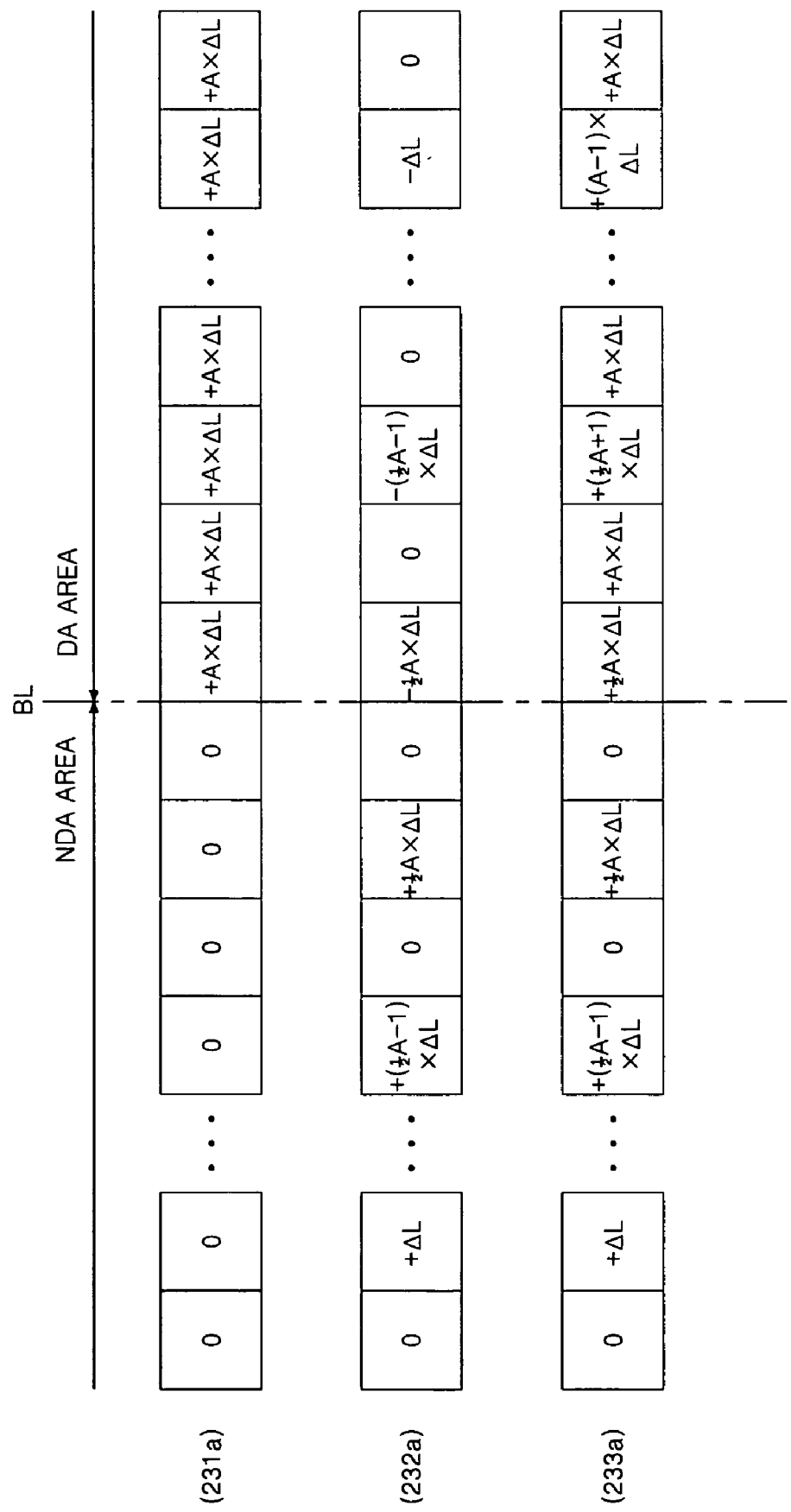

FIG. 26D and FIG. 26F are examples where the pixels are arranged on the basis of an edge border BL of the panel defect area DA and the non-defect area NDA on the display panel, and where the compensation data set in FIG. 26A and FIG. 26B are adjusted at the pixels. Spaces forming a square array in the diagram of FIG. 26D are to be construed as the pixels on the display panel. 'A', '+' and 'ΔL' are to be construed as quantities previously described. As shown in FIG. 26D, the first compensation data 231a of the first line is set to be the compensation value of '0' at the non-defect area NDA and set to be the compensation value of '+A×ΔL' at the panel defect area DA. Herein, if the brightness difference between the panel defect area DA and the non-defect area NDA is the same as that in FIG. 23, a value of 'A' is 3. And, the second compensation data 231a of the first line is set to be the compensation value of '−½A×ΔL' on the pixel adjacent to the border BL at the panel defect area DA. It is further set to be the compensation value increased by ΔL for every other pixels, and then set to be the compensation value of '+½A×ΔL' on the pixel positioned at the every other pixel, having the pixel adjacent to the border BL of the panel defect area DA and the border BL therebetween at the non-defect area NDA. Finally, it is set to be the compensation value decreased by ΔL for each pixel distant in every other pixels. The second compensation data 232a of the first line can be set for every other pixel among the pixels that are off a distance from the maximum border BL to half the distance from the panel defect area DA including the pixels. A resultant compensation data 233a of the first line is calculated by adding the first compensation data 231a of the first line and the second compensation data 232a of the first line.

Figure 26E:
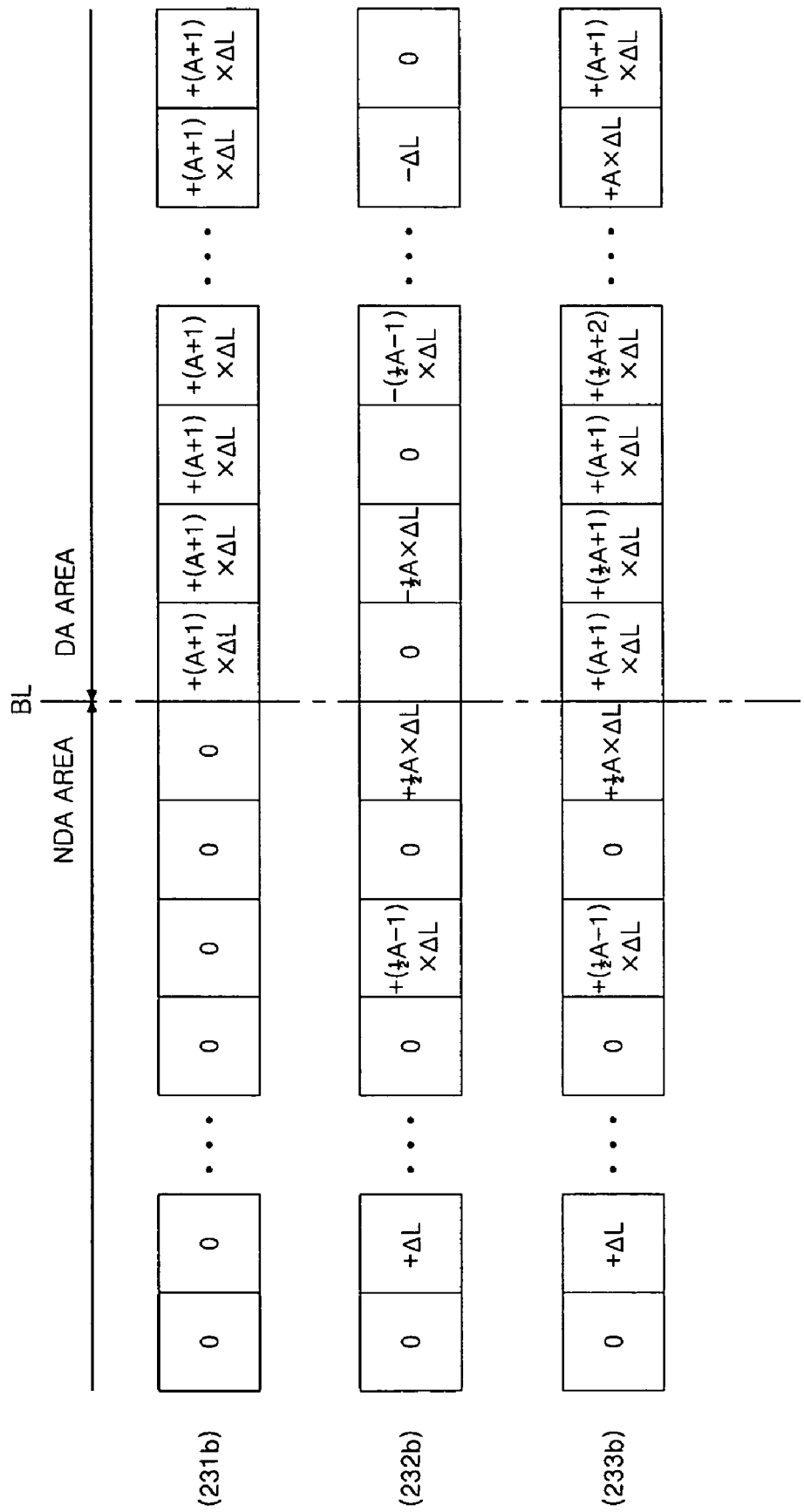

As shown in FIG. 26E, the first compensation data 231b of the second line is set to be the compensation value of '0' at the non-defect area NDA and set to be the compensation value of '+A×ΔL' at the panel defect area DA, which is similar to the first compensation data 231a of the first line. The second compensation data of the second line is set to be the compensation value of '+½A×ΔL' on the pixel adjacent to the border BL at the non-defect area NDA and is further set to be the compensation value decreased by ΔL for each pixel distant in every other pixels, and is then set to be the compensation value of '−½A×ΔL' on the pixel positioned at the every other pixel, having the pixel adjacent to the border BL of the non-defect area NDA and the border BL therebetween at the panel defect area DA. Finally, it is set to be the compensation value increased by ΔL for each pixel distant in every other pixel distance from the pixel. The second compensation data 232b of the second line can be set for every other pixel among the pixels that are off a distance from the maximum border BL to half the distance from the panel defect area DA including the pixels. A resultant compensation data 233b of the second line is calculated by adding the first compensation data 231b of the second line and the second compensation data 232b of the second line. The resultant compensation data 233a and 233b of the first and second lines are alternatively adjusted on the adjacent horizontal lines on the display panel, shown in FIG. 26F.

Figure 27A:
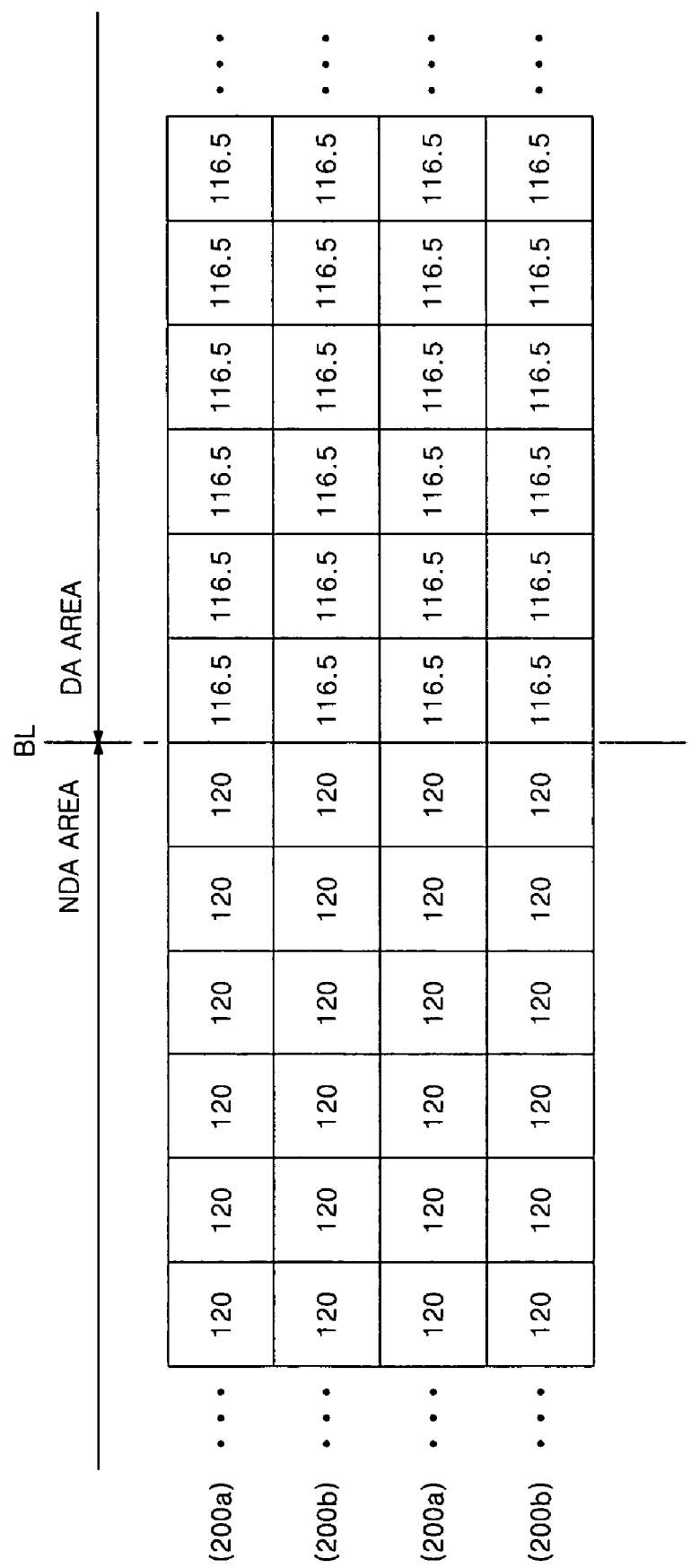
Figure 27B:
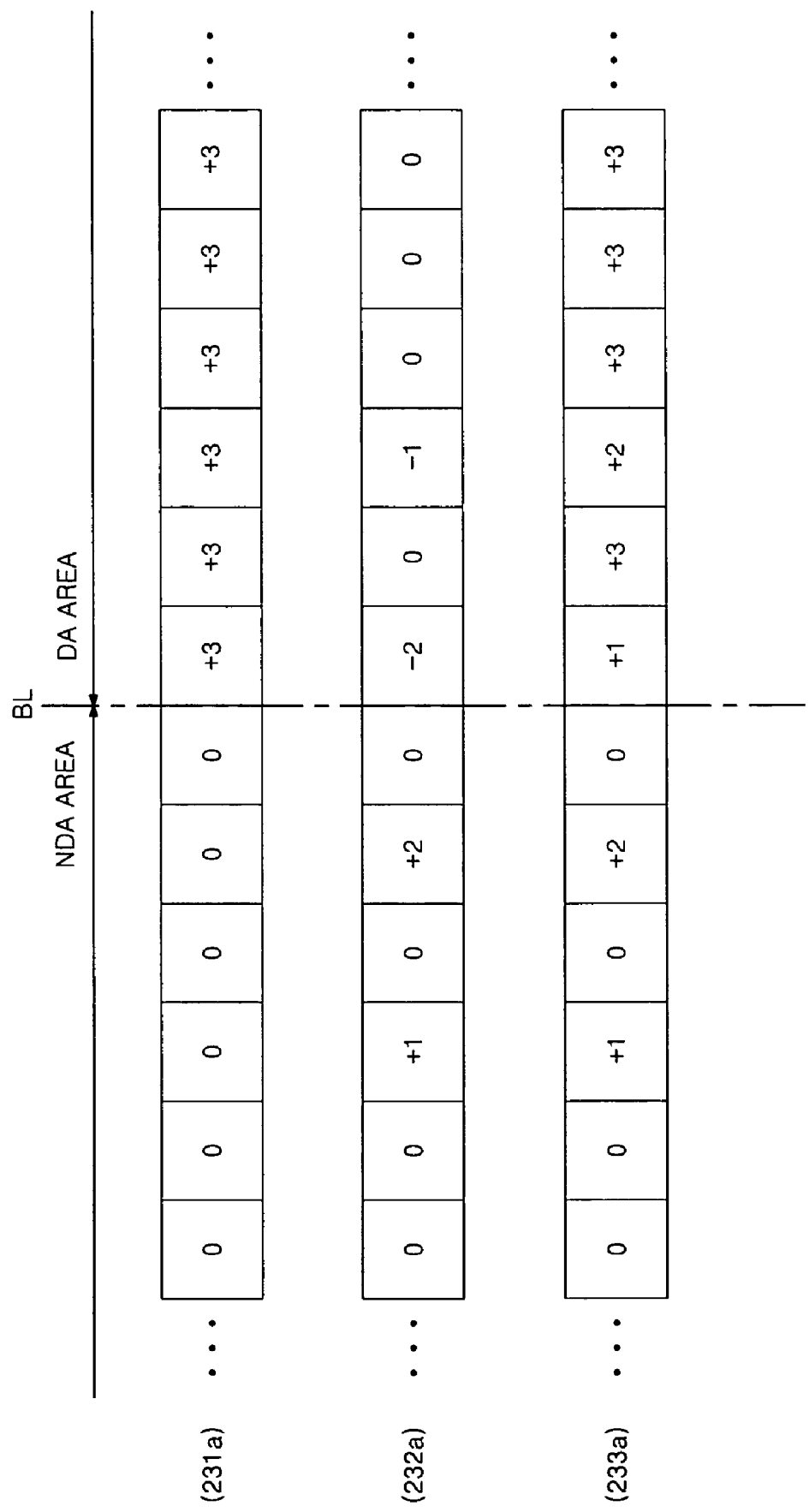
Figure 27D:
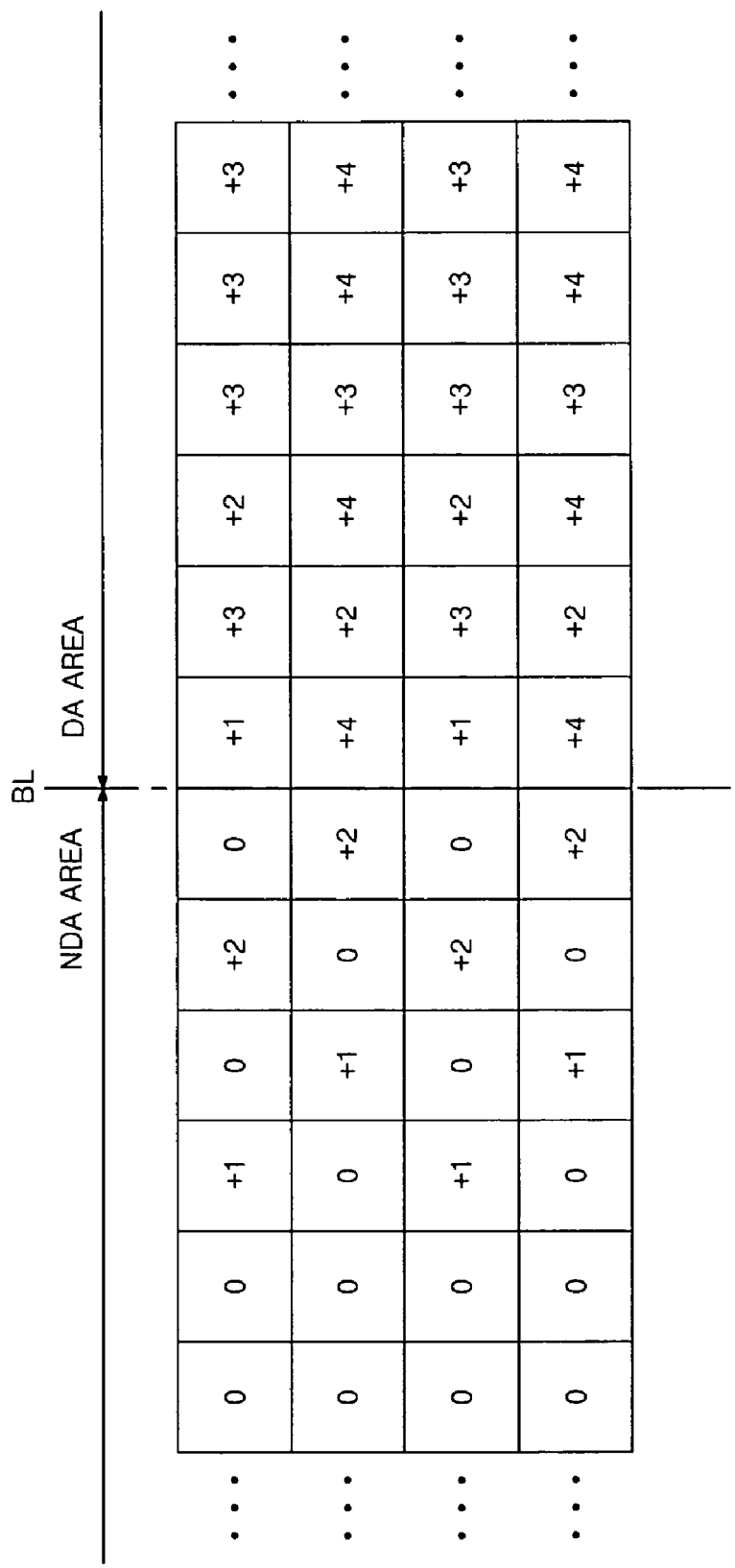

The method of controlling the picture quality of the flat panel display according to the third exemplary embodiment of the present invention will be described in detail with reference to the accompanying FIG. 27A to FIG. 27E. FIG. 27A to FIG. 27E show adjusting a random number on the method of controlling the picture quality of the flat panel display according to the third exemplary embodiment of the present invention shown in FIG. 26A to FIG. 26F. For example, as shown in FIG. 27A, if the brightness of the panel defect area DA is 116.5 when the brightness of the non-defect area NDA is 120, then the brightness difference d between the panel defect area DA and the non-defect area NDA becomes 3.5 and ΔL becomes 1. As a result, the first compensation data 231a of the first line is set to be the compensation value of '0' at the non-defect area NDA and set to be the compensation value of '+3' at the panel defect area DA, shown in FIG. 27B. The second compensation data 232a of the first line is set to be the compensation value of '−2' on the pixel adjacent to the border BL at the panel defect area DA and is set to be the compensation value increased by 1 for each pixel distant in every other pixel distance from the pixel. Further, it is set to be the compensation value of '+2' on the pixel positioned at every other pixels adjacent to the border BL of the panel defect area DA and the border BL therebetween at the non-defect area NDA, and finally is set to be the compensation value decreased by 1 for each pixel distant in every other pixel distance from the pixel. A resultant compensation data 233a of the first line is calculated by adding the first compensation data 231a of the first line and the second compensation data 232a of the first line.

As shown in FIG. 25E, the first compensation data 231b of the second line is set to be the compensation value of '0' at the non-defect area NDA and set to be the compensation value of '+4' at the panel defect area DA, which is similar to the first compensation data 231a of the first line. The second compensation data of the second line is set to be the compensation value of '+2×ΔL' on the pixel adjacent to the border BL at the non-defect area NDA and is set to be the compensation value decreased by 1 for every other pixels. It is further set to be the compensation value of '−2' on the pixel positioned at the every other pixel having the pixel adjacent to the border BL of the non-defect area NDA and the border BL therebetween at the panel defect area DA, and is set to be the compensation value increased by 1 for each pixel distant in every other pixel distance from the pixel. The second compensation data 232b of the second line can be set for every other pixel among the pixels that are off a distance from the maximum border BL to half the distance from the panel defect area DA including the pixels. A resultant compensation data 233b of the second line is calculated by adding the first compensation data 231b of the second line and the second compensation data 232b of the second line. The resultant compensation data 233a and 233b of the first and second lines are alternatively adjusted on the adjacent horizontal lines on the display panel shown in FIG. 27D. When the data, shown in FIG. 27A, is modulated by using the resultant compensation data 233a and 233b of the first and second lines, the data, shown in FIG. 27E, is shown on the display panel. On the other hand, in the method of controlling the picture quality of the flat panel display of the present invention, the compensation data described by the embodiments is capable of setting the compensation location and the compensation value described in the exemplary embodiments. It is further capable of setting the compensation location and changing the compensation value on the location for reducing the brightness change between the panel defect area DA and the non-defect area NDA at the border BL of the panel defect area DA and the non-defect area NDA.

As described above, the method of controlling the picture quality of the flat panel display of the present invention sets the first compensation data for compensating the brightness on the panel defect area DA, and the second compensation data for reducing the border noise between the panel defect area DA and the non-defect area NDA, to a second step compensation on the panel defect by using the data. Thus, the picture quality can be improved. Also, the flat panel display, the fabricating method thereof, the fabricating apparatus, the picture quality controlling apparatus and the picture quality controlling method according to the present invention have an advantage that the panel defect is compensated by the electric compensation data irregardless of the size and the shape of the panel defect in the fabricating process. Also, the brightness and chromaticity of the panel defect are compensated in great detail. Furthermore, the present invention compensates the panel defect and the border of the panel defect area DA and the non-defect area NDA.

It will be apparent to those skilled in the art that various modifications and variations can be made in the flat panel display, fabricating method and fabricating apparatus thereof, and picture quality controlling method and apparatus thereof of the present invention without departing from the spirit or scope of the invention. Thus, it is intended that the present invention covers the modifications and variations of this invention provided they come within the scope of the appended claims and their equivalents.

What is claimed is:

1. A method of fabricating a flat panel display, comprising the steps of:
   judging a panel defect area and a non-defect area of a display panel;
   generating a first compensation data for compensating the panel defect area;
   first modulating a data of the panel defect area by using the first compensation data;
   judging a brightness at a border between the panel defect area and the non-defect area of the display panel after compensating the panel defect;
   generating a second compensation data for compensating the border and the panel defect area;
   second modulating a data of the border and the panel defect area by using the second compensation data;
   adding the first compensation data and the second compensation data to calculate a resultant compensation data; and
   storing the resultant compensation data at a data modulation memory.

2. The method as claimed in claim 1, wherein the first compensation data has the same compensation value as a first compensation data on an adjacent pixel in the vertical direction at the panel defect area.

3. The method as claimed in claim 2, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

4. The method as claimed in claim 3, wherein the second compensation data corresponding to the pixels within the panel defect area is applied to the pixels arranged within half the distance between the border and an edge of the panel defect area spaced from thereof.

5. The method as claimed in claim 2, wherein the second compensation data further includes a compensation data of a non-defect area for modulating a data of the non-defect area.

6. The method as claimed in claim 5, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

7. The method as claimed in claim 6, wherein the second compensation data is set to be a compensation value for adjusting a brightness of the panel defect area and the non-defect area.

8. The method as claimed in claim 5, wherein the first compensation data has a different compensation value as first compensation data on the adjacent pixels in the vertical direction at the panel defect area.

9. The method as claimed in claim 8, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

10. The method as claimed in claim 5, wherein the second compensation data is set to be a compensation value for increasing a brightness of the panel defect area and for decreasing a brightness of the non-defect area.

11. The method as claimed in claim 10, wherein the second compensation data is set to be a compensation value gradually reduced from a pixel near the border to a pixel far from the border.

12. The method as claimed in claim 11, wherein the second compensation data is set to be a compensation value smaller than the first compensation data on the same pixel.

13. The method as claimed in claim 5, wherein the second compensation data is set to be the compensation value for decreasing the brightness of the panel defect area and for increasing the brightness of the non-defect area.

14. The method as claimed in claim 13, wherein the second compensation data is set to be a compensation value gradually reduced from a pixel near the border to a pixel far from the border.

15. The method as claimed in claim 14, wherein the second compensation data is set to be a compensation value smaller than the first compensation data on the same pixel.

16. A fabricating apparatus of a flat panel display, comprising:
   an inspection device for detecting a border between a panel defect area and a non-defect area;
   a memory storing a first compensation data for compensating the panel defect area and a second compensation data for compensating the border and the panel defect area;
   a first panel defect compensation device for modulating a data from the panel defect area by using the first compensation data;
   a second panel defect compensation device for modulating a data to be supplied to the border, detected by the inspection device, and the panel defect area, detected by the inspection device and compensated by the first compensation data, into the second compensation data; and
   a memory recorder for recording the first compensation data, the second compensation data, and a resultant compensation data calculated by adding the second compensation data to the first compensation data.

17. The fabricating apparatus of the flat panel display as claimed in claim 16, wherein the first compensation data has the same compensation value as a first compensation data on an adjacent pixel in the vertical direction at the panel defect area.

18. The fabricating apparatus of the flat panel display as claimed in claim 17, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

19. The fabricating apparatus of the flat panel display as claimed in claim 16, wherein the second compensation data corresponding to the pixels within the panel defect area is applied to the pixels arranged within half the distance between the border and an edge of the panel defect area spaced from thereof.

20. The fabricating apparatus of the flat panel display as claimed in claim 19, wherein the second compensation data further includes a compensation data of a non-defect area for modulating a data of the non-defect area.

21. The fabricating apparatus of the flat panel display as claimed in claim 20, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

22. The fabricating apparatus of the flat panel display as claimed in claim 21, wherein the second compensation data is set to be a compensation value for adjusting a brightness of the panel defect area and the non-defect area.

23. The fabricating apparatus of the flat panel display as claimed in claim 16, wherein the first compensation data has a different compensation value as first compensation data on the adjacent pixels in the vertical direction at the panel defect area.

24. The fabricating apparatus of the flat panel display as claimed in claim 20, wherein the second compensation data is set to be a compensation value gradually reduced from a pixel near the border to a far pixel.

25. The fabricating apparatus of the flat panel display as claimed in claim 24, wherein the second compensation data is set to be a compensation value smaller than the first compensation data on the same pixel.

26. The fabricating apparatus of the flat panel display as claimed in claim 16, whereon the memory includes a non-volatile memory that is adaptive for renewing a data.

27. The fabricating apparatus of the flat panel display as claimed in claim 26, whereon the memory includes any at least one of an EEPROM or an EDID ROM.

28. A picture quality controlling apparatus of a flat panel display, comprising:
a memory for storing a resultant compensation data calculated by adding a first compensation data for compensating a panel defect area of the display panel judged through a first inspection process of a display panel to a second compensation data for compensating the panel defect area, compensated by the first compensation data, and a border between the panel defect area, compensated by the first compensation data, and a non-defect area of the display panel judged through a second inspection process of the display panel;
a compensator to supply a modulated data to the border, the panel defect area close to the border, and the non-defect area by using the resultant compensation data stored on the memory; and
a driver for displaying the modulated data by the compensator on a display panel.

29. The picture quality controlling apparatus of the flat panel display as claimed in claim 28, wherein the first compensation data has the same compensation value as a first compensation data on an adjacent pixel in the vertical direction at the panel defect area.

30. The picture quality controlling apparatus of the flat panel display as claimed in claim 29, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

31. The picture quality controlling apparatus of the flat panel display as claimed in claim 28, wherein the second compensation data corresponding to the pixels within the panel defect area is applied to the pixels arranged within half the distance between the border and an edge of the panel defect area spaced from thereof.

32. The picture quality controlling apparatus of the flat panel display as claimed in claim 28, wherein the second compensation data further includes a compensation data of a non-defect area for modulating a data of the non-defect area.

33. The picture quality controlling apparatus of the flat panel display as claimed in claim 32, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

34. The picture quality controlling apparatus of the flat panel display as claimed in claim 32, wherein the second compensation data is set to be a compensation value for adjusting a brightness of the panel defect area and the non-defect area.

35. The picture quality controlling apparatus of the flat panel display as claimed in claim 28, wherein the first compensation data has a different compensation value as first compensation data on the adjacent pixels in the vertical direction at the panel defect area.

36. The picture quality controlling apparatus of the flat panel display as claimed in claim 35, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

37. The picture quality controlling apparatus of the flat panel display as claimed in claim 32, wherein the second compensation data is set to be a compensation value for increasing a brightness of the panel defect area and for decreasing a brightness of the non-defect area.

38. The picture quality controlling apparatus of the flat panel display as claimed in claim 37, wherein the second compensation data is set to be a compensation value gradually reduced from a pixel near the border to a far pixel.

39. The picture quality controlling apparatus of the flat panel display as claimed in claim 38, wherein the second compensation data is set to be a compensation value smaller than the first compensation data on the same pixel.

40. The picture quality controlling apparatus of the flat panel display as claimed in claim 32, wherein the second compensation data is set to be the compensation value for decreasing the brightness of the panel defect area and for increasing the brightness of the non-defect area.

41. The picture quality controlling apparatus of the flat panel display as claimed in claim 40, wherein the second compensation data is set to be a compensation value gradually reduced from a pixel near the border to a far pixel.

42. The picture quality controlling apparatus of the flat panel display as claimed in claim 41, wherein the second compensation data is set to be a compensation value smaller than the first compensation data on the same pixel.

43. The picture quality controlling apparatus of the flat panel display as claimed in claim 28, wheroen the memory includes a non-volatile memory that is adaptive for renewing a data.

44. The picture quality controlling apparatus of the flat panel display as claimed in claim 43, wheroen the memory includes an EEPROM or an EDID ROM.

45. A method of controlling a picture quality of a flat panel display, comprising the steps of:
storing a resultant compensation data calculated by adding a first compensation data for compensating a panel defect area of the display panel judged through a first inspection process of a display panel to a second compensation data for compensating the panel defect area, compensated by the first compensation data, and a border between the panel defect area, compensated by the first compensation data, and a non-defect area of the display panel judged through a second inspection process of the display panel and the panel defect area;
modulating data to be supplied to the border, the panel defect area close to the border and the non-defect area by using the resultant compensation data stored on a memory; and
displaying the data modulated to the resultant compensation on a display panel.

46. The method as claimed in claim 45, wherein the first compensation data has the same compensation value as a first compensation data on an adjacent pixel in the vertical direction at the panel defect area.

47. The method as claimed in claim 46, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

48. The method as claimed in claim 45, wherein the second compensation data corresponding to the pixels within the panel defect area is applied to the pixels arranged within half the distance between the border and an edge of the panel defect area spaced from thereof.

49. The method as claimed in claim 45, wherein the second compensation data further includes a compensation data of a non-defect area for modulating a data of the non-defect area.

50. The method as claimed in claim 49, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

51. The method as claimed in claim 50, wherein the second compensation data corresponding to the pixels within the panel defect area is applied to the pixels arranged within half the distance between the border and an edge of the panel defect area spaced from thereof.

52. The method as claimed in claim 51, wherein the second compensation data is set to be a compensation value for adjusting a brightness of the panel defect area and the non-defect area.

53. The method as claimed in claim 45, wherein the first compensation data has a different compensation value as first compensation data on the adjacent pixels in the vertical direction at the panel defect area.

54. The method as claimed in claim 53, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

55. The method as claimed in claim 54, wherein the second compensation data corresponding to the pixels within the panel defect area is applied to the pixels arranged within half the distance between the border and an edge of the panel defect area spaced from thereof.

56. The method as claimed in claim 55, wherein the second compensation data is set to be a compensation value for increasing a brightness of the panel defect area and for decreasing a brightness of the non-defect area.

57. The method as claimed in claim 56, wherein the second compensation data is set to be a compensation value gradually reduced from a pixel near the border to a far pixel.

58. The method as claimed in claim 57, wherein the second compensation data is set to be a compensation value smaller than the first compensation data on the same pixel.

59. The method as claimed in claim 55, wherein the second compensation data is set to be the compensation value for decreasing the brightness of the panel defect area and for increasing the brightness of the non-defect area.

60. The method as claimed in claim 59, wherein the second compensation data is set to be a compensation value gradually reduced from a pixel near the border to a far pixel.

61. The method as claimed in claim 60, wherein the second compensation data is set to be a compensation value smaller than the first compensation data on the same pixel.

62. A flat panel display, comprising:
a display panel that is adaptive for displaying a picture by using a video data;
a memory for storing a resultant compensation data calculated by adding a first compensation data for compensating a panel defect area of the display panel judged through a first inspection process of the display panel to a second compensation data for compensating the panel defect area, compensated by the first compensation data, and a border between the panel defect area, compensated by the first compensation data, and a non-defect area of the display panel judged through a second inspection process of the display;
a compensator for modulating the video data to be supplied to the border, the panel defect area close to the border and the non-defect area by using the resultant compensation data stored on the memory; and a driver for displaying the video data modulated by the compensator on the display panel.

63. The flat panel display as claimed in claim 62, wherein the first compensation data has the same compensation value as a first compensation data on an adjacent pixel in the vertical direction at the panel defect area.

64. The flat panel display as claimed in claim 63, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

65. The flat panel display as claimed in claim 63, wherein the second compensation data corresponding to the pixels within the panel defect area is applied to the pixels arranged within half the distance between the border and an edge of the panel defect area spaced from thereof.

66. The flat panel display as claimed in claim 62, wherein the second compensation data further includes a compensation data of a non-defect area for modulating a data of the non-defect area.

67. The flat panel display as claimed in claim 66, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

68. The flat panel display as claimed in claim 66, wherein the second compensation data is set to be a different compensation value as second compensation data on the adjacent pixels in the vertical direction at the panel defect area, and is set to be the different compensation value as second compensation data on the adjacent pixels in the horizontal direction at the panel defect area.

69. The flat panel display as claimed in claim 68, wherein the second compensation data is set to be a compensation value for adjusting a brightness of the panel defect area and the non-defect area.

70. The flat panel display as claimed in claim 62, wherein the first compensation data has a different compensation value as first compensation data on the adjacent pixels in the vertical direction at the panel defect area.

71. The flat panel display as claimed in claim 70, wherein the second compensation data is set to be a different compensation value as second compensation data on the adjacent pixels in the vertical direction at the panel defect area and the non-defect area, and is set to be the different compensation value as second compensation data on the adjacent pixels in the horizontal direction at the panel defect area and the non-defect area.

72. The flat panel display as claimed in claim 70, wherein the second compensation data corresponding to the pixels within the panel defect area is applied to the pixels arranged within half the distance between the border and an edge of the panel defect area spaced from thereof.

73. The flat panel display as claimed in claim 72, wherein the second compensation data is set to be a compensation value for increasing a brightness of the panel defect area and for decreasing a brightness of the non-defect area.

74. The flat panel display as claimed in claim 73, wherein the second compensation data is set to be a compensation value gradually reduced from a pixel near the border to a far pixel.

75. The flat panel display as claimed in claim 74, wherein the second compensation data is set to be a compensation value smaller than the first compensation data on the same pixel.

76. The flat panel display as claimed in claim 72, wherein the second compensation data is set to be the compensation value for decreasing the brightness of the panel defect area and for increasing the brightness of the non-defect area.

77. The flat panel display as claimed in claim 76, wherein the second compensation data is set to be a compensation value gradually reduced from a pixel near the border to a far pixel.

78. The flat panel display as claimed in claim 77, wherein the second compensation data is set to be a compensation value smaller than the first compensation data on the same pixel.

79. The flat panel display as claimed in claim 62, wherein the display panel includes a liquid crystal display panel in which a plurality of data lines and a plurality of gate lines are crossed each other, and a plurality of liquid crystal cells are arranged.

80. The flat panel display as claimed in claim 79, wherein the driver further includes:
   a data driver for driving the data lines using the data modulated as the resultant compensation data;
   a gate driver for supplying a scan pulse to the gate lines; and
   a timing controller for controlling the data driver and the gate driver, and for supplying the resultant compensation data to the data driver,
   wherein the memory and the compensator are embedded in the timing controller.

81. The flat panel display as claimed in claim 80, wherein the memory includes a non-volatile memory that is adaptive for renewing a data.

82. The flat panel display as claimed in claim 81, wherein the memory includes an EEPROM or an EDID ROM.

* * * * *